United States Patent [19]

Waits et al.

[11] Patent Number: 5,721,831
[45] Date of Patent: Feb. 24, 1998

[54] METHOD AND APPARATUS FOR RECORDING RESULTS OF MARKETING ACTIVITY IN A DATABASE OF A BANK, AND FOR SEARCHING THE RECORDED RESULTS

[75] Inventors: Toya Waits, Beavercreek; Alex Sobolev, Dayton; Rick Rusak, Kettering; Eileen Hunter, Dayton, all of Ohio; Janet Fath, Atlanta; Jacqueline Voellinger, Tucker, both of Ga.; Ralph Barletta, Sudbury, Mass.

[73] Assignee: NCR Corporation, Dayton, Ohio

[21] Appl. No.: 253,729

[22] Filed: Jun. 3, 1994

[51] Int. Cl.[6] .............................. G06F 17/60; G06F 17/40
[52] U.S. Cl. .................. 395/210; 395/235; 395/236; 395/613; 395/615
[58] Field of Search .................. 364/401 R, 402, 364/408; 395/161, 600, 650, 210, 235, 236, 613, 615

[56] References Cited

U.S. PATENT DOCUMENTS

| | | | |
|---|---|---|---|
| 4,872,113 | 10/1989 | Dinerstein | 364/401 R |
| 4,992,939 | 2/1991 | Tyler | 364/401 R |
| 5,297,250 | 3/1994 | Leroy et al. | 395/157 |
| 5,339,392 | 8/1994 | Risberg et al. | 395/161 |
| 5,418,942 | 5/1995 | Krawchuk et al. | 395/600 |
| 5,430,644 | 7/1995 | Daton et al. | 364/401 R |
| 5,446,885 | 8/1995 | Moore et al. | 395/600 |

OTHER PUBLICATIONS

*Database Marketing*, Catalog Age Roundtable, May 1988, pp. 85–86, 88, 90, 92, 94, 96, & 98.
Howells, Jan; Case Study, "The Direct Approach", *Marketing Week Software Solutions*, Jun. 25, 1993.
Snell, Tracey; "Third Wave Puts Its Mind to £10m NatWest Project" *Computing*, Jun. 10, 1993.
Miller, Paul; "NatWest Opens its Mind to Customers" *Marketing*, Jun. 10, 1993.
"NatWet to Bring in New DM Database", *Precision Marketing*, Jun. 14, 1993.
"Mind, Marketing Information at Database System at first-direct" Third Wave Network plc Brochure, Septre House, 75/81 Staines Road Hounslow, Middlesex TW3 3HW.
"Mind, Marketing Information Database System" Third Wave Systems Ltd. Brochure, Septre House, 75/81 Staines Road Hounslow, Middlesex TW3 3HW.
Project Services "Making Your IT Budget Go Further", Third Wave Systems Ltd. Brochure, Septre House, 75/81 Staines Road Hounslow, Middlesex TW3 3HW.
Mind, Marketing Information Database System, Third Wave Systems Ltd. Brochure, Septre House, 75/81 Staines Road Hounslow, Middlesex TW3 3HW.
Integral Technology Ltd., Integral House Mill Lane, Alton Hants, GU34 2QG, Member of the Third Wave Network.
Third Wave Network plc Brochure, Septre House, 75/81 Staines Road Hounslow, Middlesex TW3 3HW.
Third Wave Network plc Report and Accounts 1991/92, Septre House, 75/81 Staines Road Hounslow, Middlesex TW3 3HW.

(List continued on next page.)

*Primary Examiner*—Gail O. Hayes
*Assistant Examiner*—Joseph Thomas
*Attorney, Agent, or Firm*—Gregory A. Welte

[57] ABSTRACT

The invention concerns a graphical user interface for a bank's customer database. The interface allows a user to choose from several pre-defined operations upon the database, and eliminates the need for the user to use a command-line format to execute the operations.

The invention allows the user to divide the database into demographic segments, and to perform computations upon the segments, as well as to export results of the computations to files, and to other programs.

5 Claims, 52 Drawing Sheets

OTHER PUBLICATIONS

Mind Marketing Information Database System Management Overview Septre House, 75/81 Staines Road Hounslow, Middlesex TW3 3HW.

"Natural Solutions in Marketing" IBM Advertisement Feature.

Third Wave Systems Ltd. Brochure, Septre House, 75/81 Staines Road Hounslow, Middlesex TW3 3HW.

Mind The Unique Approach to Database Marketing, Brochure, Third Wave Network, Septre House, 75/81 Staines Road Hounslow, Middlesex TW3 3HW.

FIG. 1D

Flowchart Intro

The next few pages present the logic for the user interface of the Reunion program (also referred to as "the program") in the form of flowcharts. The flowcharts are meant to convey the overall logic and interconnectedness of the program, not every possible detail. The intent is to provide a knowledgable person with enough information to make and use an implementation of the product. It should be understood that the overall concepts and how they interrelate need not change, although details of their implementation can change (eg: buttons and other window items might be moved, or renamed within a window, they might be removed and replaced by a menu item, or a visually busy or complex window might be split into two windows, or a simple child windows might be condensed into its parent). An attempt is made to remain general and consistent, with examples where appropriate.

The flowcharts are accompanied by a set of figures, which are referenced whenever possible.

These charts and the related figures pertain to an implementation in the Windows™ environment. It is assumed that the reader has some aquaintance with this type of graphic user interface (GUI). In particular, how the user can use graphic cues like buttons, text boxes, and menus to interact with the program. So things like "click here" or "hit the return key" will not be mentioned. Moreover, the details of the Windows™ programming will not be discussed, but rather only the overall logic specific to the Reunion program's interface. In the future, alternative implementations of the program could use other environments (eg: the Mactintosh™ environment).

Some words are used with specific meaning in the flowcharts. 'Trivial' means a window is not complex and a textual description is sufficient to describe what is going on, and there is no flowchart for such a window. Comments in parenthesis (like this) are used to give examples of how a specific action or item is implemented in the current Windows™ version. "Primary" actions are the actions available within a window which are deemed most important, and are often implemented as buttons, although not necessarily. Actions are often available to the user in several ways, like menu items or buttons in a special control area under the main menu.

| PG | SCREEN NAME | PG | SCREEN NAME |
|---|---|---|---|
| INTRO | INTRO/OVERVIEW | 10 | CAMPAIGN |
| 01 | PROJECT-OPEN | 11 | CAMPAIGN-MAIL |
| 02 | PROJECT-DESCRIPTION | 12 | CAMPAIGN-TRACKING |
| 03 | PROJECT | 13 | ATTACHMENTS |
| 04 | ANALYZE | 14 | SEGMENT DATA |
| 05 | ANALYZE-VIEW | 15 | SEGMENT-EDIT |
| 06 | ANALYZE-ADD | 16 | SEGMENT-ADD |
| 07 | ANALYZE-GRAPH | 17 | SEGMENT-EDIT-FIND |
| 08 | STRATEGY | 18 | SEGMENT-EDIT-MATCHES |
| 09 | STRATEGY-ADD/EXIT | | |

5,721,831

METHOD AND APPARATUS FOR RECORDING RESULTS OF MARKETING ACTIVITY IN A DATABASE OF A BANK, AND FOR SEARCHING THE RECORDED RESULTS

The invention concerns approaches to manipulating a database of bank customers, and to a graphical user interface which facilitates such manipulation.

BACKGROUND OF THE INVENTION

Databases

There exist commercially available computer databases which allow a user to store data, and to perform searches upon the data. However, many of these databases require extensive, or at least significant, training by a new user.

Also, many of the databases require that commands be entered in text format. These commands frequently have an arcane syntax, which promotes mistakes, and also requires effort to learn.

Banks

Banks provide financial services to their customers. Market analysts in banks study the needs of the customers, and provide financial services which fulfill the needs. In general, increasing the financial services provided to existing customers, and providing existing financial services to additional customers, lead to improved profitability of the bank. Market analysts seek to attain this improved profitability.

The invention intends to assist the market analysts, by providing a user interface to a customer database which is easy to use, and which performs a selected set of operations upon the database which is of particular interest to the analysts.

OBJECTS OF THE INVENTION

An object of the invention is to provide a user interface, for extracting and manipulating data contained in a bank's customer database, which is simple to use.

A further object of the invention is to provide a system which allows a market analyst of a bank to divide a customer database into segments, and to examine the response of selected segments to marketing strategies.

SUMMARY OF THE INVENTION

In one form of the invention, a market analyst can select SEGMENTS of a customer database, and order that a marketing CAMPAIGN be executed with respect to the SEGMENT. The results of the CAMPAIGN are then stored in the database. The analyst can see the results, modify the CAMPAIGN, and then execute the modified CAMPAIGN. The results of the modified CAMPAIGN are stored in the database, and the analyst can repeat the procedure.

BRIEF DESCRIPTION OF THE DRAWINGS

FIG. 1B is an extension of FIG. 1A. The dashed lines indicate additional paths which can be taken. The path groups 10 and 12 in the two Figures represent the same paths.

FIG. 1 is an initial window.

FIG. 2 is reached by using the DESCRIPTION option in FIG. 1.

FIG. 3 is reached by using the OPEN option in FIG. 1.

FIG. 4 is reached by using the ANALYSIS option in FIG. 3.

FIG. 5 is reached by using the VIEW option in FIG. 4.

FIG. 6 is reached by using the ADD option in FIG. 4.

FIG. 7 is reached by using the GRAPH option in FIG. 5.

FIG. 8 is reached by using the STRATEGY option in FIG. 3.

FIG. 9 is reached by using the ADD option in FIG. 8.

FIG. 10 is reached by using the CAMPAIGN option in FIG. 3.

FIG. 11 is reached by using the MAILING LIST option in FIG. 10.

FIG. 12 is reached by using the TRACKING option in FIG. 10.

FIG. 13 is reached by using the ATTACHMENTS option available in a pull-down menu attained using the PROJECT option, at the upper left corner of FIG. 10.

FIG. 14 is reached by pulling down the TOOLS menu in FIG. 3, and selecting the DATA option, as illustrated in FIG. 30.

FIG. 15 is reached by using the MORE DETAILS option in FIG. 10.

FIG. 16 is reached by using the ANALYSIS NOTES option in FIG. 9.

FIG. 17 is reached by using the EDIT option in FIG. 10.

FIG. 18 is reached by using the STATISTICS option in FIG. 5.

FIG. 19 is reached by pulling down the TOOLS menu in FIG. 3, and selecting the DATA option, as illustrated in FIG. 30.

FIG. 20 is reached by using the EDIT option in FIG. 10.

FIG. 21 is reached by using the EDIT option in FIG. 3.

FIG. 22 is reached by using the ADD option in FIG. 3.

FIG. 23 is reached by using the STATISTICS option in FIG. 21.

FIG. 24 is reached by using the FIND option in FIG. 21.

FIG. 25 is reached by entering a search string in FIG. 24, and using the OK option.

FIG. 26 is reached by using the DETAILS option in FIG. 25, when matches are found in FIG. 25. The details in FIG. 26 refer to details of the search field.

FIG. 27 is reached by using the PRINT option, which is the printer icon shown in FIG. 25, among others.

FIG. 28 is reached by using the ANALYSIS option in FIG. 12.

FIGS. 29 and 30 illustrate pull-down menus.

DETAILED DESCRIPTION OF THE INVENTION

Overview of Invention

The invention will be used primarily by market analysts in banks, and other financial institutions. The invention allows the market analyst to both create, and follow the success of, marketing activities called PROJECTS.

A simplified flow chart will provide an overview of the invention. A highly detailed flow chart will then be provided.

Level 1—Projects

Figure 1A:
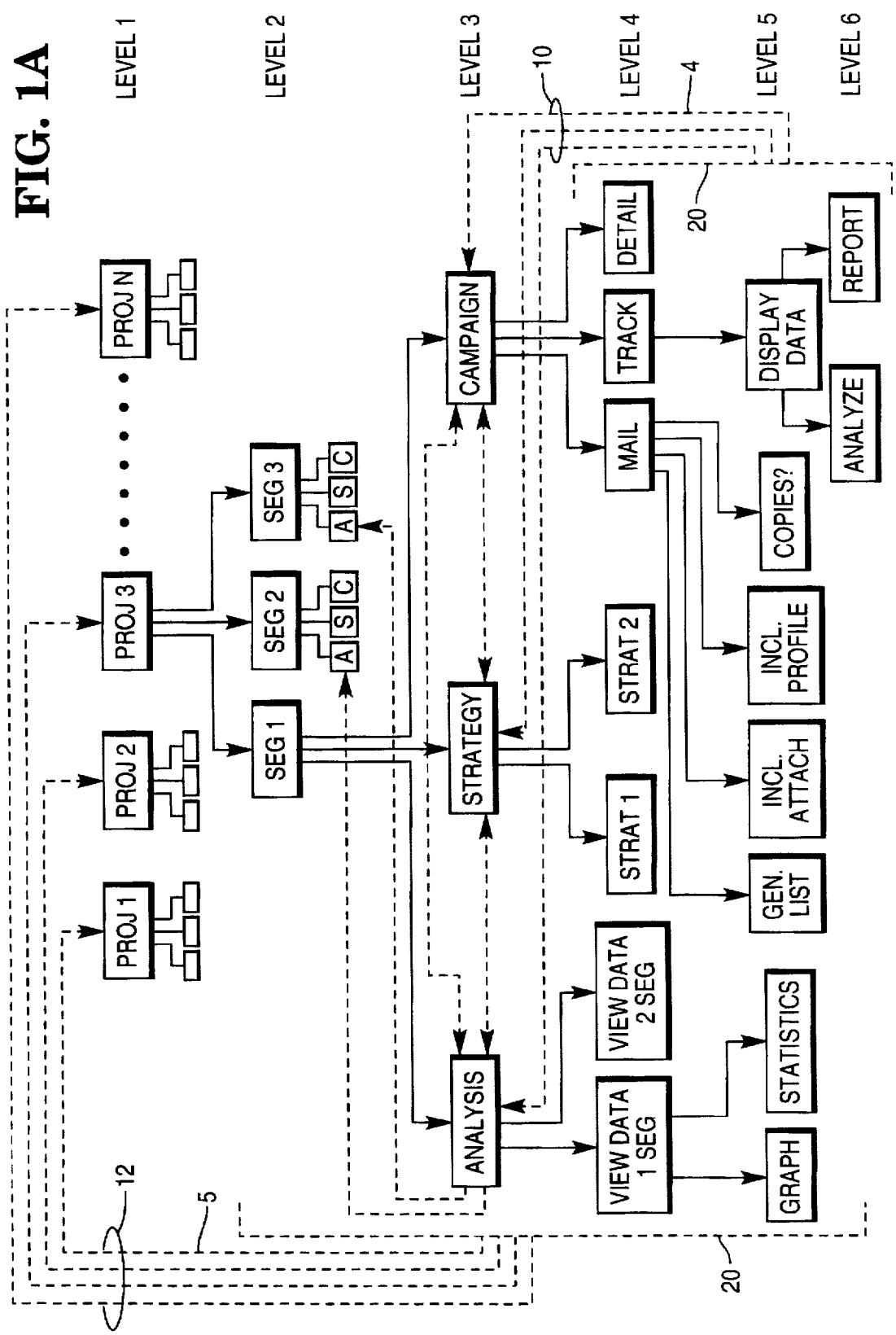
FIGS. 1A and 1B illustrate a simplified chart of the logic flow of one form of the invention.
Figure 1B:
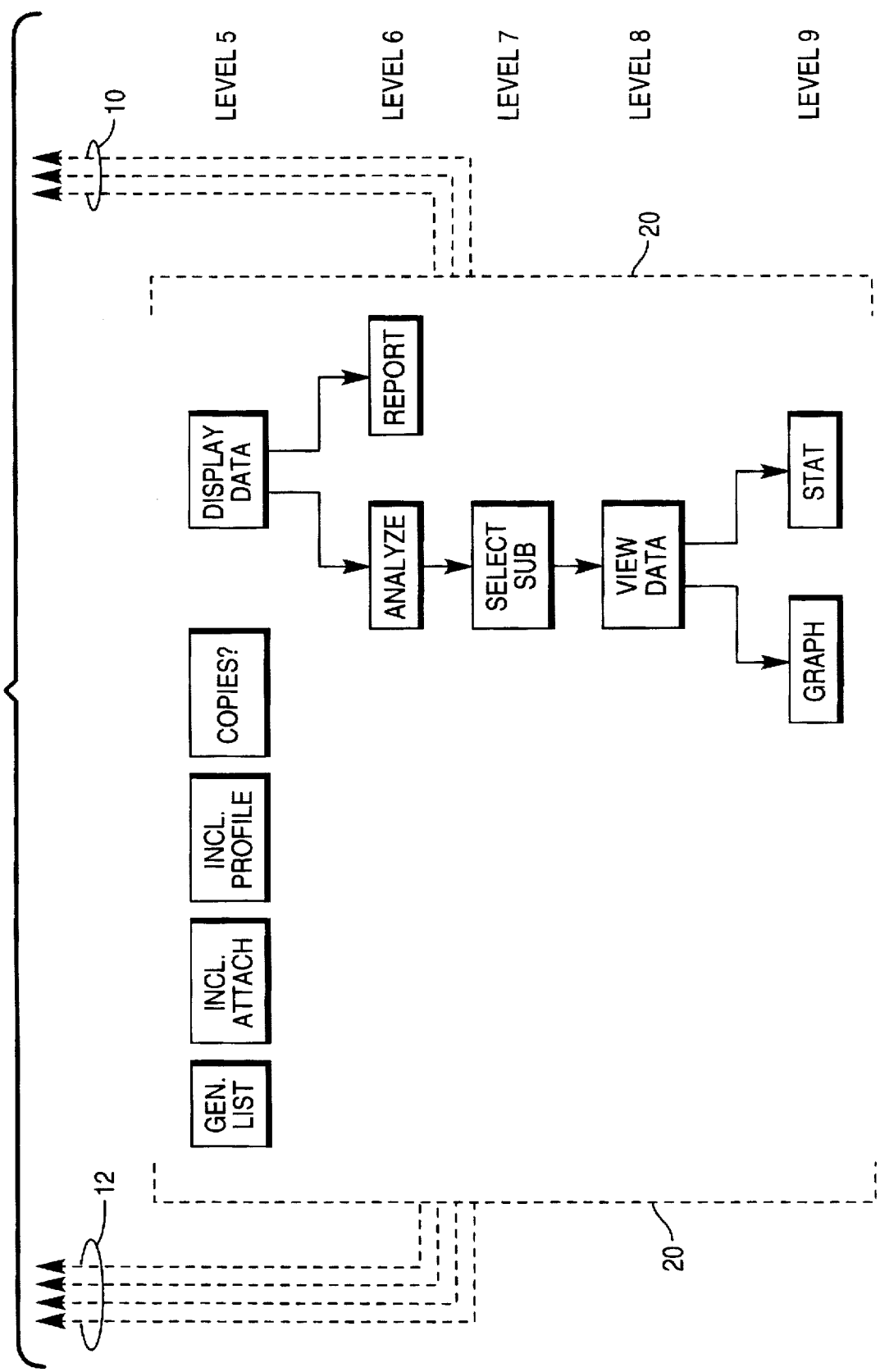
Figure 1C:
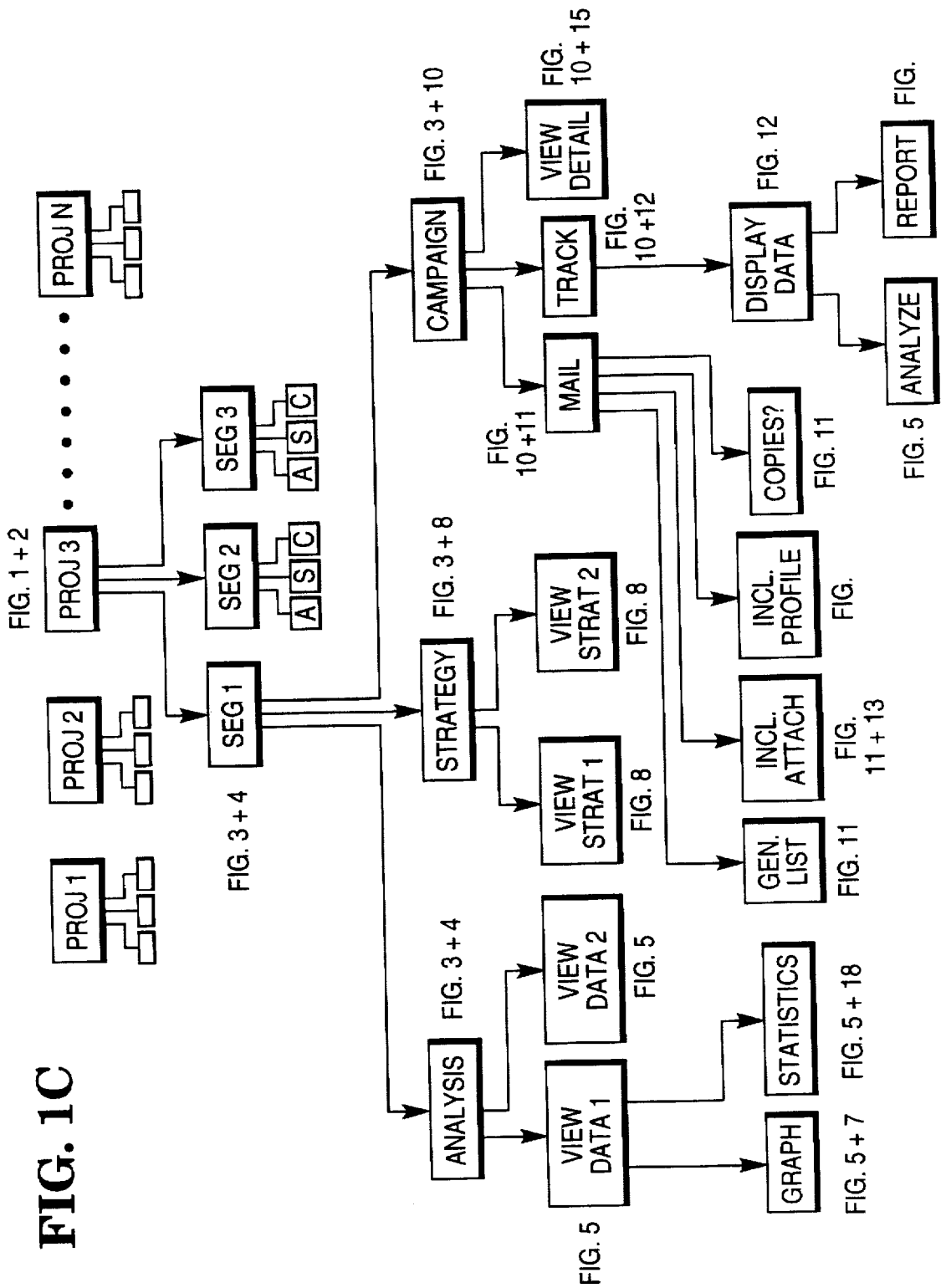
FIG. 1C is a simplified view of FIG. 1A, which illustrates correspondence between windows shown in FIGS. 1-27 and the blocks in FIGS. 1A and 1B.
Figure 1E:
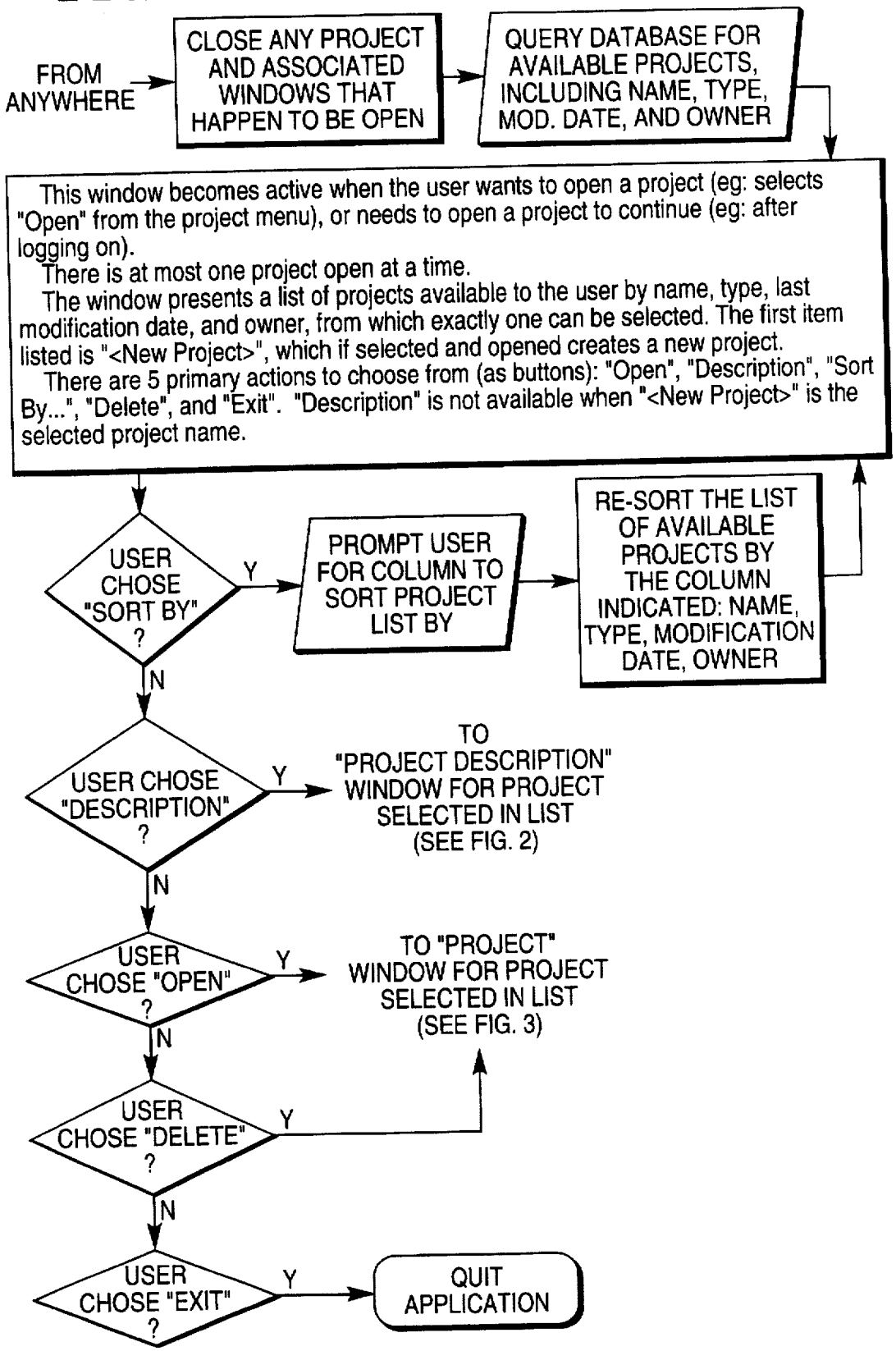
FIGS. 1D-1V illustrate a detailed chart of the logic flow of one form of the invention. In those Figures, the word "REUNION" refers to a detailed implementation of the invention.
FIGS. 1-30 illustrate windows which the invention generates.
Figure 1F:
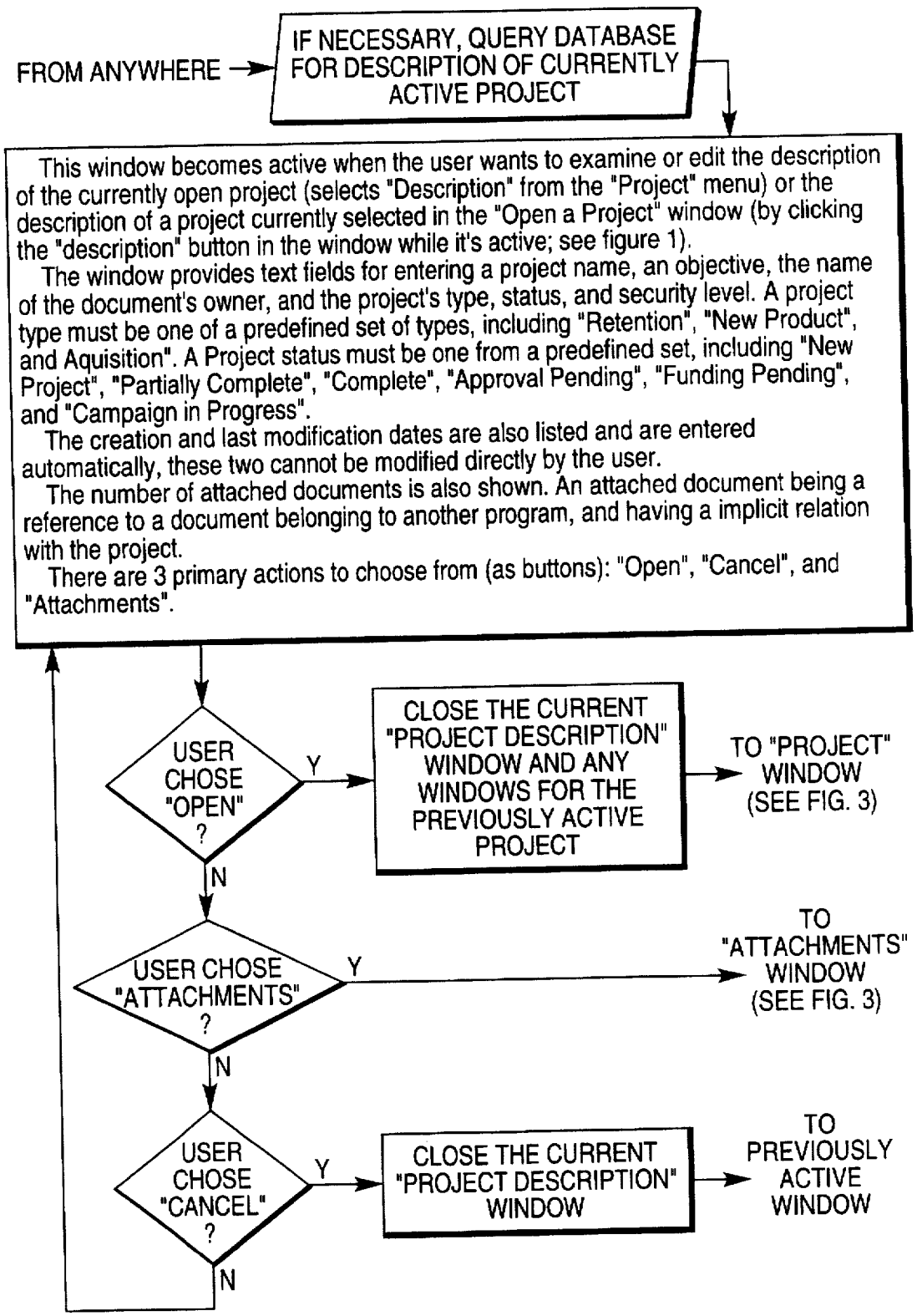
Figure 1G:
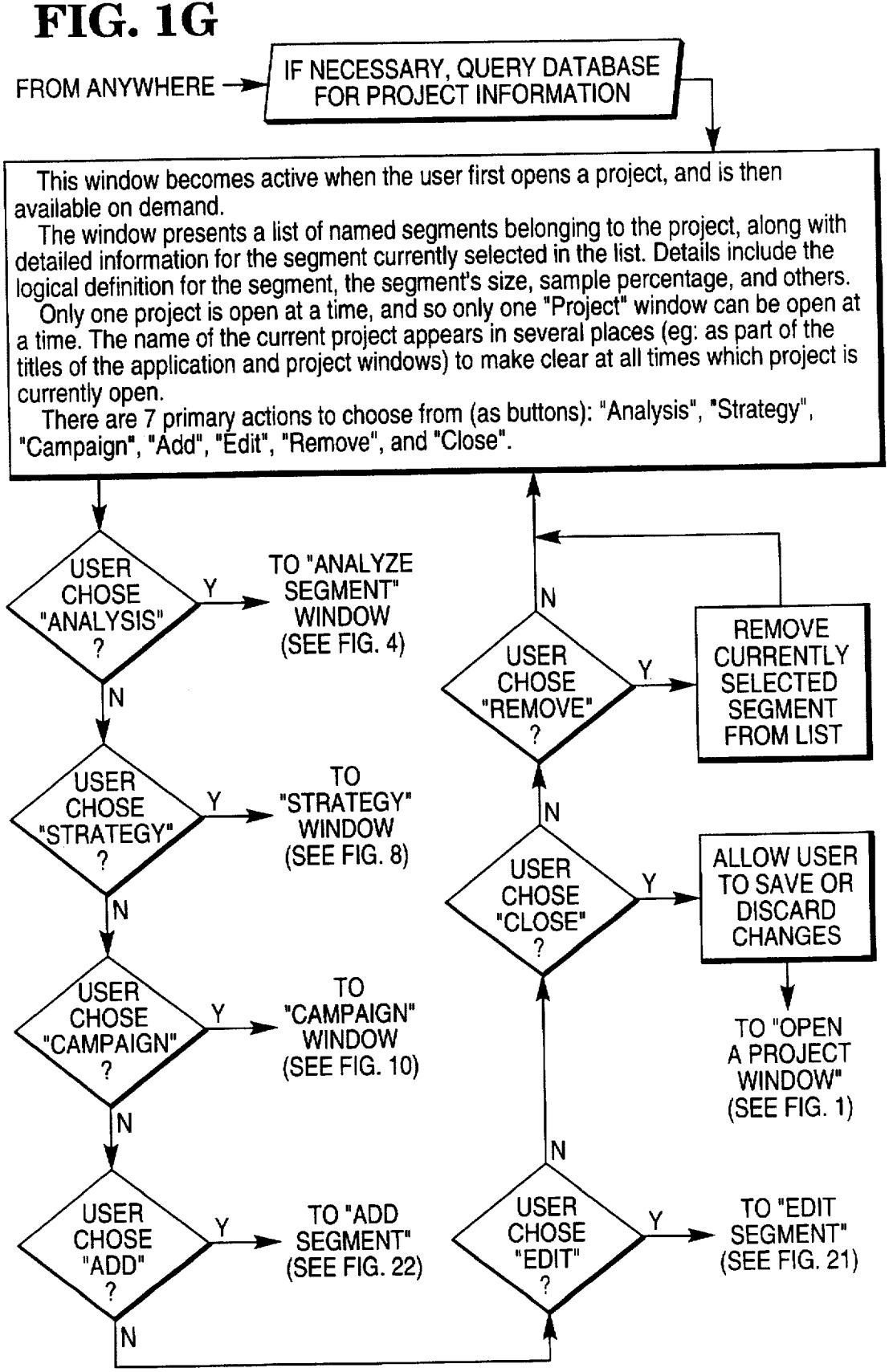
Figure 1H:
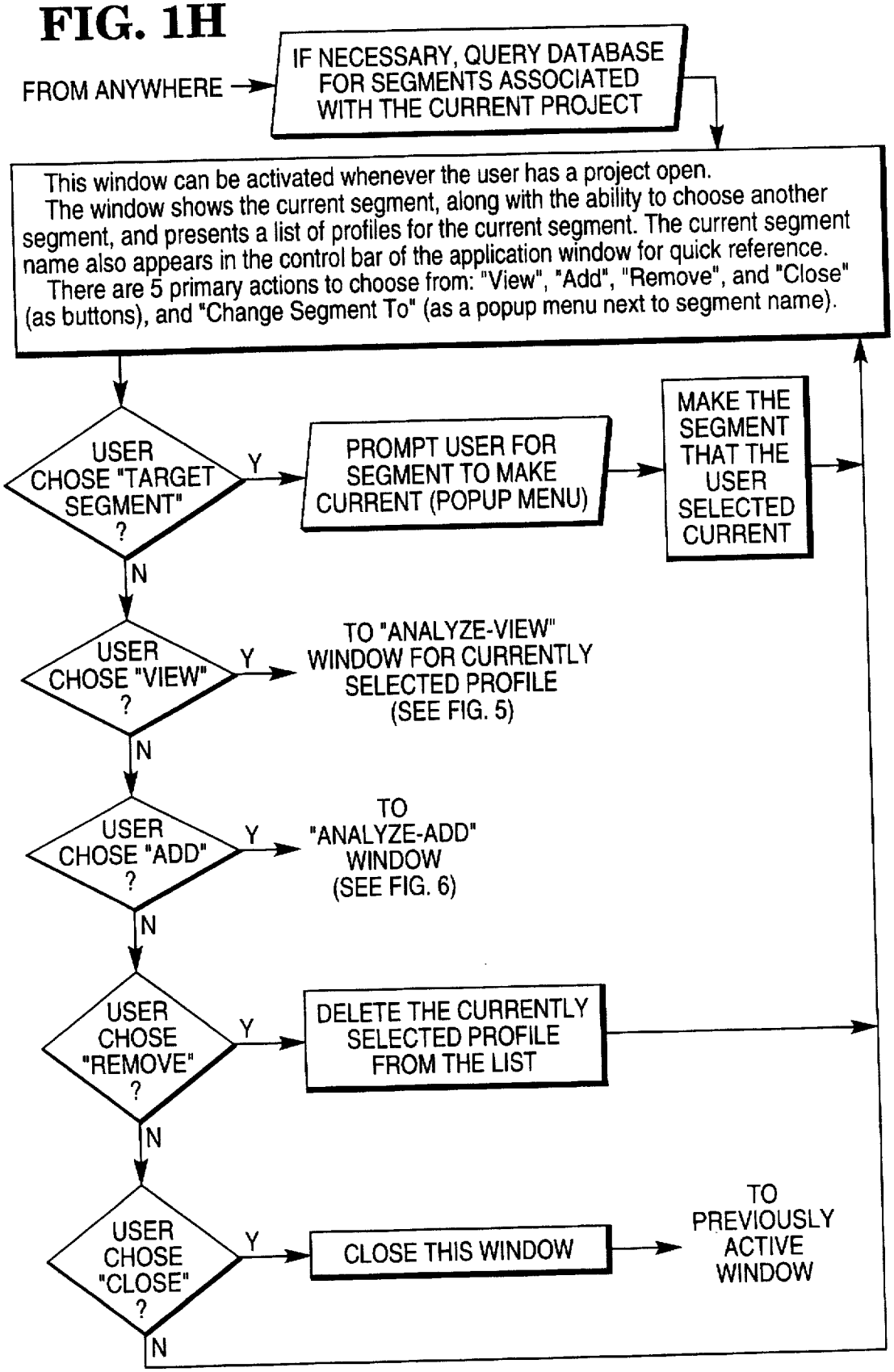
Figure 1I:
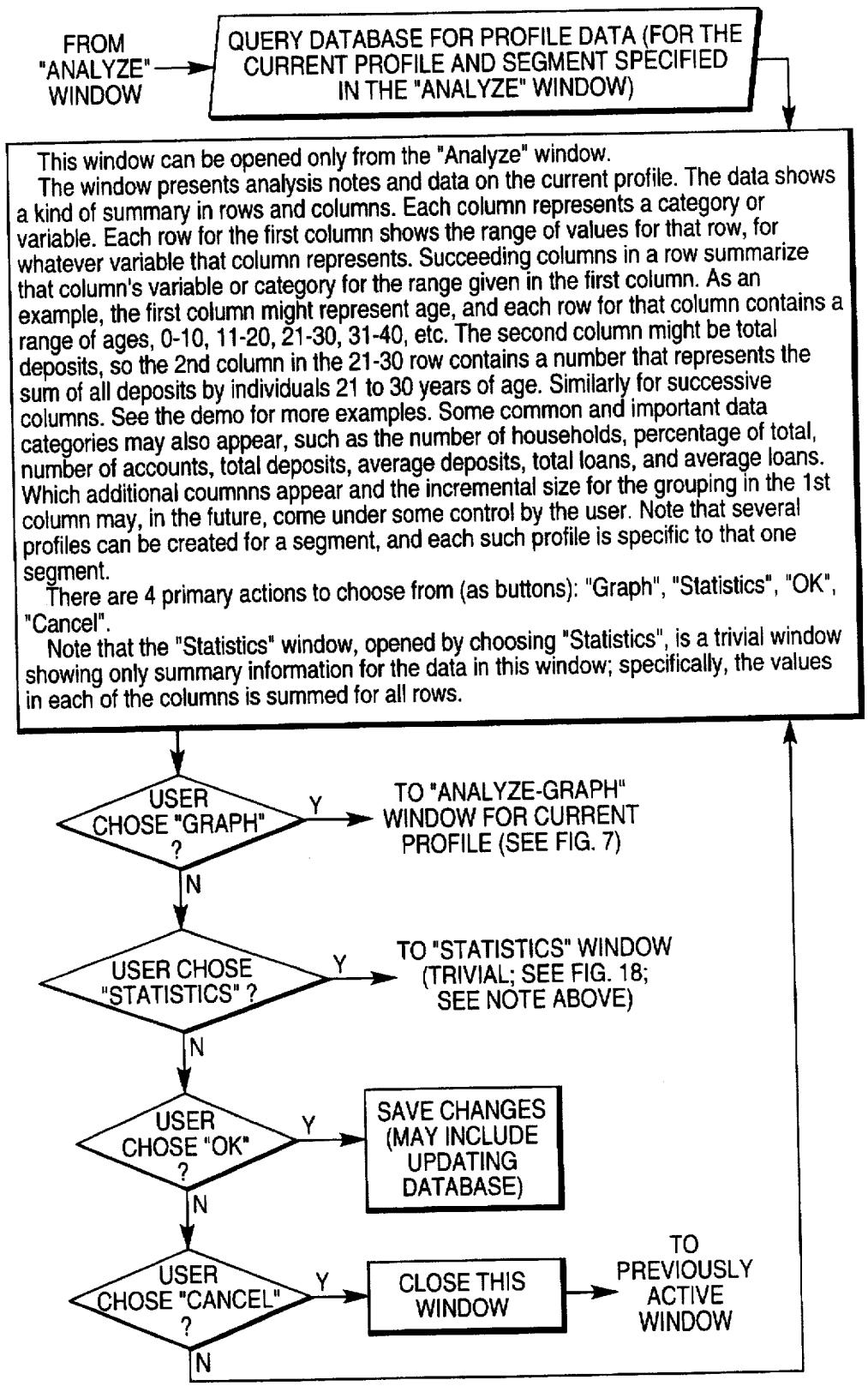
Figure 1J:
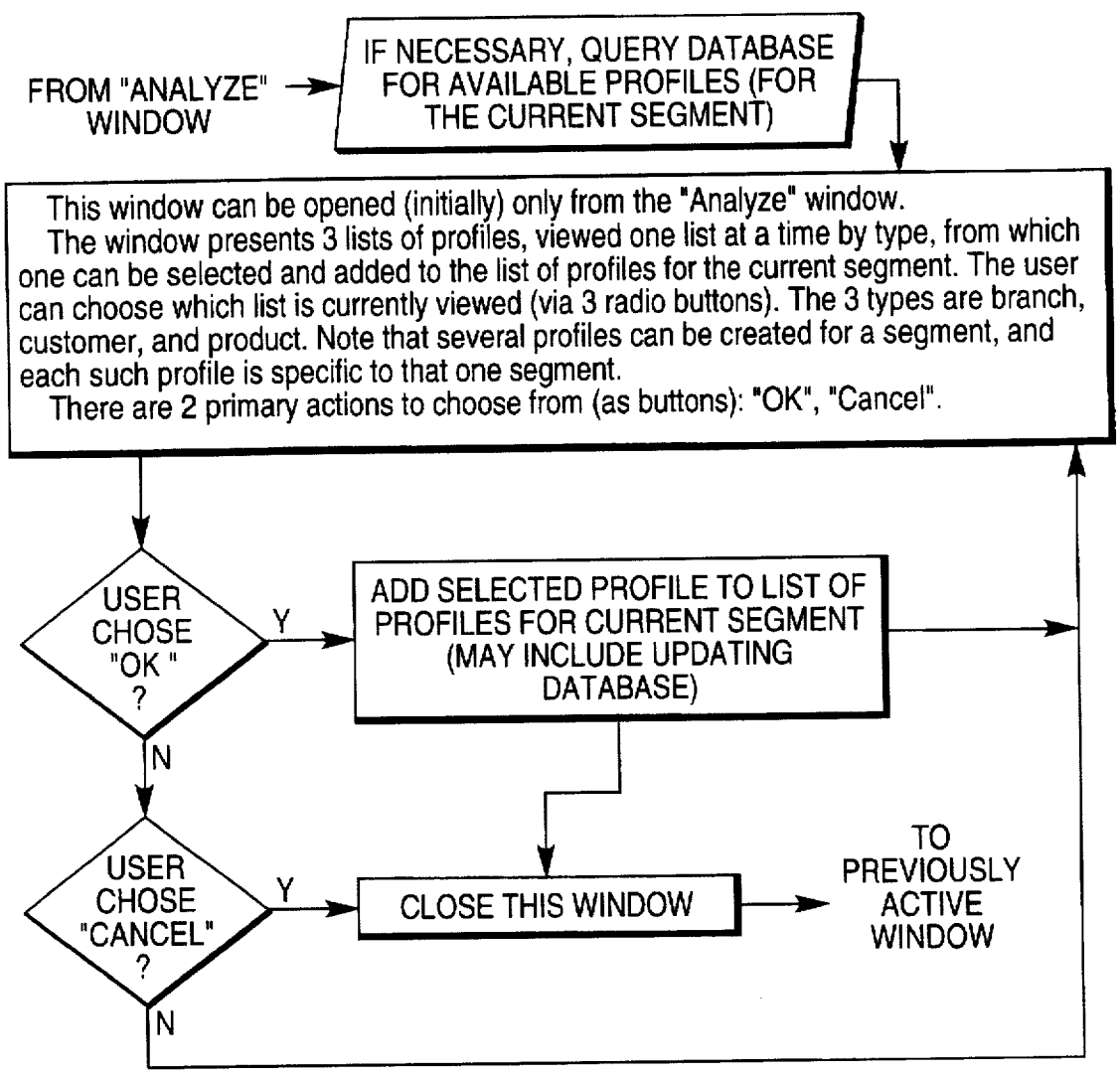
Figure 1K:
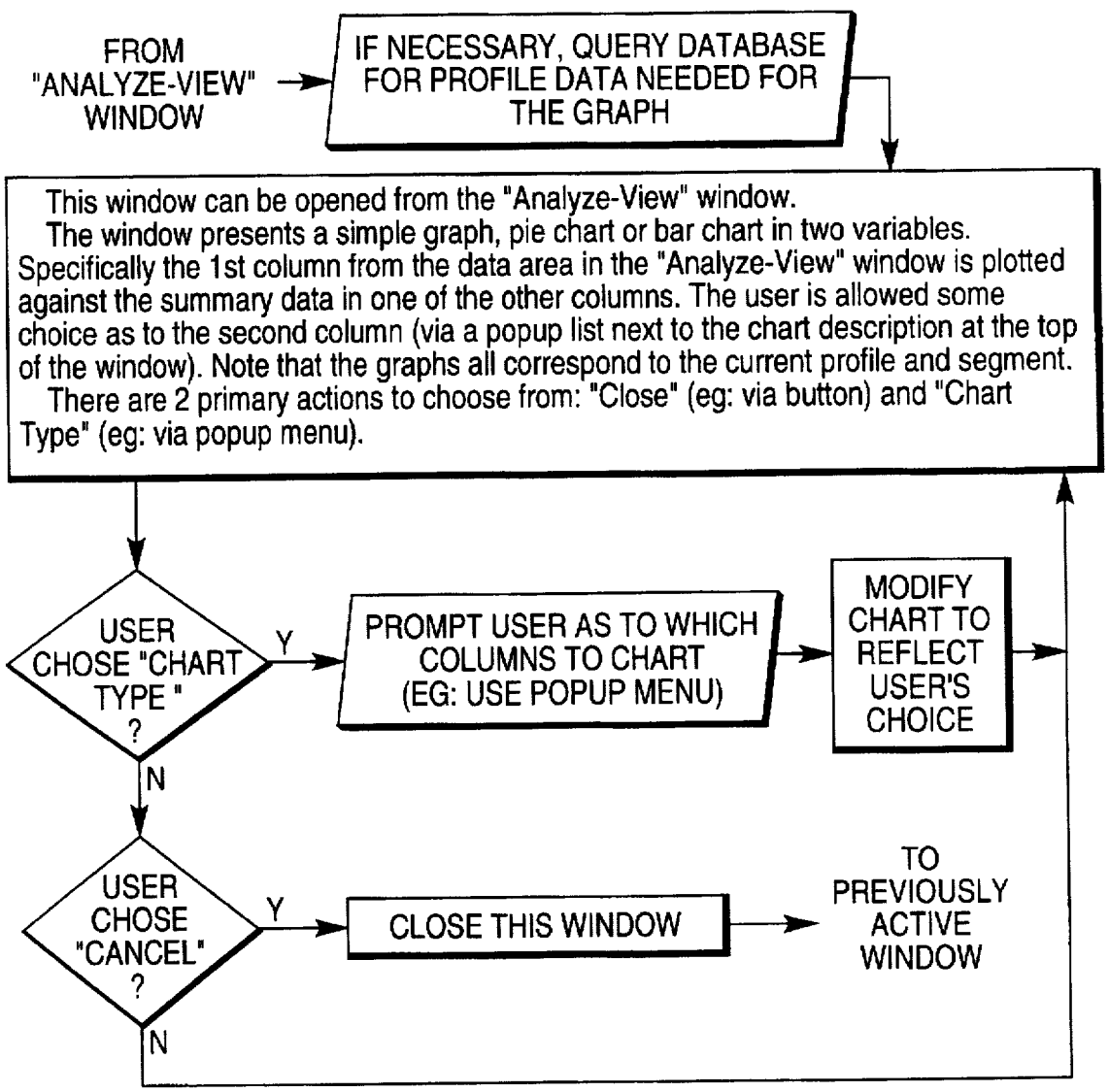
Figure 1L:
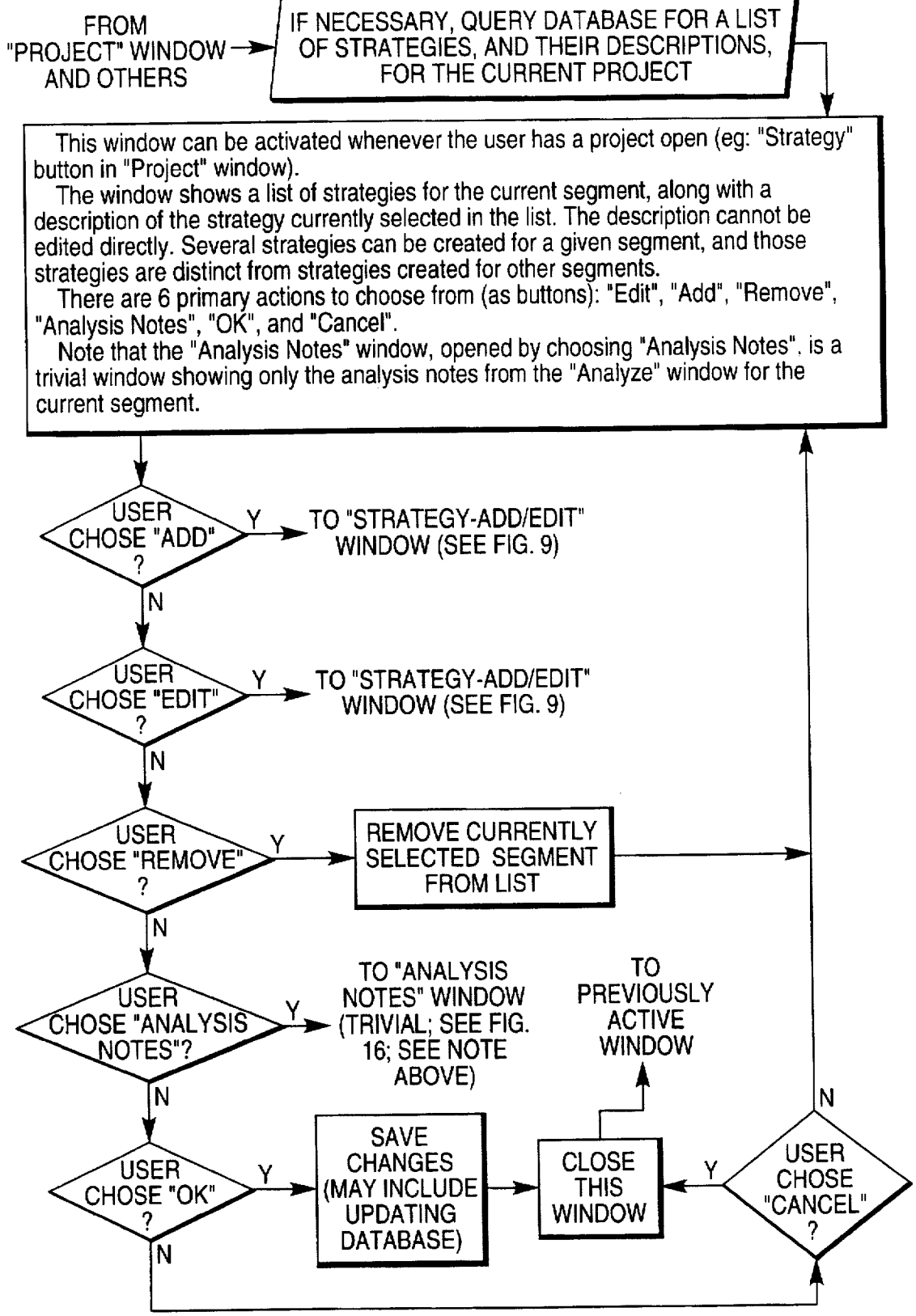
Figure 1M:
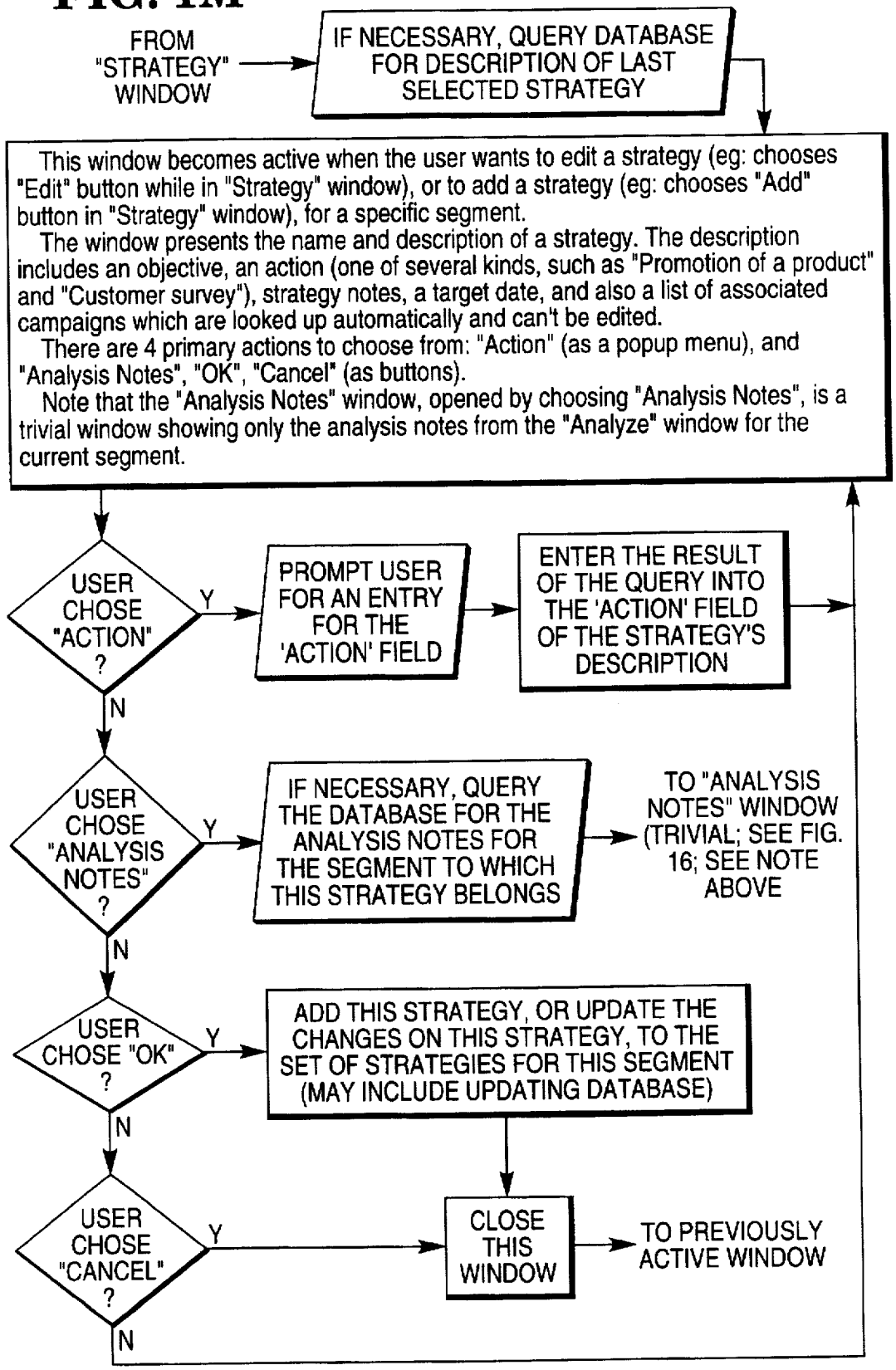
Figure 1N:
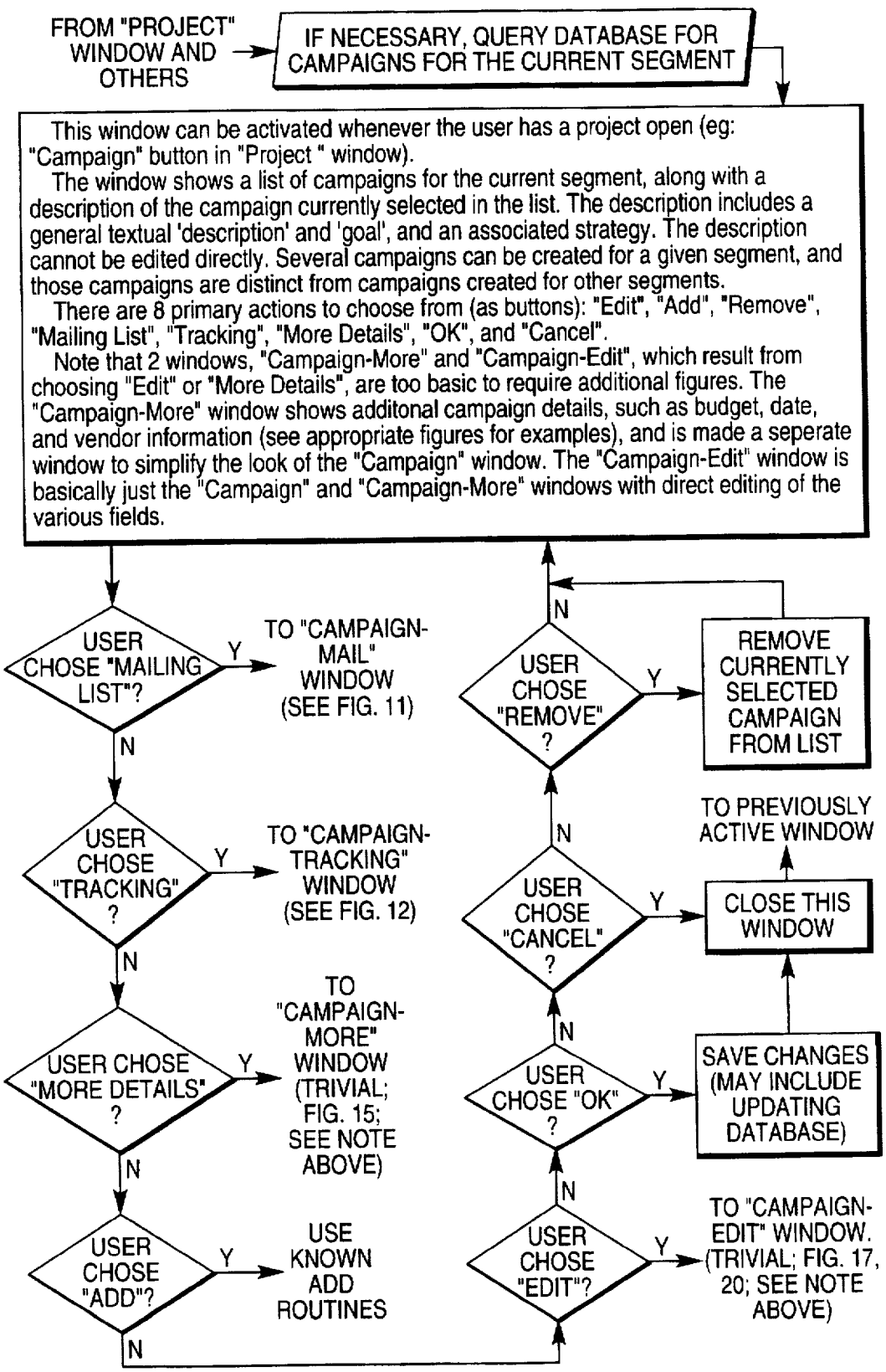
Figure 1P:
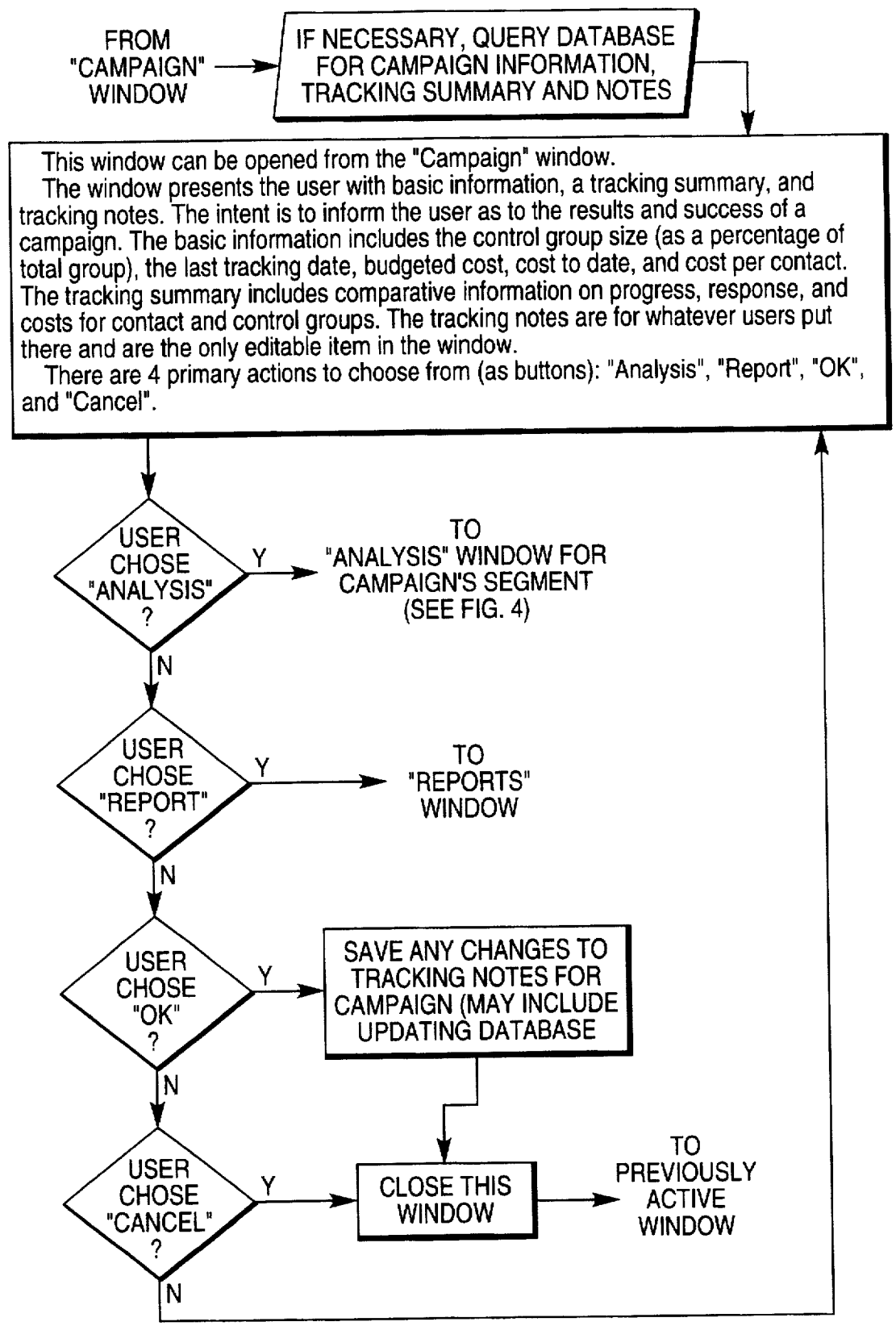
Figure 1Q:
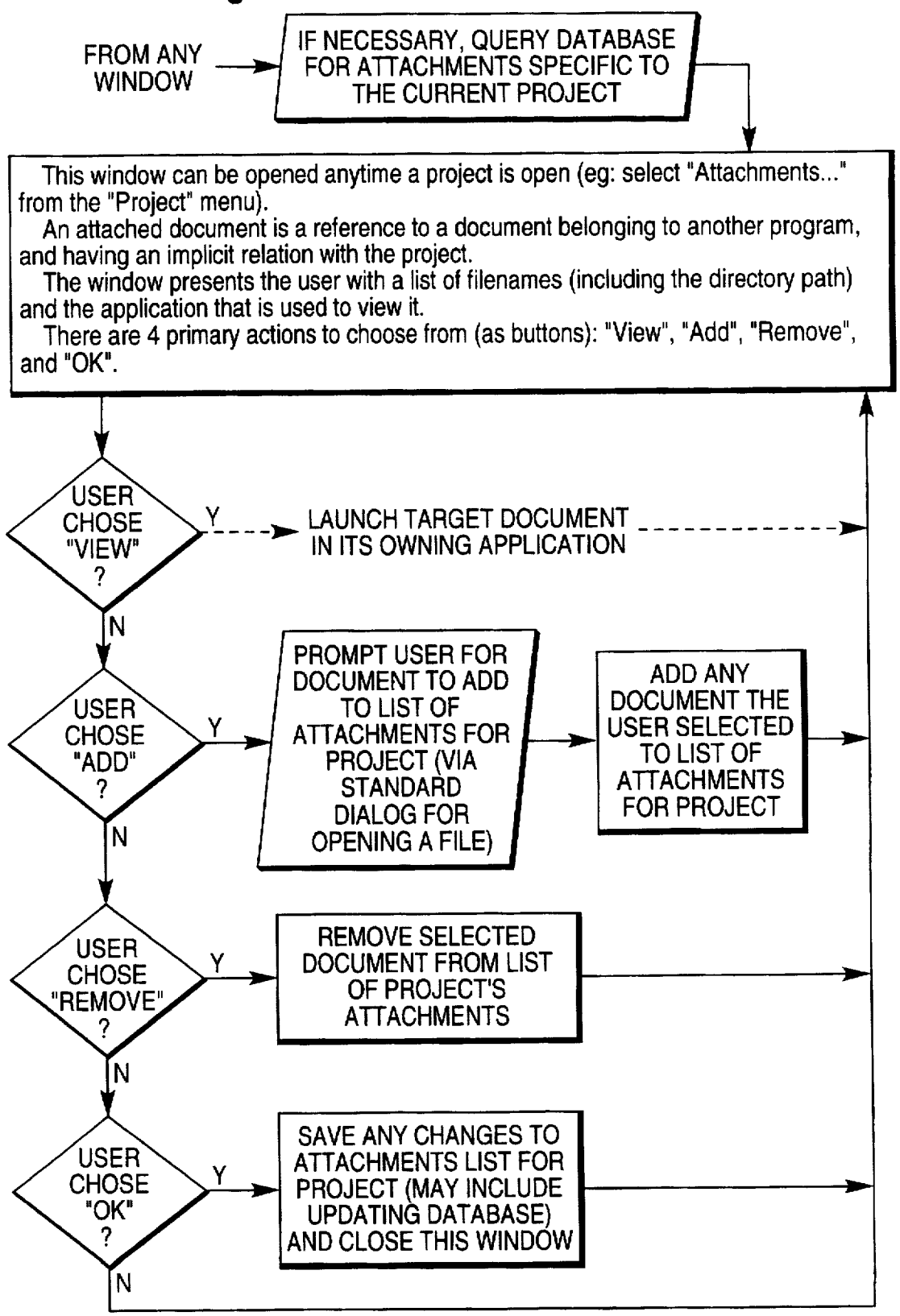
Figure 1R:
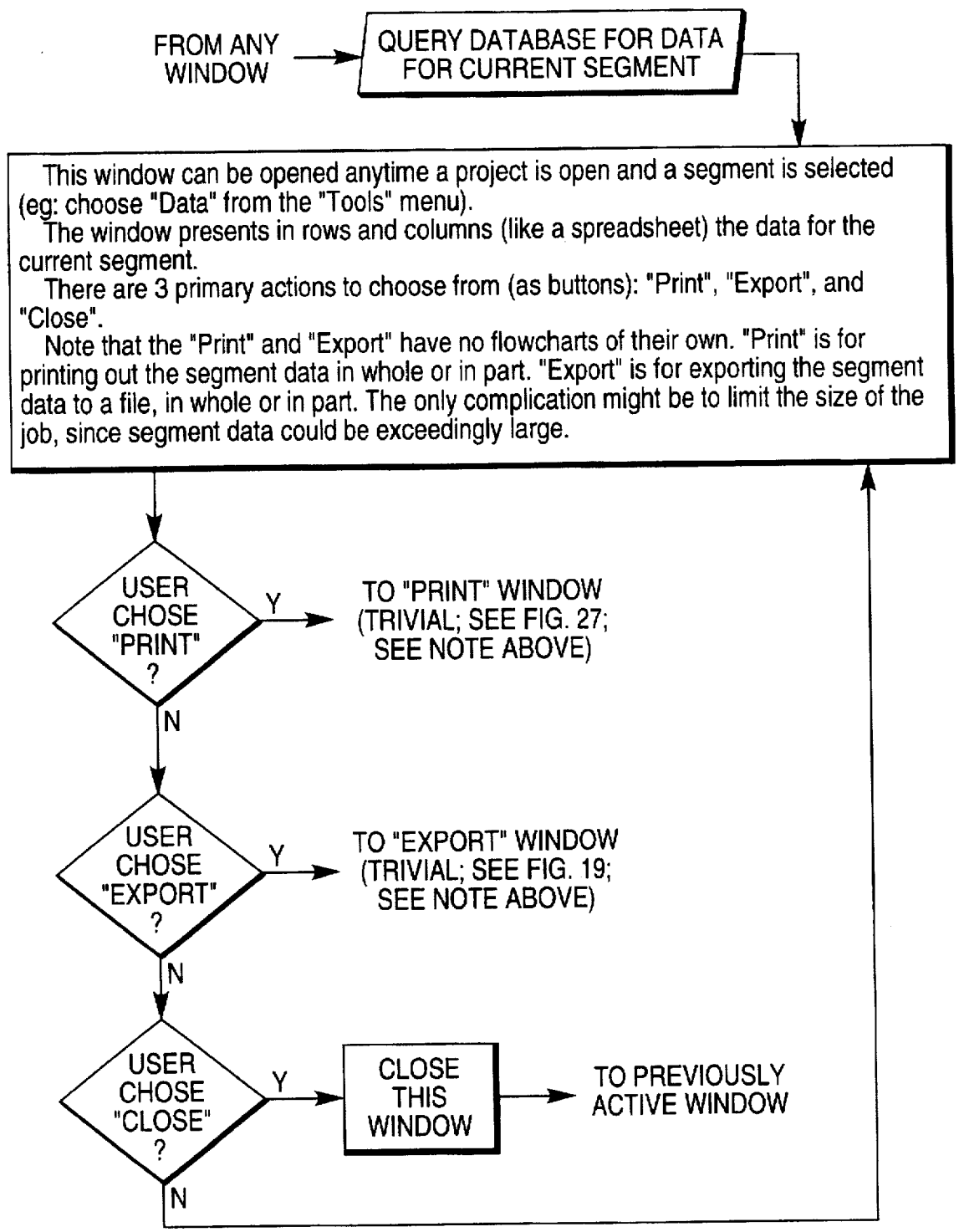
Figure 1S:
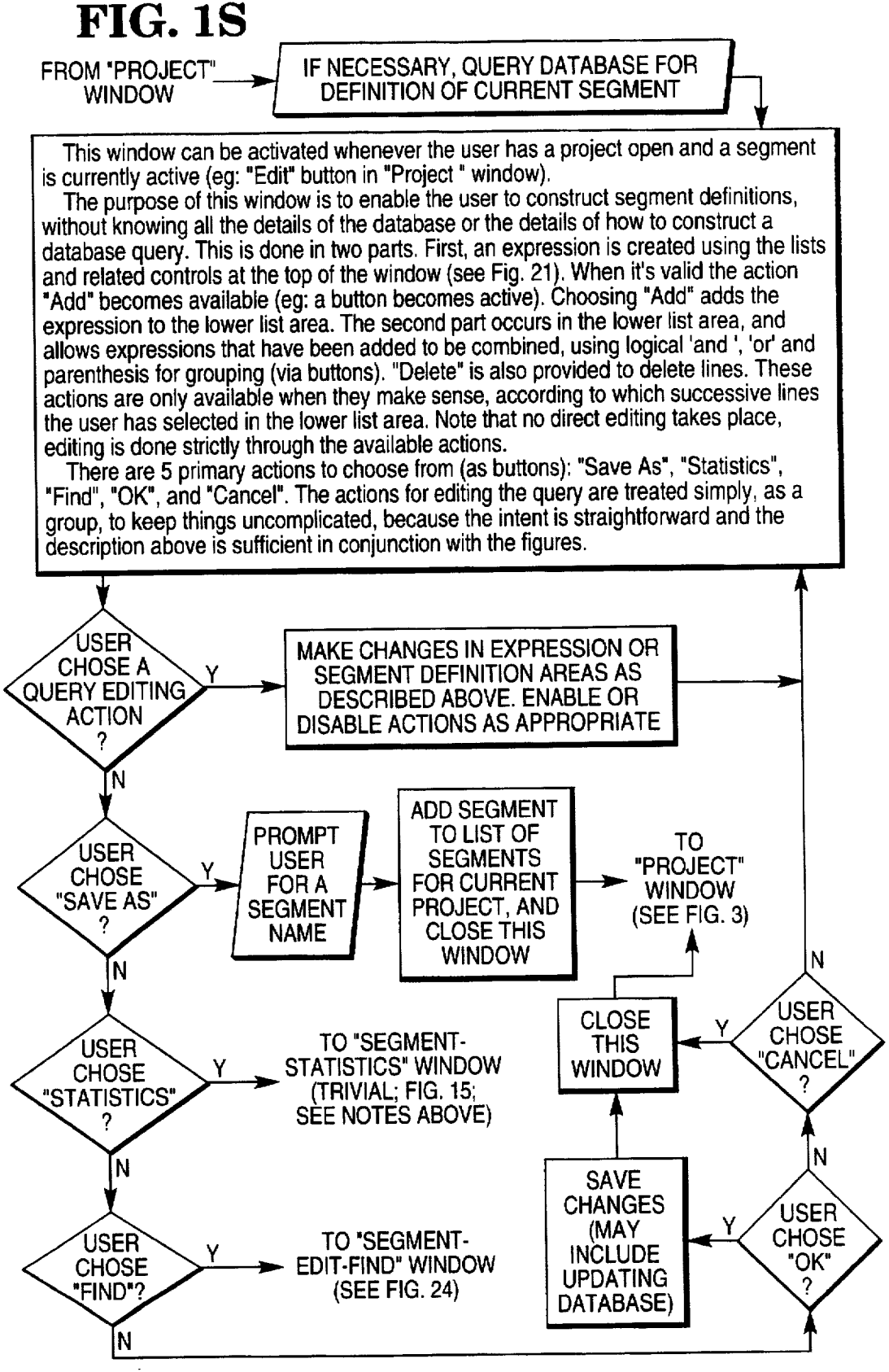
Figure 1T:
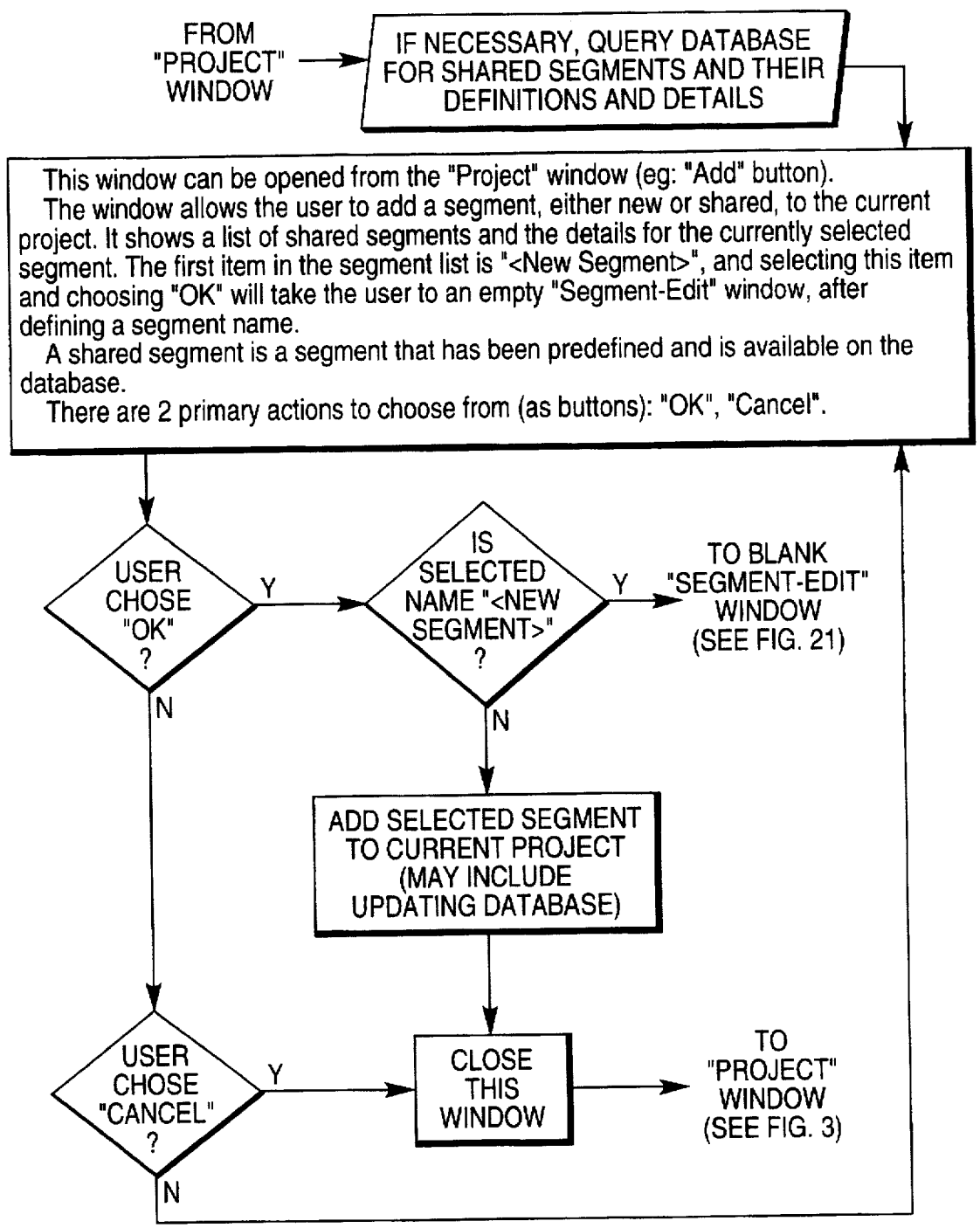
Figure 1U:
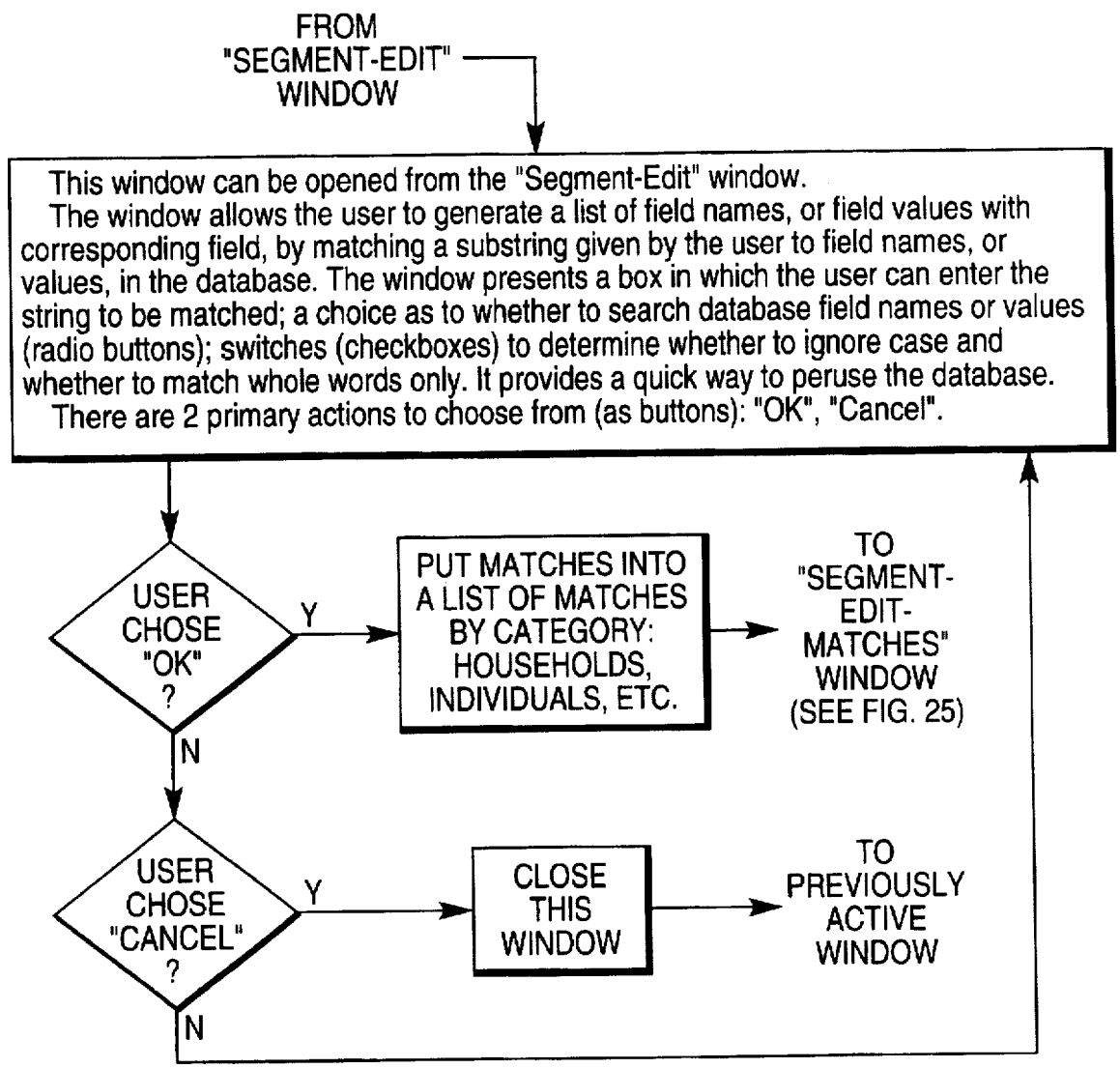
Figure 1V:
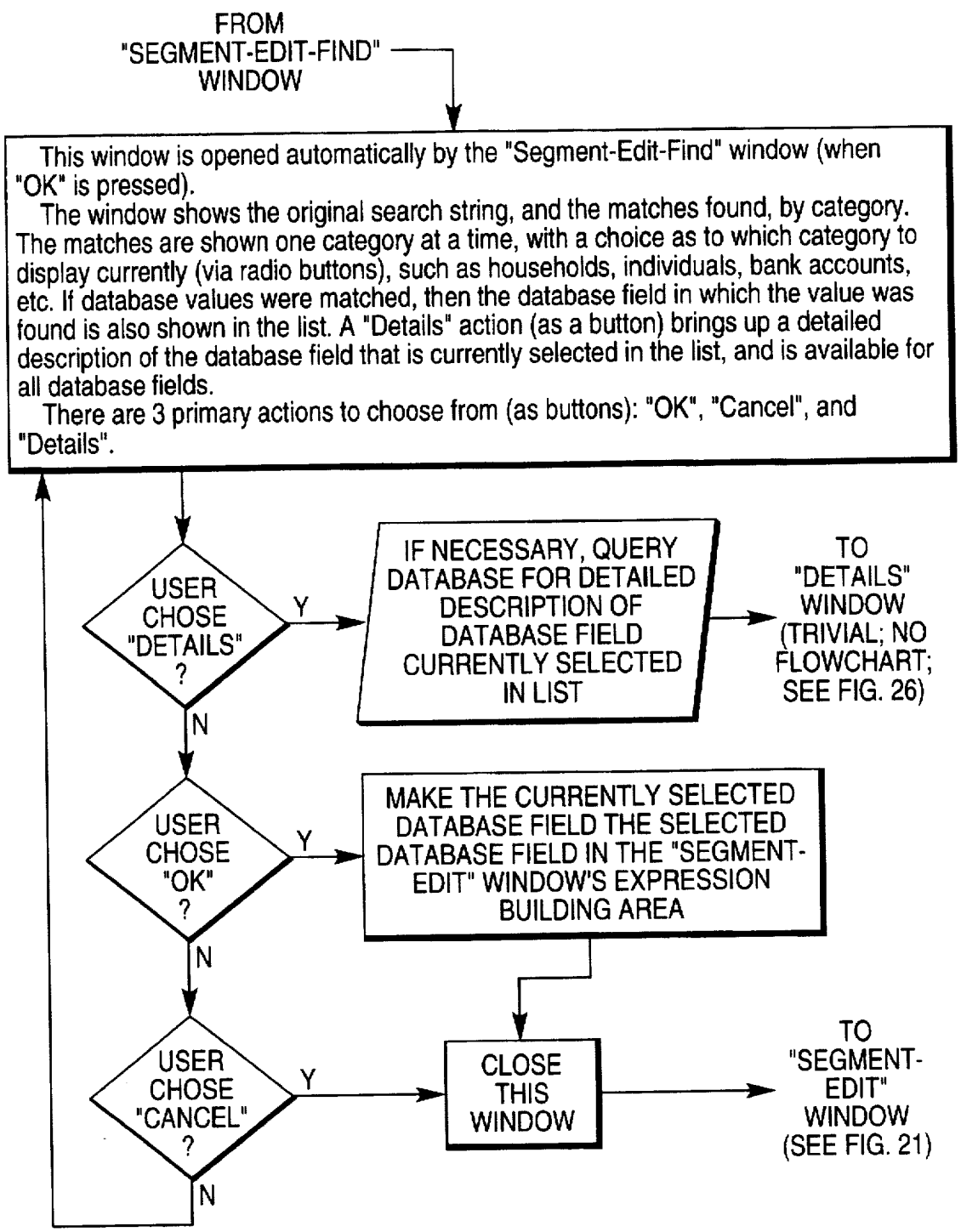
Figure 1:
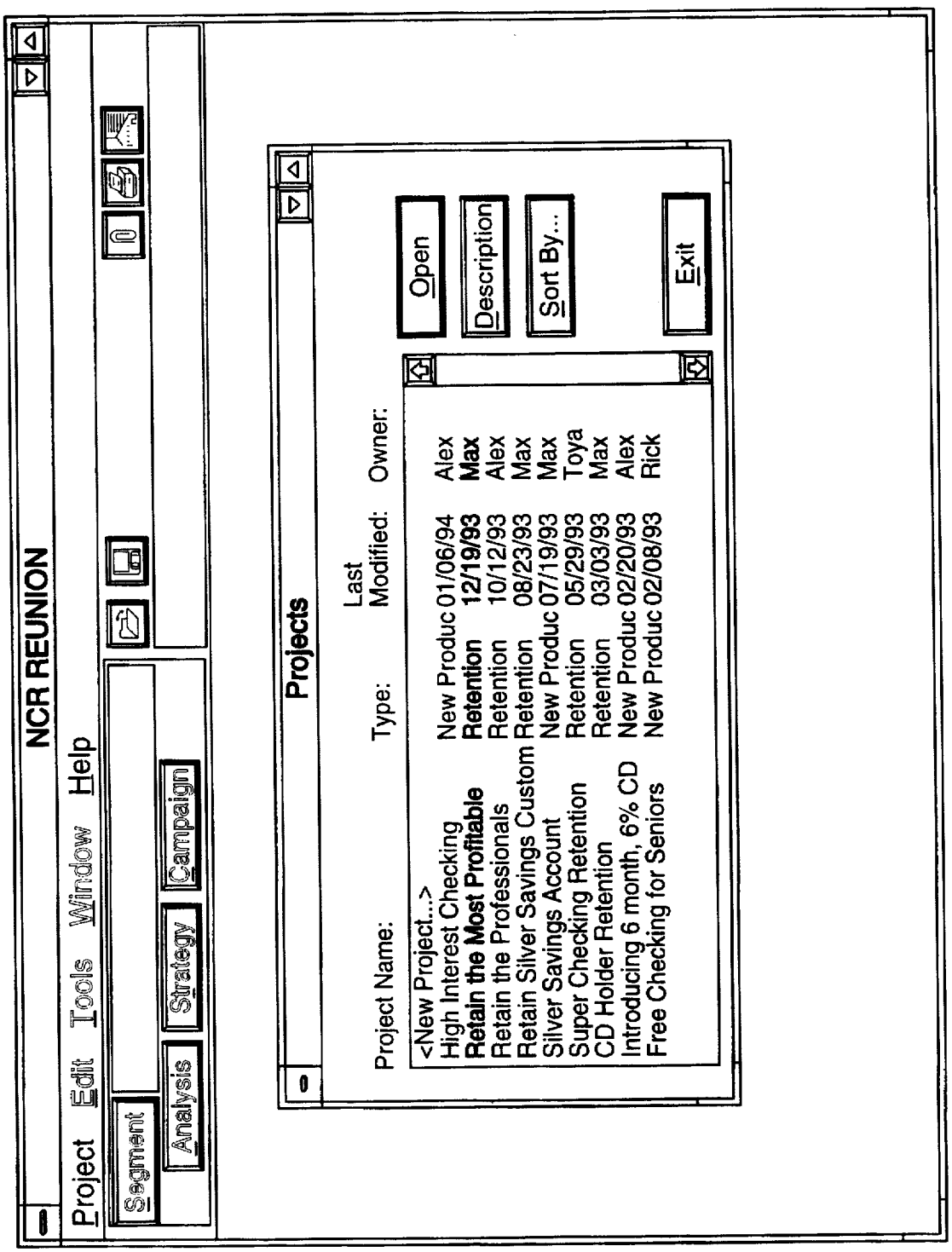
Figure 2:
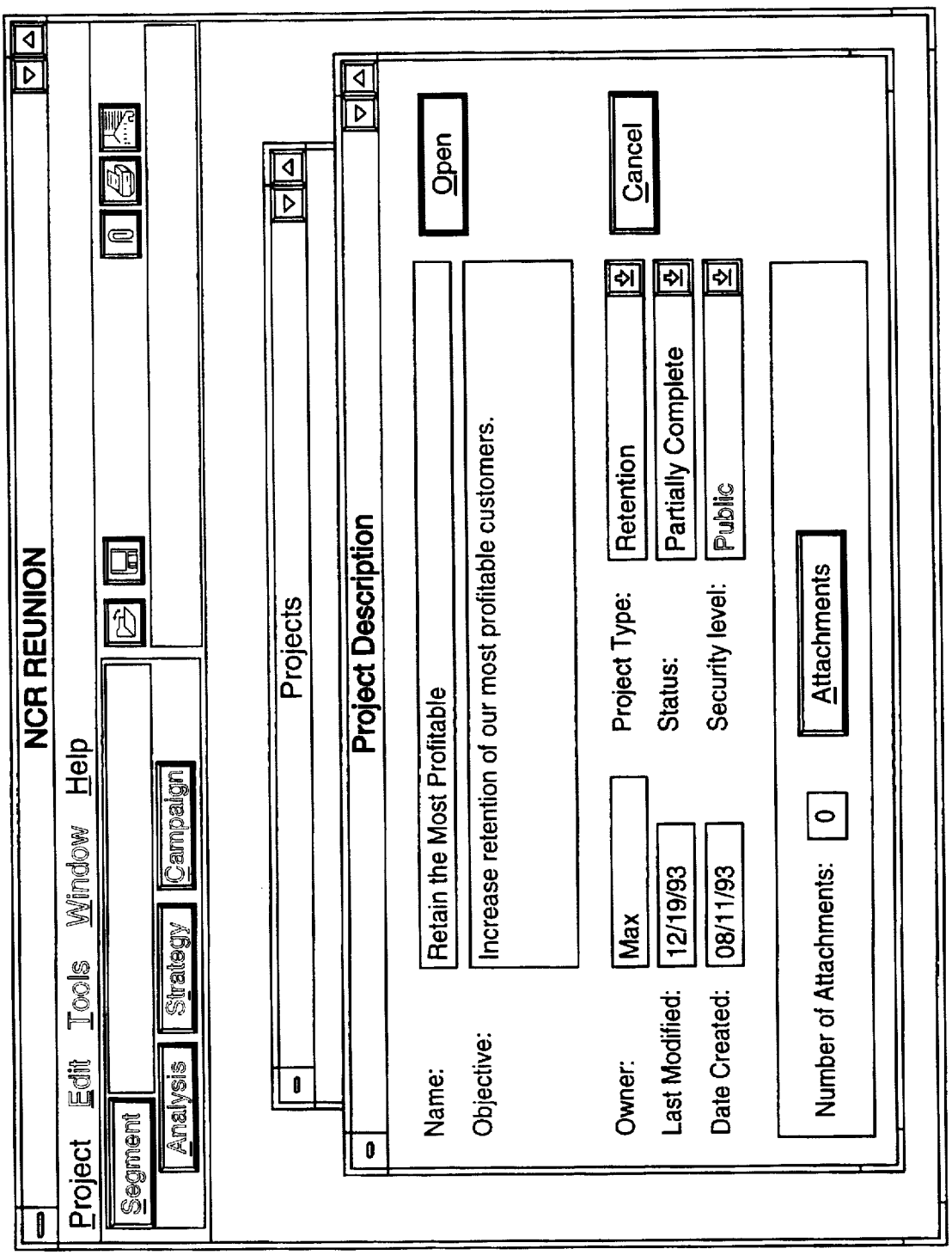

The invention displays the PROJECTS in the manner shown by the window in FIG. 1. FIG. 1A illustrates the relative position of this window within the logic of the flow chart: in FIG. 1A, the multiple PROJECTS, indicated by PROJ 1, PROJ 2, etc., correspond to the multiple PROJECTS in FIG. 1, from which a user may select a desired one.

FIG. 1C is a simplified version of FIG. 1A, but with captions added, which indicate the correspondence between the blocks in the flow chart (FIGS. 1A and 1C) and the actual, visual windows, shown in FIGS. 1–27.

Returning to FIG. 1, the invention displays a list of the PROJECTS. For example, the PROJECT entitled "Retain the Professionals" refers to a marketing program designed to retain the business of customers who are classified as professionals. Assume that the user selects the PROJECT entitled "Retain the Most Profitable,"as indicated by the highlighting of FIG. 1. The user performs the selection by actuating the OPEN button.

Segments

Figure 3:
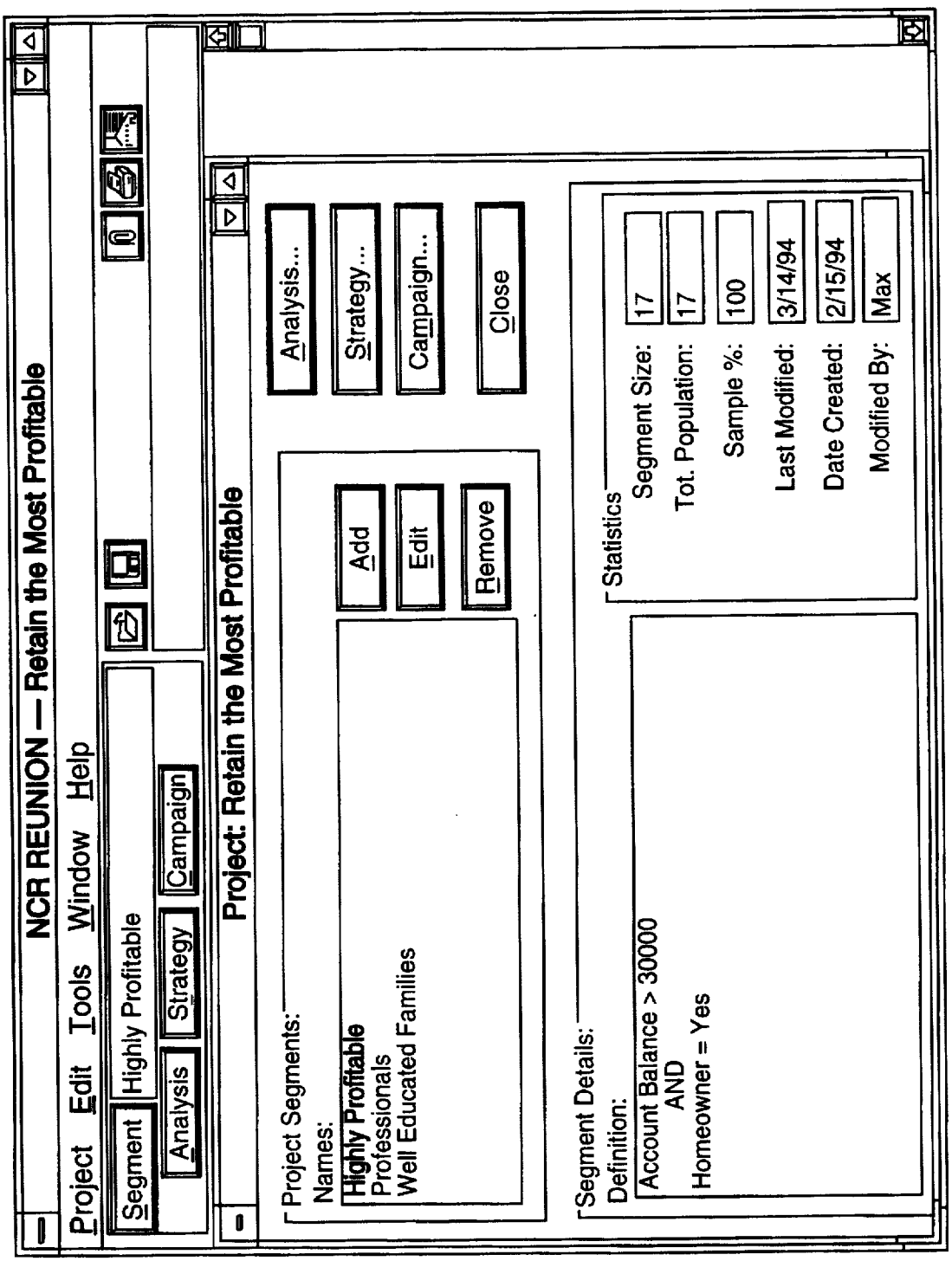

This selection causes the invention to display the window shown in FIG. 3, which displays a list of the SEGMENTS with which the PROJECT is concerned. The available SEGMENTS are indicated by the multiple SEGMENTS labeled SEG 1, SEG 2, etc, in FIG. 1A.

SEGMENTS, or MARKET SEGMENTS, are subsets of the bank's customer database: each SEGMENT is a collection of customers sharing common demographic characteristics, such as common geographic location, common professional status, common family size, etc.

As an example, FIG. 3 illustrates five SEGMENTs associated with the PROJECT of "Retain the Most Profitable." The "Highly Profitable" SEGMENT refers to the subset of customers which provide high profit to the bank. "Professionals" refers to customers whose occupation is classified in one of the traditional professions, and so on.

Level 2 Options

As the buttons on the right side of FIG. 3 indicate, there are several options available to the analyst for each SEGMENT. The ANALYSIS, STRATEGY, and CAMPAIGN options correspond to the like-named blocks in FIG. 1A, in LEVEL 3.

Analysis

Figure 4:
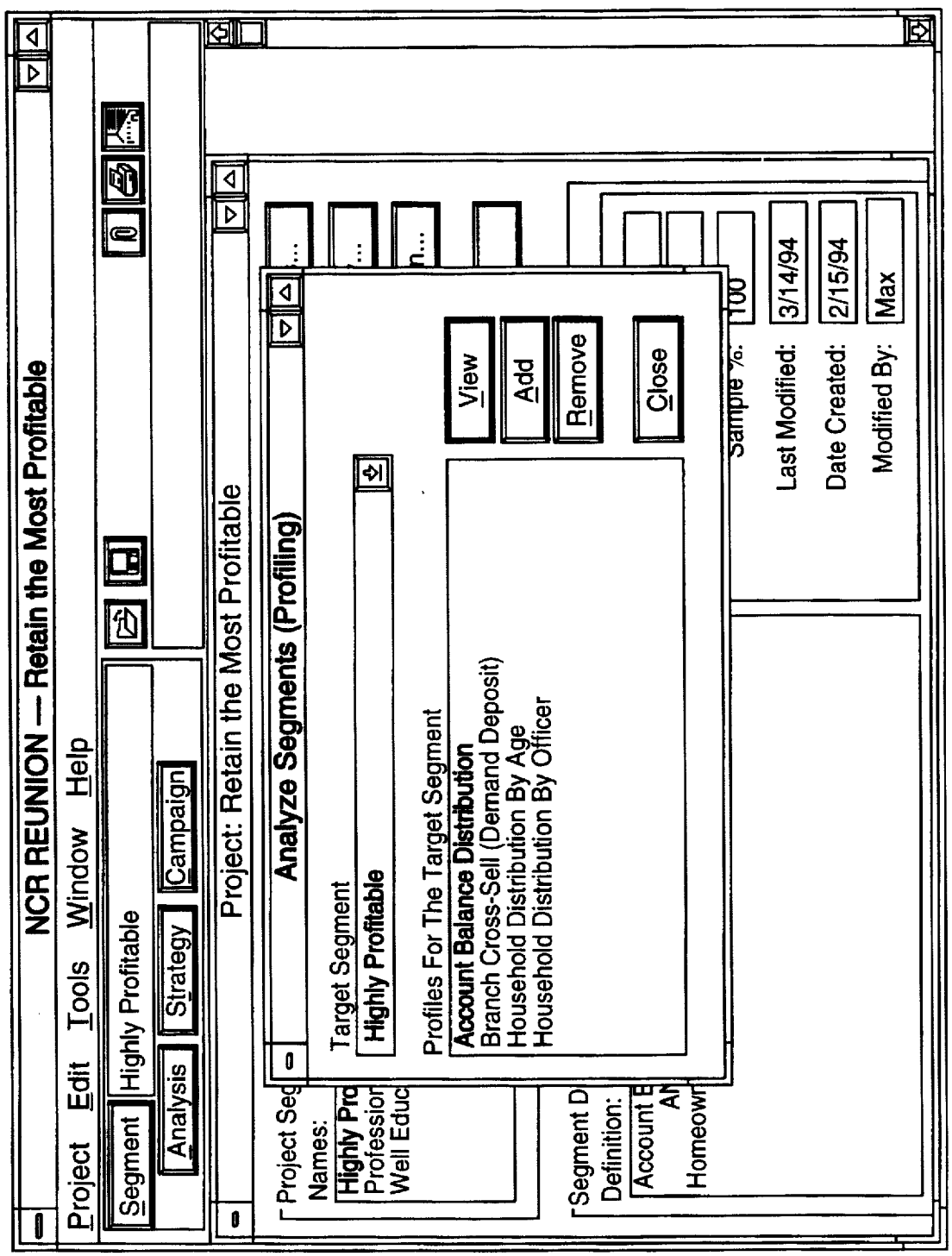
Figure 5:
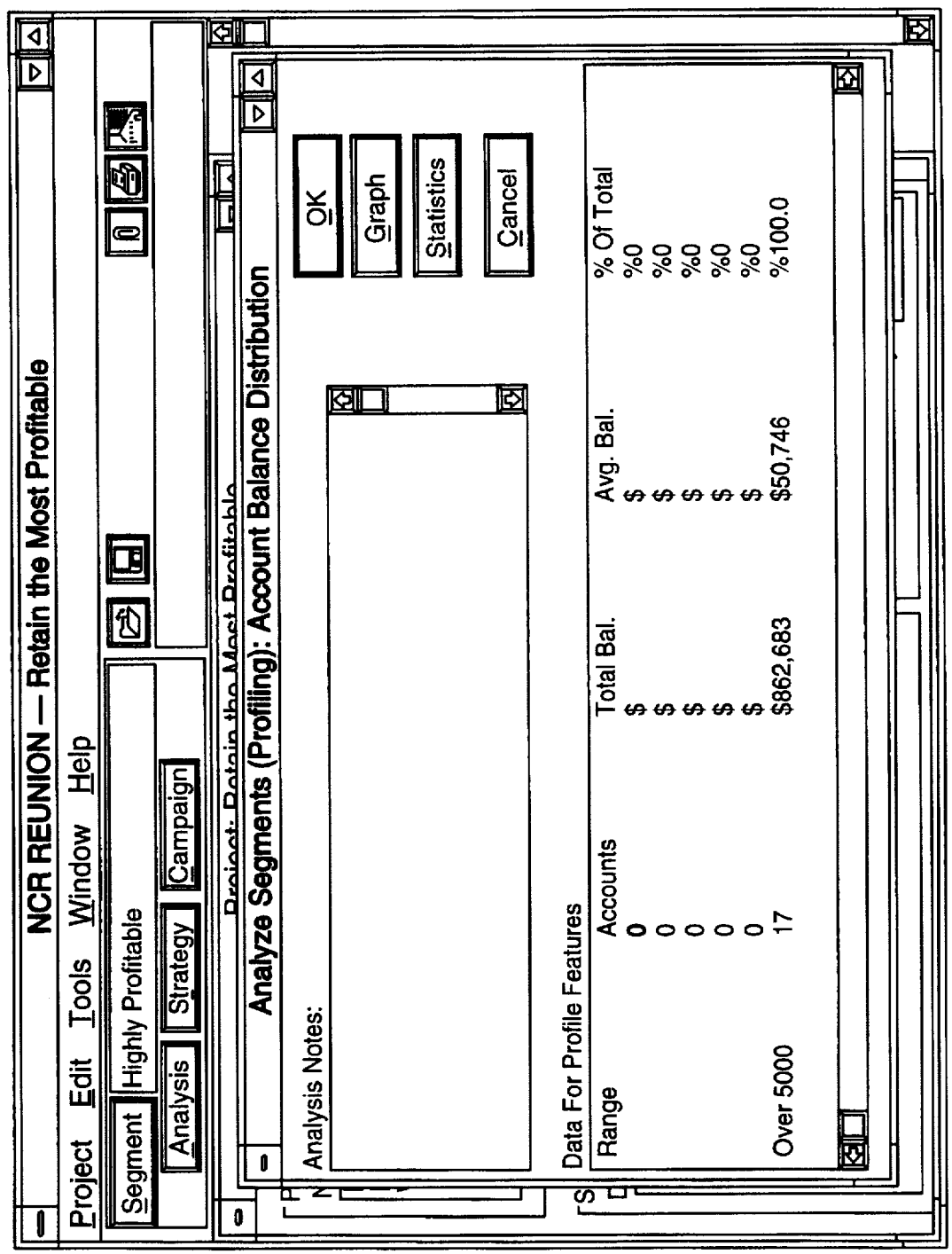
Figure 6:
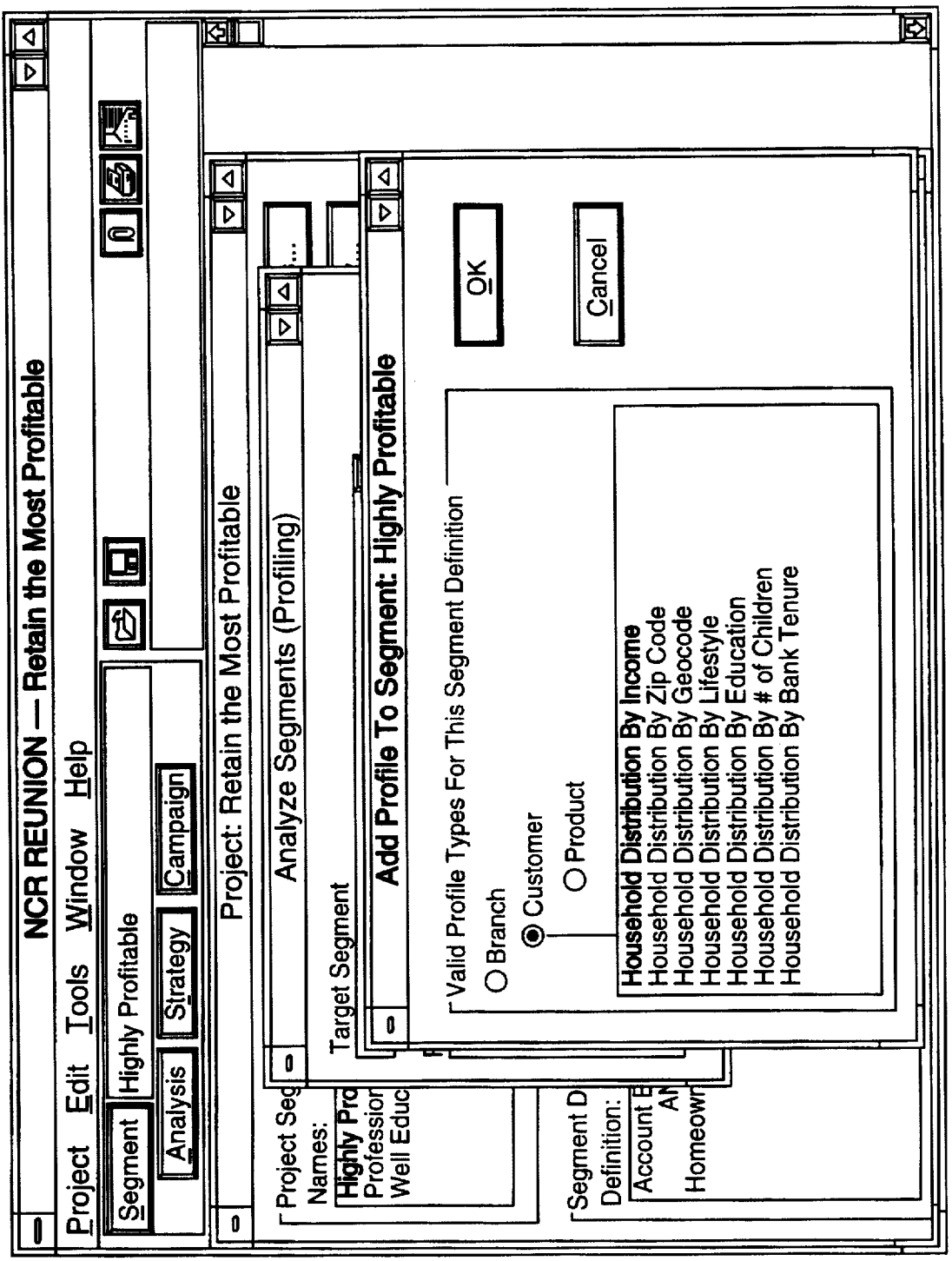

Selecting the ANALYSIS option causes the invention to produce the window shown in FIG. 4, which is represented by the ANALYSIS block in LEVEL 3 in FIG. 1A. Selecting the VIEW option in FIG. 4 causes the invention to produce the window shown in FIG. 5, as indicated by the block labeled VIEW DATA 1 in LEVEL 4 in FIG. 1A. (VIEW DATA 1 is shorthand notation for the option of viewing the data relating to segment 1.) FIG. 5 illustrates a view of this data. The data is also called a data profile, or simply a profile.

The window shown in FIG. 5 displays the data in tabular format, as shown at the bottom of the Figure. The user can display the data graphically, by selecting the GRAPH option, which produces the window shown in FIG. 7, and indicated by the block GRAPH in FIG. 1A, in LEVEL 5, below the block VIEW DATA 1.

Figure 18:
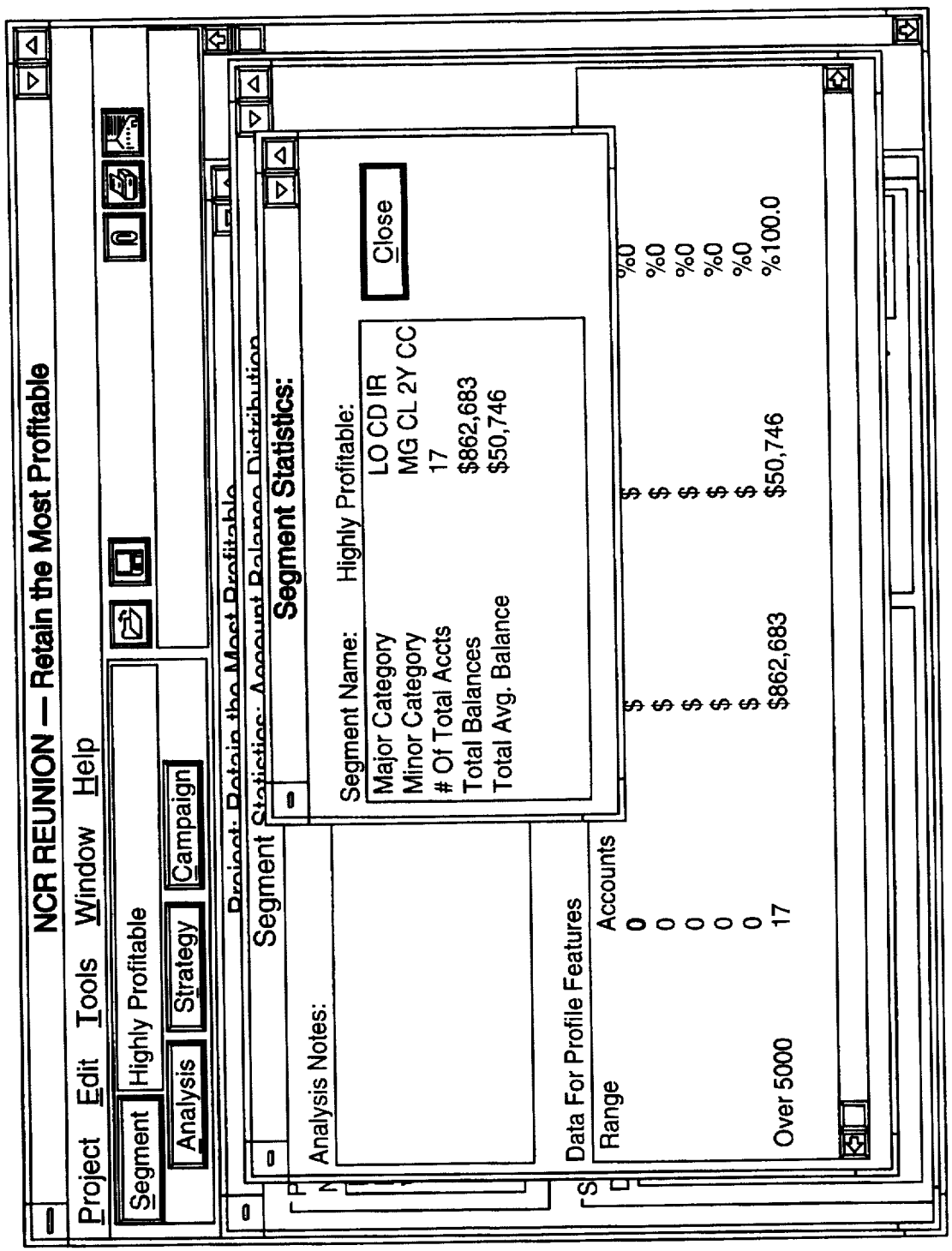

The user, when in the window of FIG. 5, can also select the STATISTICS option, which produces the window shown in FIG. 18. This window presents the data from a different conceptual perspective.

Strategy

In FIG. 3, a second option available is STRATEGY, indicated by the button of that name. This option is also indicated by the block STRATEGY in LEVEL 3 in FIG. 1A. Actuating this button produces the window shown in FIG. 8.

STRATEGIEs, in general, indicate goals toward which the bank is working, with respect to the SEGMENT in question. For example, as FIG. 8 indicates, one STRATEGY targeted for the SEGMENT of "Retain Most Profitable" PROJECT to "Locate ATM's at Fairfield Mall." As the discussion shown in the rest of the window indicates, the STRATEGY involves positioning of Automatic Teller Machines (ATMs) at Fairfield Mall.

STRATEGIEs are, in general, informational, and for the benefit of the user. That is, no great amount of information processing or display options are made available to the user.

Campaign

The third option available in FIG. 3 is the CAMPAIGN option, as indicated by the button so labeled, and by the CAMPAIGN block in FIG. 1A, LEVEL 3. CAMPAIGN refers to specific actions taken to be taken in pursuit of a STRATEGY.

Figure 10:
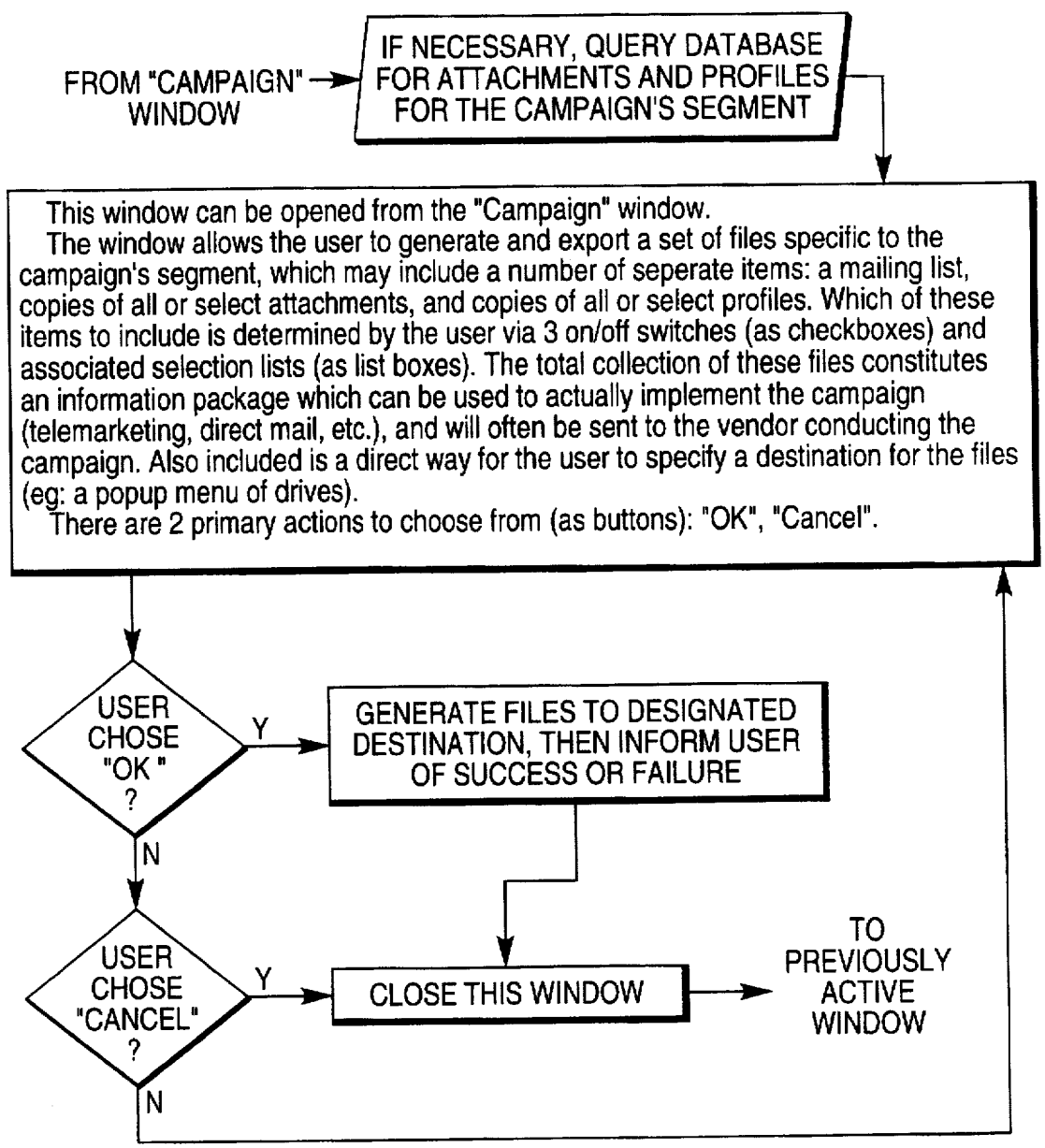

Selecting this option produces the window shown in FIG. 10. In FIG. 10, several options are available to the analyst.

Campaign—Mailing List

Figure 11:
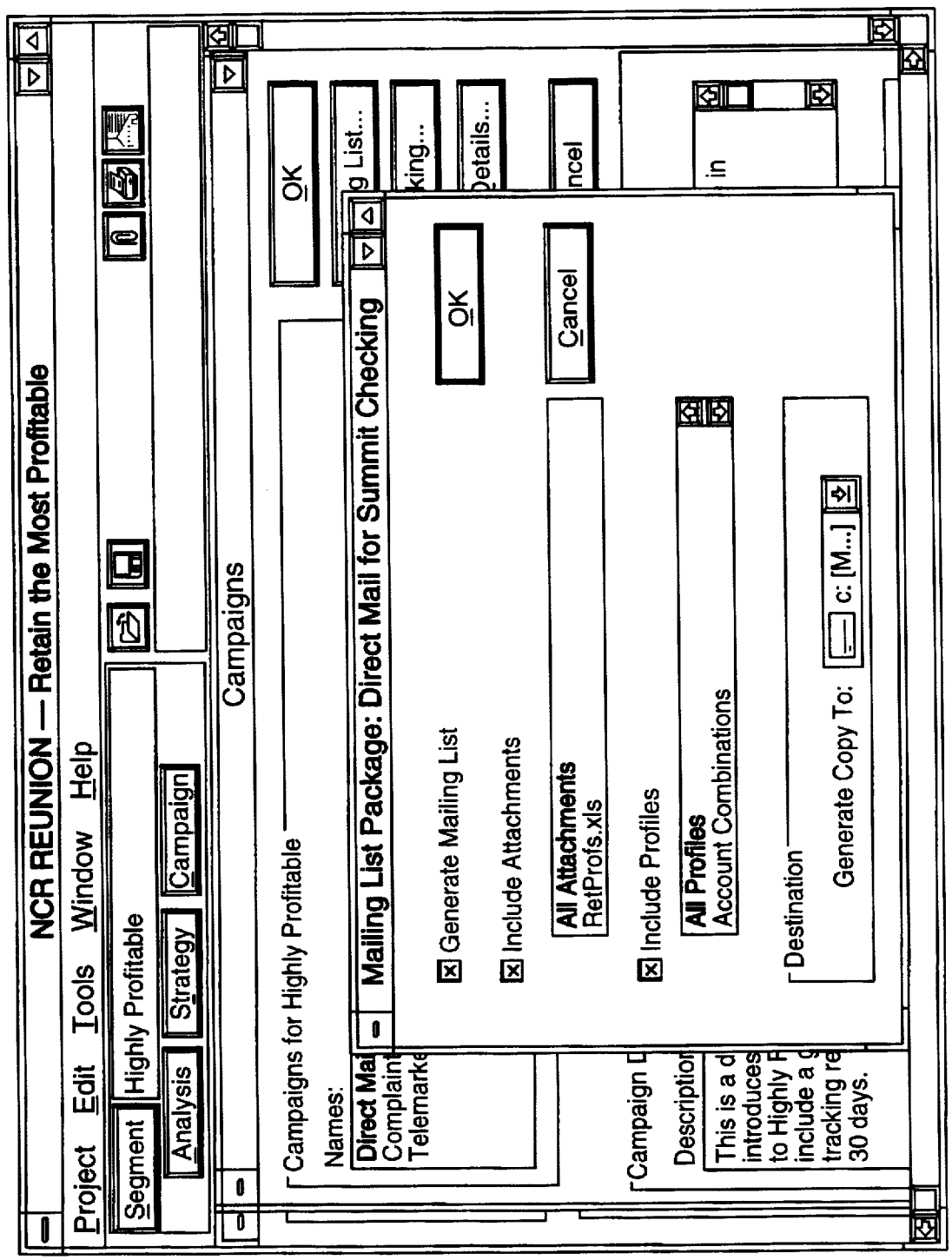

The MAILING LIST option produces the window shown in FIG. 11, which corresponds to the block labeled MAIL, in LEVEL 4, in FIG. 1A. This window allows the user to generate a mailing list which, as the name implies, is a list of addresses of persons within the SEGMENT in question. In this case, the SEGMENT is the "Highly Profitable" group of customers, and the SEGMENT is associated with the PROJECT "Retain the Most Profitable."

The mailing list is given to a mailing service which mails a pamphlet, or other correspondence, to the persons on the list. (The invention, in general, is not involved with the creation, printing, or delivery of this correspondence to, or by, the mailing service.)

The window of FIG. 11 allows the user to select other items to be included with the correspondence, such as ATTACHMENTS. ATTACHMENTS are defined below, but, in general, are computer files, generated by programs, which may contain information relevant to a PROJECT. For example, a spreadsheet may produce a file of data about customers which is of interest to a PROJECT. This file can be ATTACHED to a PROJECT by an option in a pull-down menu which depends from the PROJECT heading in the menu bar, as described later.

The invention includes a copy of the ATTACHMENTS with the mailing list sent to the mailing service, so that the service can send the ATTACHMENTS along with the correspondence.

A copy of the mailing list is stored on the drive selected in the box labeled "Generate Copy to:". If the invention is connected to a network, then the drives available for selection will include drives in addition to those available on the user's own computer. Thus, for example, if the mailing service which the user employs to actually send the mailing is connected to the network, the user can directly deliver the MAILING LIST to the service, using this option.

The MAILING LIST need not include every person in a SEGMENT. As the window in Figure indicates, the "CONTROL GROUP SIZE"

Campaign—Tracking

A second option available in FIG. 10 is TRACKING. This option produces the window shown in FIG. 12, which gives information about the response of customers to a campaign.

In general, the tracking is performed by third parties, who may be employees of the bank, and, in general, are different from the market analysts (who are the parties expected to be the primary user of the invention). The third party can be termed an INVESTIGATOR. The third party obtains information from customers who were contacted during the CAMPAIGN, and records the information in the customer database of the bank.

As an example, assume that the CAMPAIGN intends to sell bonds costing $1,000 each. As indicated in FIG. 12, 5,000 out of 10,000 members of the SEGMENT "High Interest" were contacted by mail during the CAMPAIGN. 1,000 of them responded, as indicated by the row labeled "Response." (The response may have taken the form of returning a postcard requesting more information about the bonds.)

Of the 1,000 who responded, 600 of them purchased bonds, as indicated. 600 purchases of bonds costing $1,000 represent $600,000, as indicated.

Figure 12:
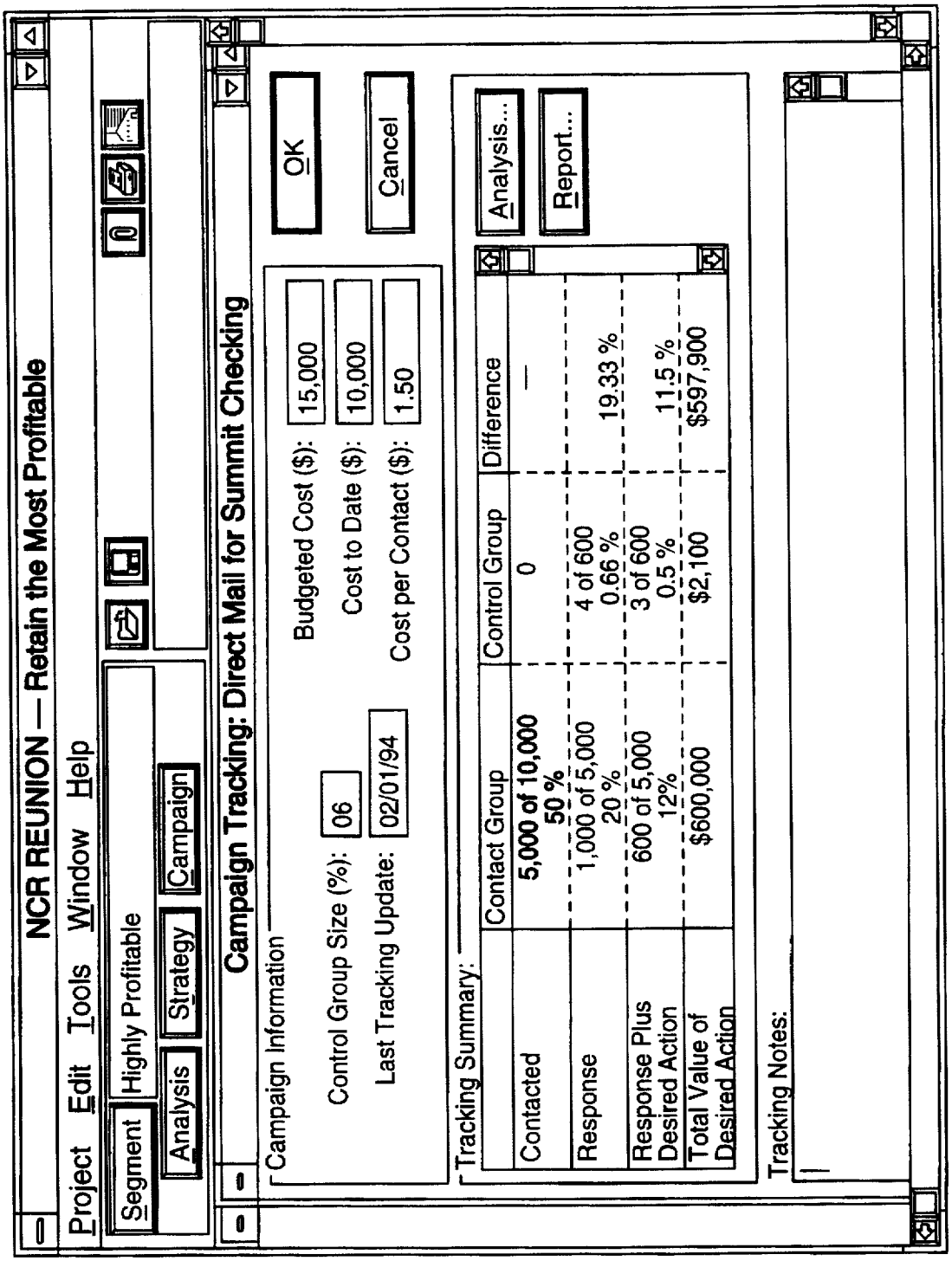

The INVESTIGATOR collects all, or part, of the data shown in FIG. 12. In practice, the INVESTIGATOR supplies the data on magnetic media to a system administrator who manages the database. The system administrator updates the database using the data, thereby allowing the analysts to obtain the window shown in FIG. 12.

A user can make notes in the sub-window in FIG. 12 entitled "Tracking Notes." These notes become associated with this window, and appear whenever this window, for this CAMPAIGN, for this SEGMENT, is displayed.

Campaign—Tracking—Analysis

The ANALYSIS option of FIG. 12 produces a window substantially identical to that of FIG. 5, which allows the user to view the data associated with the SEGMENT in tabular or graphical format.

Campaign—Tracking—Analysis

Figure 28:
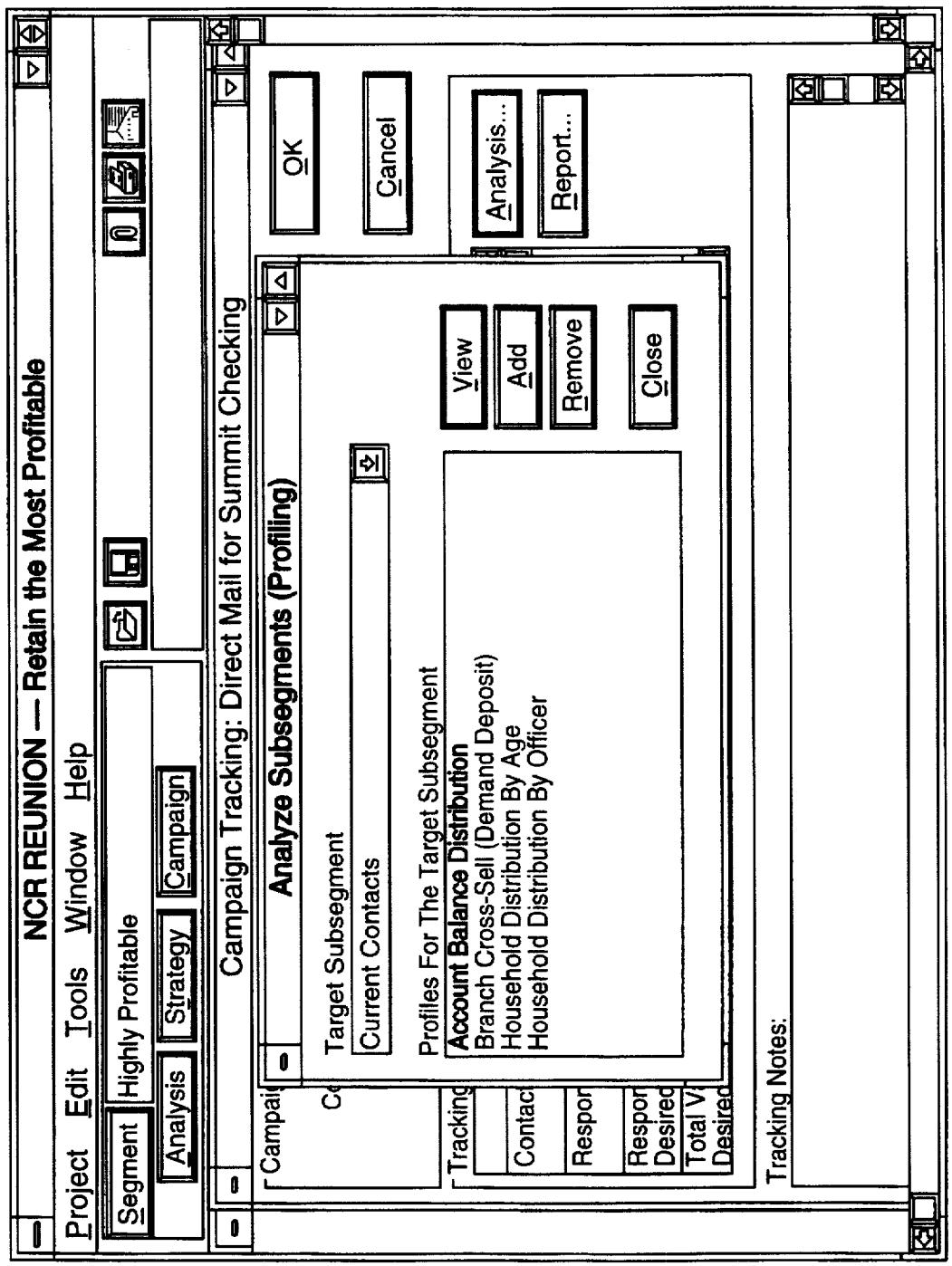

Choosing the ANALYSIS option in FIG. 12 produces the window shown in FIG. 28. This window allows a user to select a SUBSEGMENT, which is a subset of persons within a SEGMENT. This selection is indicated by the block SELECT SUB at LEVEL 7 in FIG. 1B.

The VIEW option in FIG. 28 produces a window very similar to that shown in FIG. 5, wherein the user has the option of viewing the data in tabular format, or in graphical format. These options are indicated at LEVEL 9 in FIG. 1B.

Campaign—Tracking—Report

The REPORT option in FIG. 12 allows a user to select data from the PROJECT, and order that a report be printed, either in hard or soft copy format.

Campaign—Details

Figure 15:
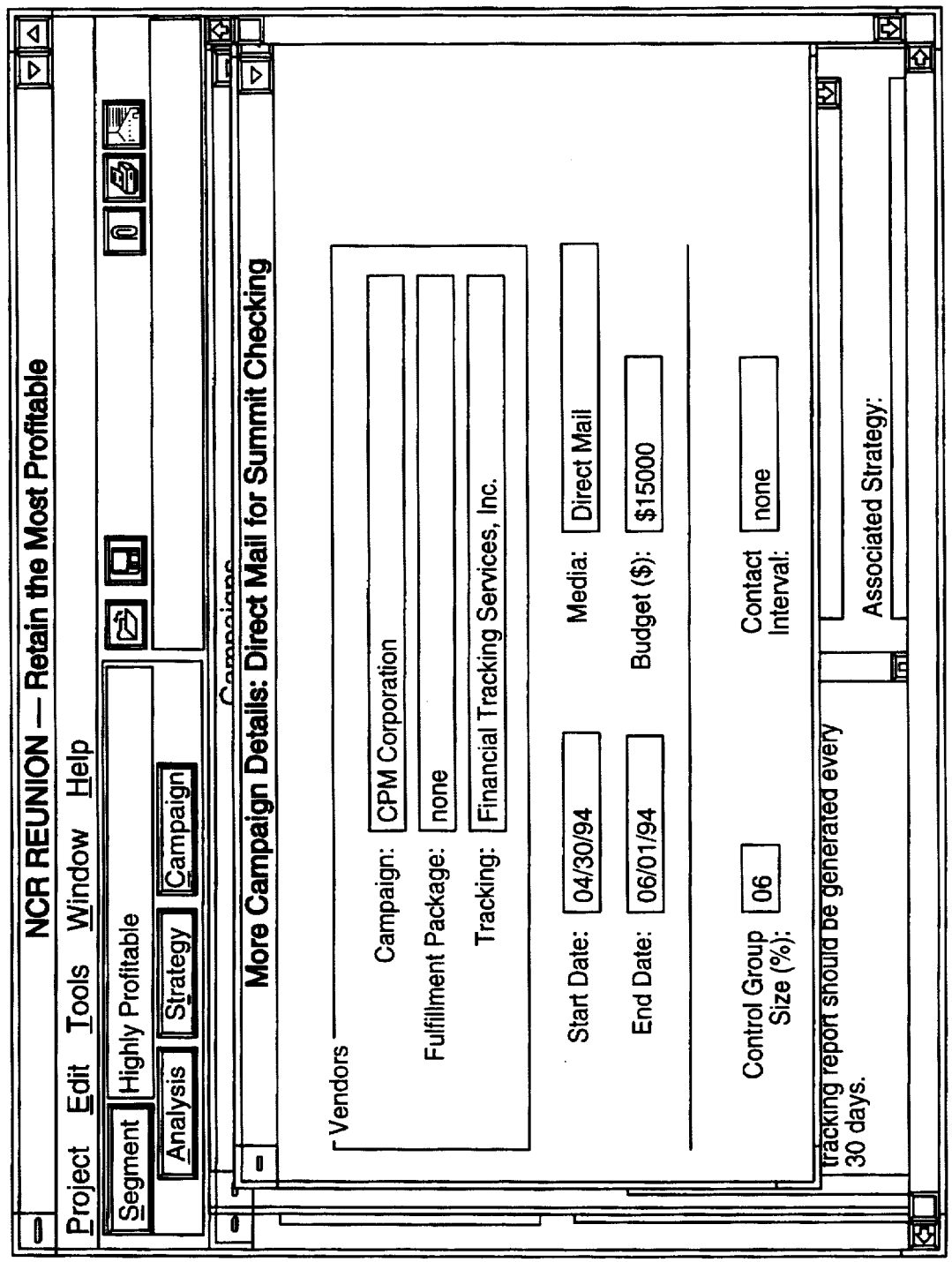
Figure 16:
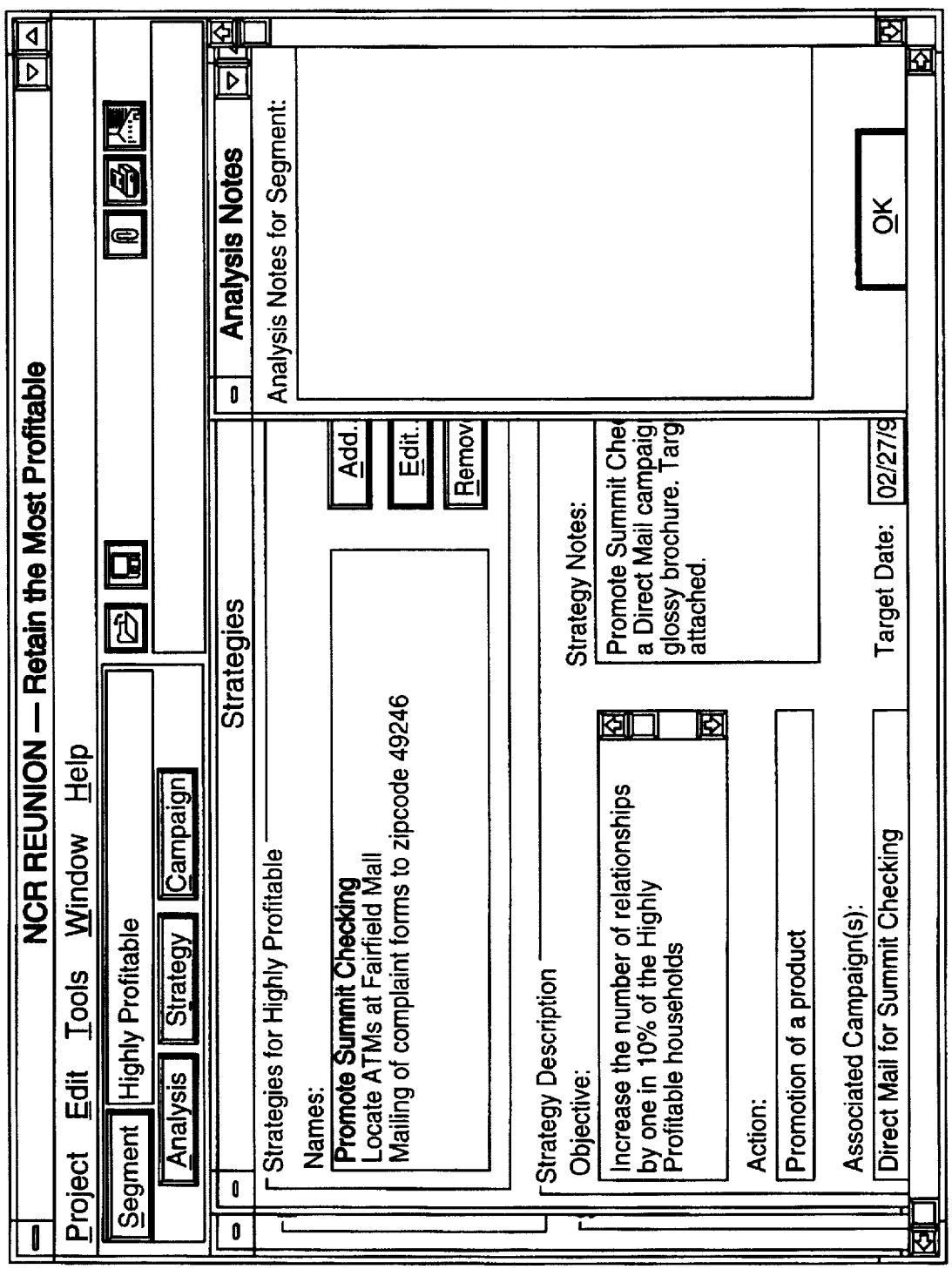
Figure 17:
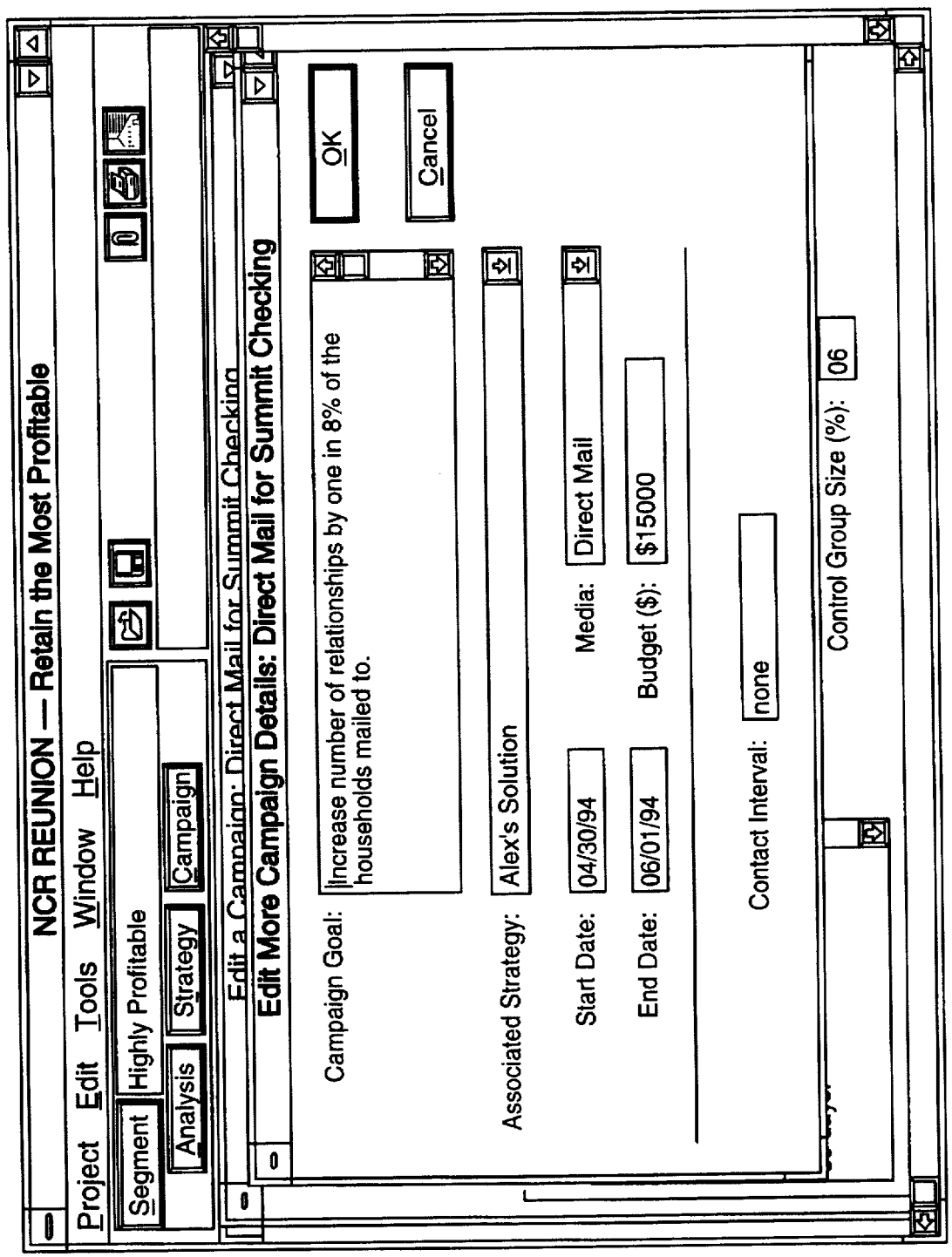

The option MORE DETAILS in FIG. 10, also indicated by the VIEW DETAILS block in FIG. 1C, produces the window shown in FIG. 15, which provides details concerning the mailing campaign itself, such as costs and identity of the mailing service.

Highly Detailed Flowchart

The preceding discussion gave a summary overview of the operation of the invention. The Flowchart shown in FIGS. 1D–1V, which refers to FIGS. 1–27, provides a highly detailed description of the invention, from which computer code can be written to run on the particular computer chosen to implement the invention.

Significant Features

1. The invention provides a Graphical User Interface (GUI) for dealing with a computer database of bank customers. The GUI has several important characteristics.

One Characteristic

One is that the GUI always presents the user with at least one option, and frequently many options, from which to choose actions to take. The significance of this presentation can perhaps best be explained by reference to other database interfaces which operate differently.

For example, in a computerized library card catalog, a user may be required to type a command. One command may be "a=Hemingway" which orders the database to search for all books in which the author's name (indicated by the "a") is "Hemingway." The card catalog then presents a list of books authored by Hemingways.

When the user is presented with the list, the user may find far more Hemingways than the user expected, or far more books written by a single Hemingway than expected, and the user may wish to perform another search, but only on the search results displayed. The hypothetical card catalog will allow this, but requires a special sequence of commands. This special sequence presents difficulty for the user, because, unless the user is an experienced searcher, the user probably does not know the sequence.

In contrast to the card catalog example, the invention always displays a list of all possible commands available to the user on the screens. The invention does not merely display a partial list, or no list at all. Restated, with the invention, the user does not type commands, but selects them from menus of available commands.

Further yet, the presentation of available commands is presented in a logical fashion. For example, the list of available PROJECTs shown in FIG. 1 provides the options of OPEN, DESCRIPTION, SORT BY, and EXIT. These are the options relevant to a list of PROJECTs, and to selecting a project (by actuating the OPEN button).

In contrast, the options shown in FIG. 3, such as ANALYSIS, STRATEGY, and CAMPAIGN, are not relevant to the list of PROJECTS of FIG. 1, because these options operate on STRATEGIES, not on PROFILES.

Therefore, the invention (1) presents all available options on the display (though not all at once) by means of a GUI;

(2) collects the options in groups; and (3) associates the groups with the COMPONENTS on which the options operate.

Second Characteristic

A second characteristic is that the invention makes it extremely difficult, if not impossible, for the user to get lost.

FIGS. 1A and 1B illustrates one reason for this. The logic of the interface can be conceived as having nine levels, as indicated. It is, in general, always possible to exit a level and return to the previous level, by choosing the CLOSE or CANCEL options. For example, the CANCEL option of FIG. 2 causes a return to the window of FIG. 1. Thus, a user can proceed, following the arrows in FIGS. 1A and 1B, along any selected top-to-bottom path, and then retrace the steps, bottom-to-top, by using the CLOSE and CANCEL options in the corresponding windows, in the FIGS. indicated in FIG. 1C.

In addition, the invention superimposes logical pathways which reduce the number of levels, or provide short-cuts. These pathways are indicated by the dotted lines in FIGS. 1A and 1B. Given these pathways, a user can (a) jump from any level to LEVEL 1 by using no more than one command and (b) jump to LEVEL 3 from any lower level, using a single command. Thus, the hierarchy effectively contains no more than three levels: LEVEL 1, LEVEL 3, and all LEVELS lower than LEVEL 3.

For example, a user located in the ANALYZE block shown in FIG. 28 can follow path 4 in FIG. 1A to the CAMPAIGN block. This is done by using the CAMPAIGN option in FIG. 28, located near the upper left corner of the window. This option leads the user to window shown in FIG. 12.

In FIG. 12, the user can follow path 5 in FIG. 1A to LEVEL 1. This is done by using the PROJECT pull-down menu in FIG. 12. Pulling the menu down produces the window shown in FIG. 29. Selecting the OPEN option produces the window shown in FIG. 1. The user can select a new project.

In this excursion, the user, in effect, saw three levels, even though the user initially passed through six levels to get from PROJ 3 to REPORT.

Therefore, the invention
(1) presents all available options in groups on the display (as opposed to requiring a user to type commands) and
(2) allows the user to proceed, in a forward direction, through the options in multiple levels (nine levels are shown in FIGS. 1A and 1B), but to return to the starting level by travelling through a reduced number of levels (three levels are shown in FIGS. 1A and 1B).

Third Characteristic

A third characteristic is that the following three features make the invention extremely simple to learn and to use:
(1) the graphical display of all options,
(2) a small number of forward levels (nine), plus
(3) a lesser number of available reverse levels (three).

The invention is easy to learn, because the user can learn the major features of the invention in a short period of time, using a trial-and-error approach.

Figure 29:
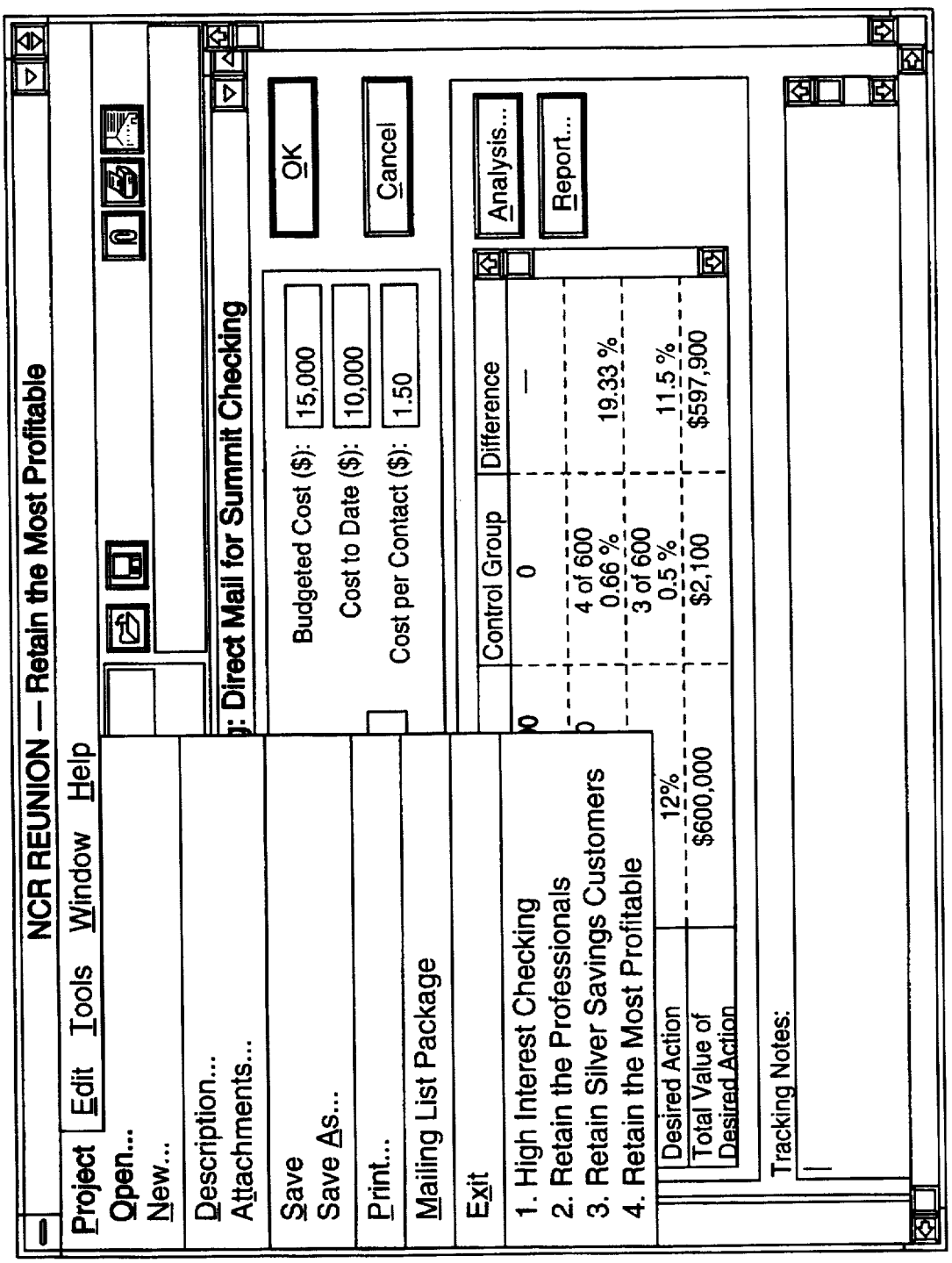

For example, consider a user having the following qualifications:

(1) The user is familiar with the use of a pointing device to select options, such as the pull-down menu of FIG. 29, and the OPEN option in FIG. 1, and to highlight, as the phrase "Retain the Most Profitable" is highlighted in FIG. 1.
(2) The user understands the overall concept of the invention, as described in the "Overview of the Invention," which is about seven pages of double-spaced text, or about 1750 words.

Given these qualifications, there is evidence to indicate that this user can learn to do the following, with no additional instruction, in less than ten minutes: cause the invention to produce a GRAPH of selected data for a selected SEGMENT.

Figure 7:
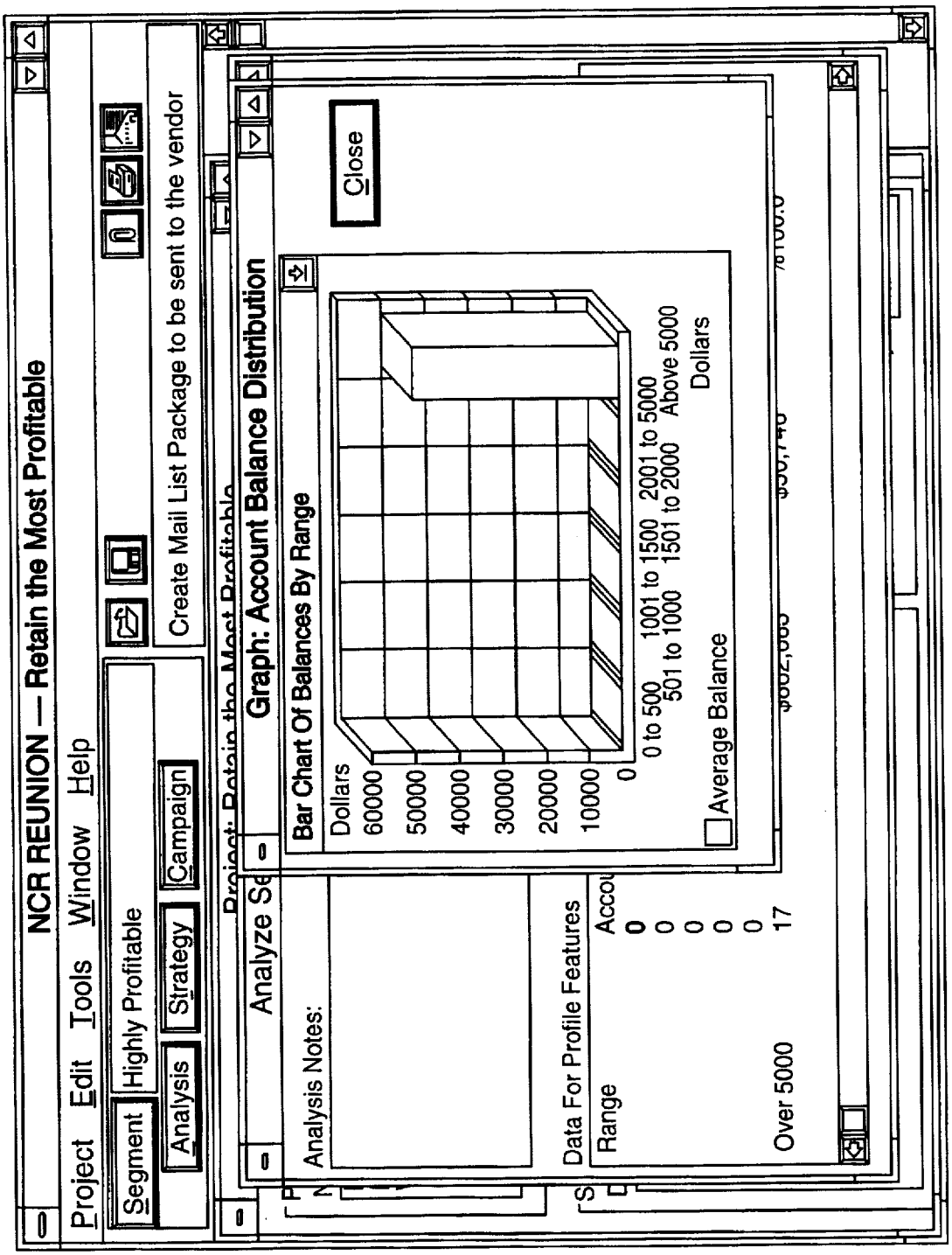

The user would produce the GRAPH by the following sequence of steps:
a) select a PROJECT (using the OPEN option in FIG. 1);
b) choose to view data concerning a SEGMENT of the PROJECT (by doing the following:
  i) selecting a SEGMENT, by highlighting a SEGMENT in FIG. 3,
  ii) by selecting the ANALYSIS option in FIG. 3, which produces FIG. 4,
  iii) by selecting a data type, or PROFILE, in FIG. 4, by highlighting,
  iv) by selecting VIEW in FIG. 4, which produces FIG. 5, and
  v) by selecting GRAPH in FIG. 5, which produces FIG. 7.

If the reader simulates this sequence events, by looking at FIGS. 1, 3, 4, 5, and 7, in sequence, the reader will see that only about one-half dozen clicks of a pointing device are required.

Figure 8:
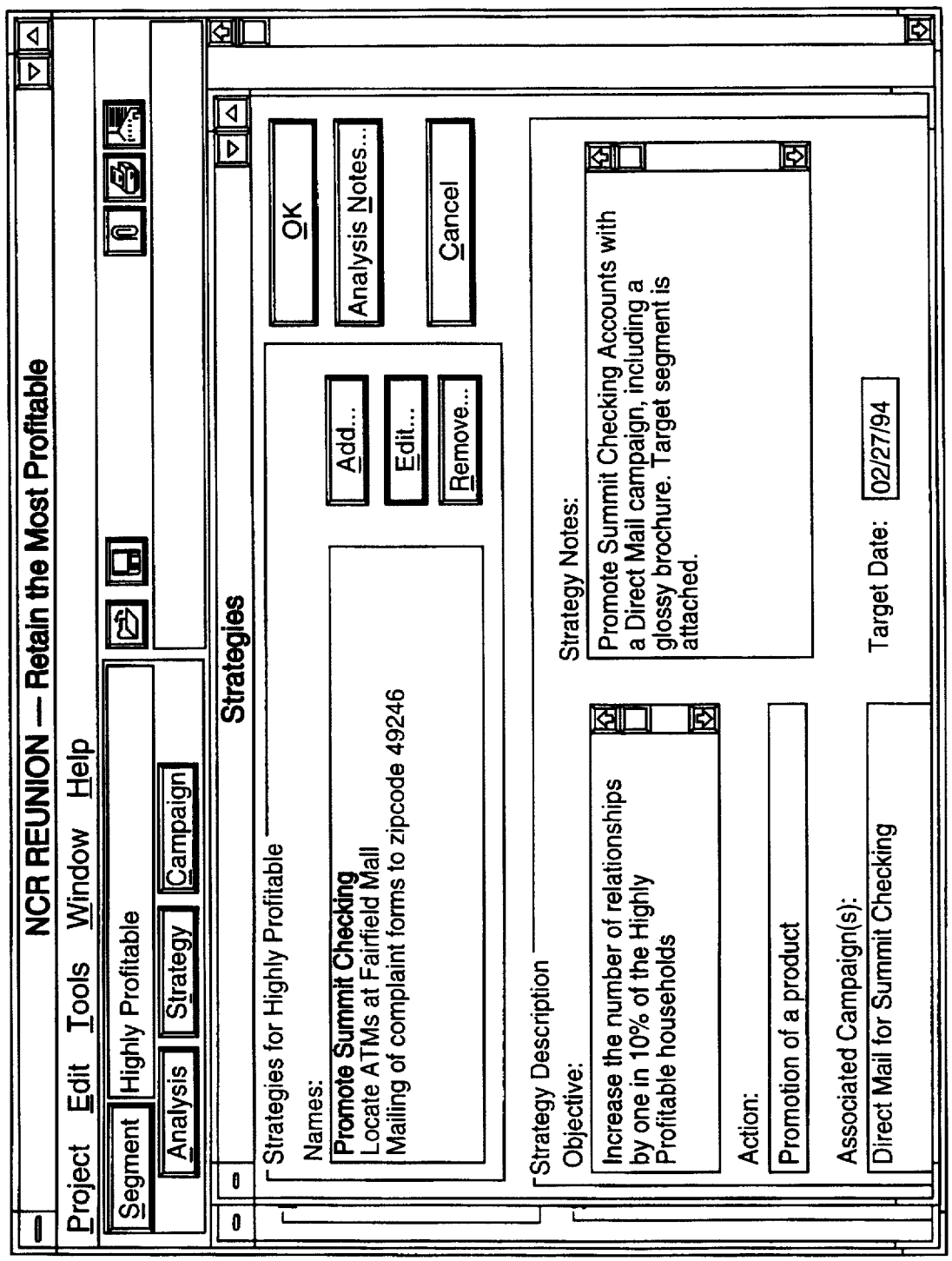
Figure 9:
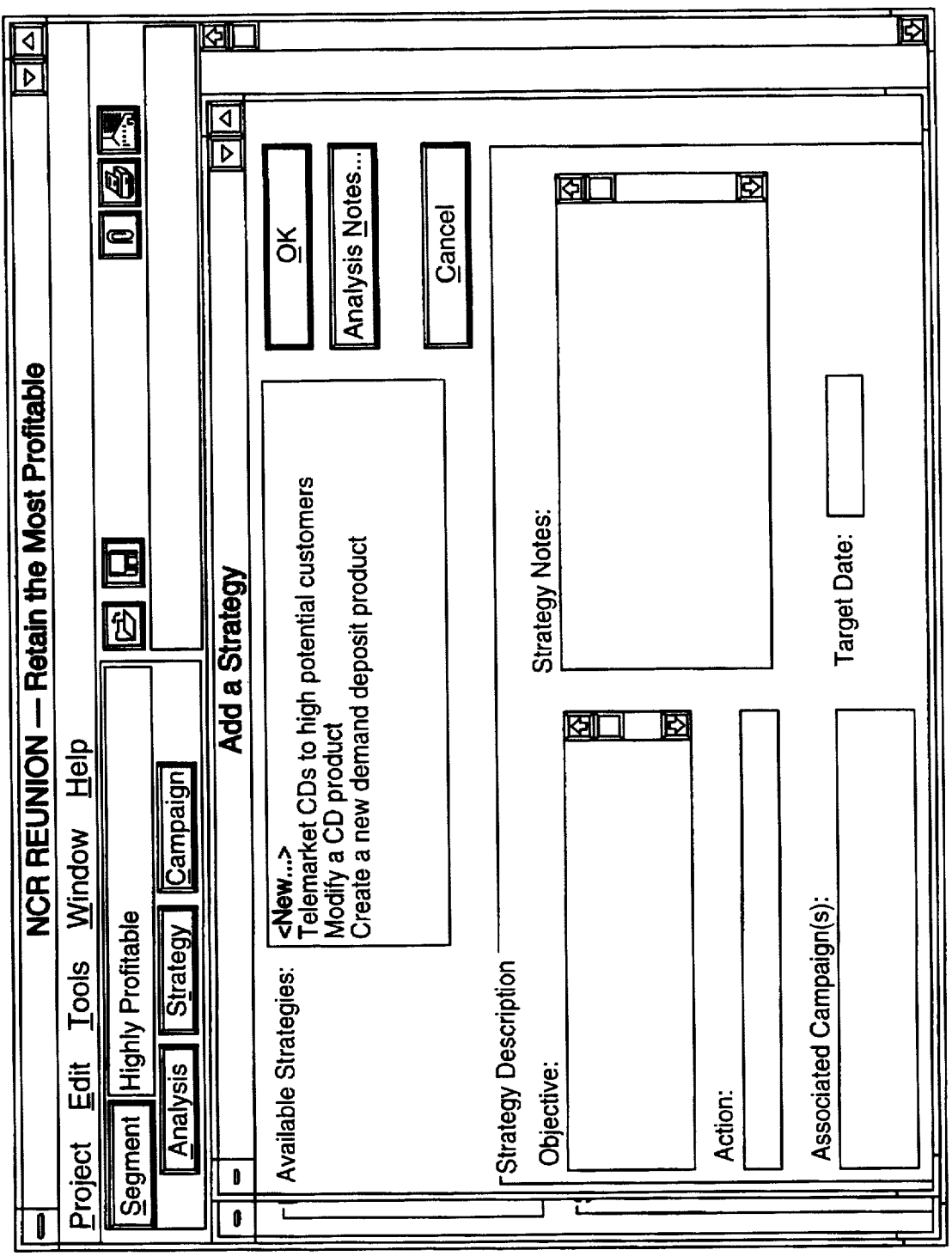
Figure 10:
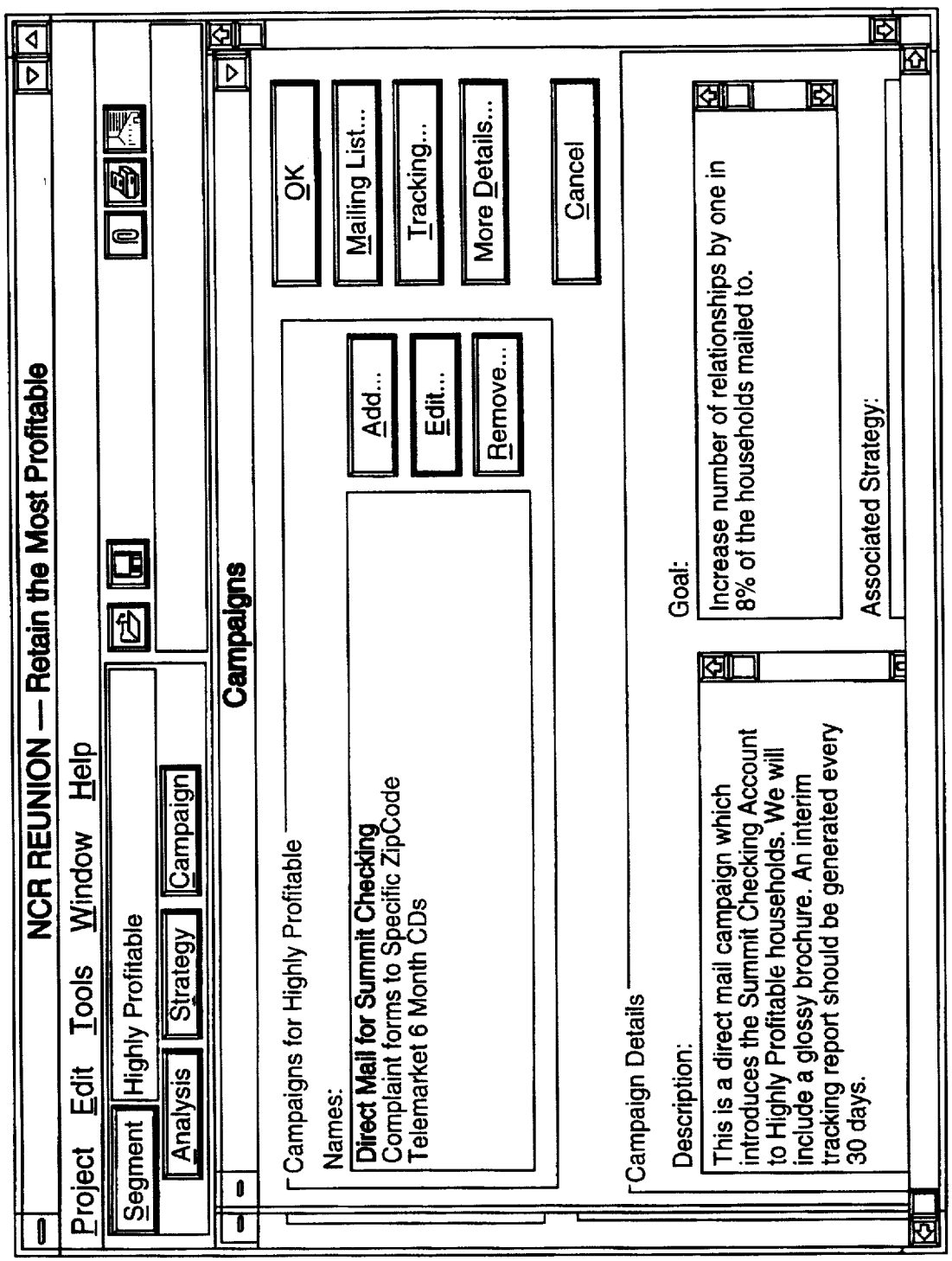
Figure 13:
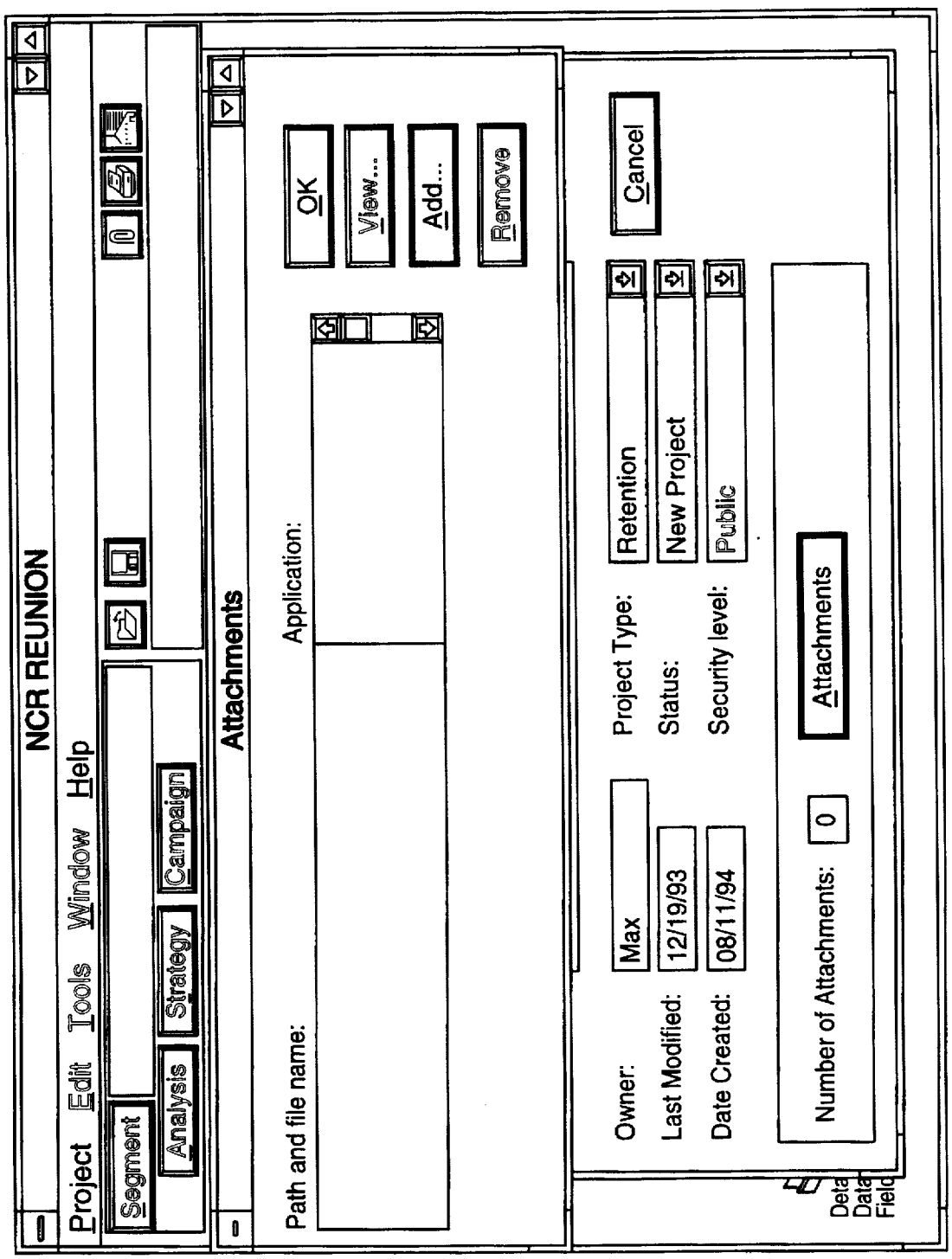
Figure 14:
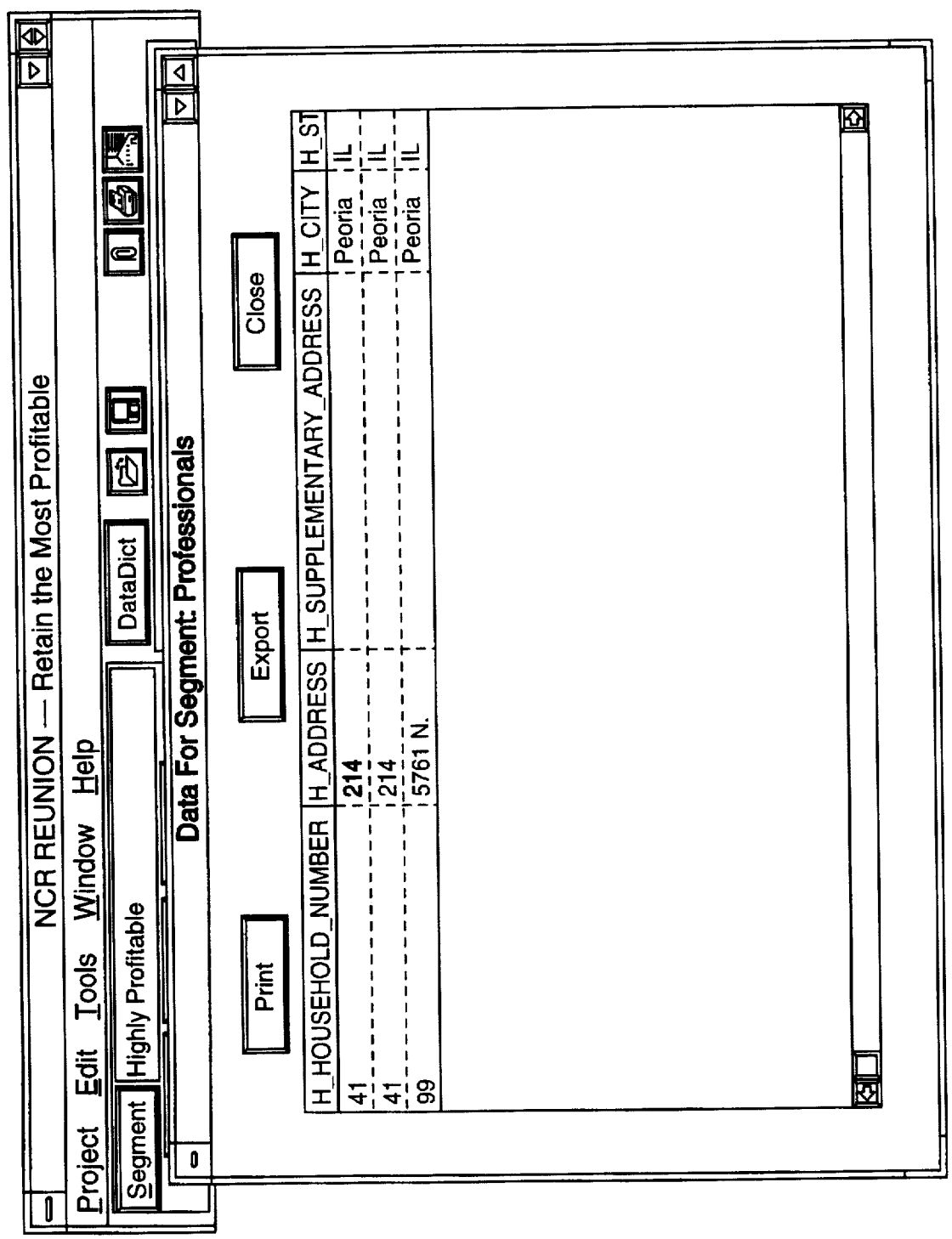

2. FIG. 3 illustrates options of ADD, EDIT, and REMOVE, with respect to PROJECTs. FIG. 4 illustrates similar options with respect to SEGMENTS. FIG. 8 illustrates similar options with respect to STRATEGIES. FIG. 10 illustrates similar options with respect to CAMPAIGNS. FIG. 13 illustrates similar options with respect to ATTACHMENTS. The detailed flowchart explains these options. In general, they allow a user to modify the PROJECTS, SEGMENTS, etc., as the user sees fit, using well-known conventions established for Graphical User Interfaces, or GUI. GUI's are also called "operating environments."

However, a significant feature is that the user (the market analyst) is prohibited from editing the underlying database. (Although it would be a simple task for a system administrator to allow the analyst to do so, it is, nevertheless preferred that the analyst be prohibited from such editing.)

One such GUI is that sold under the trade name Windows, available from Microsoft Corporation, located in Redmond, Wash., which also sells "Windows Product Development Kit," which contains programs and materials which assist in development of products such as the present invention.

3. The underlying database can be a commercially available database such as Oracle, or one which uses the Standard Query Langauge (SQL). Many of the options of the invention involve perform pre-defined queries of the records of the database.

For example, selecting a SEGMENT is, in effect, a query, based on the characteristics of the desired SEGMENT.

The ability of the user to modify PROJECTS, SEGMENTS, STRATEGIES, etc., as described in point number 2, above, involves modifying, or adding, new pre-defined queries. For example, the user can group customers into SEGMENTS, by adding a SEGMENT, which, in effect, defines a query appropriate for the added SEGMENT.

Figure 19:
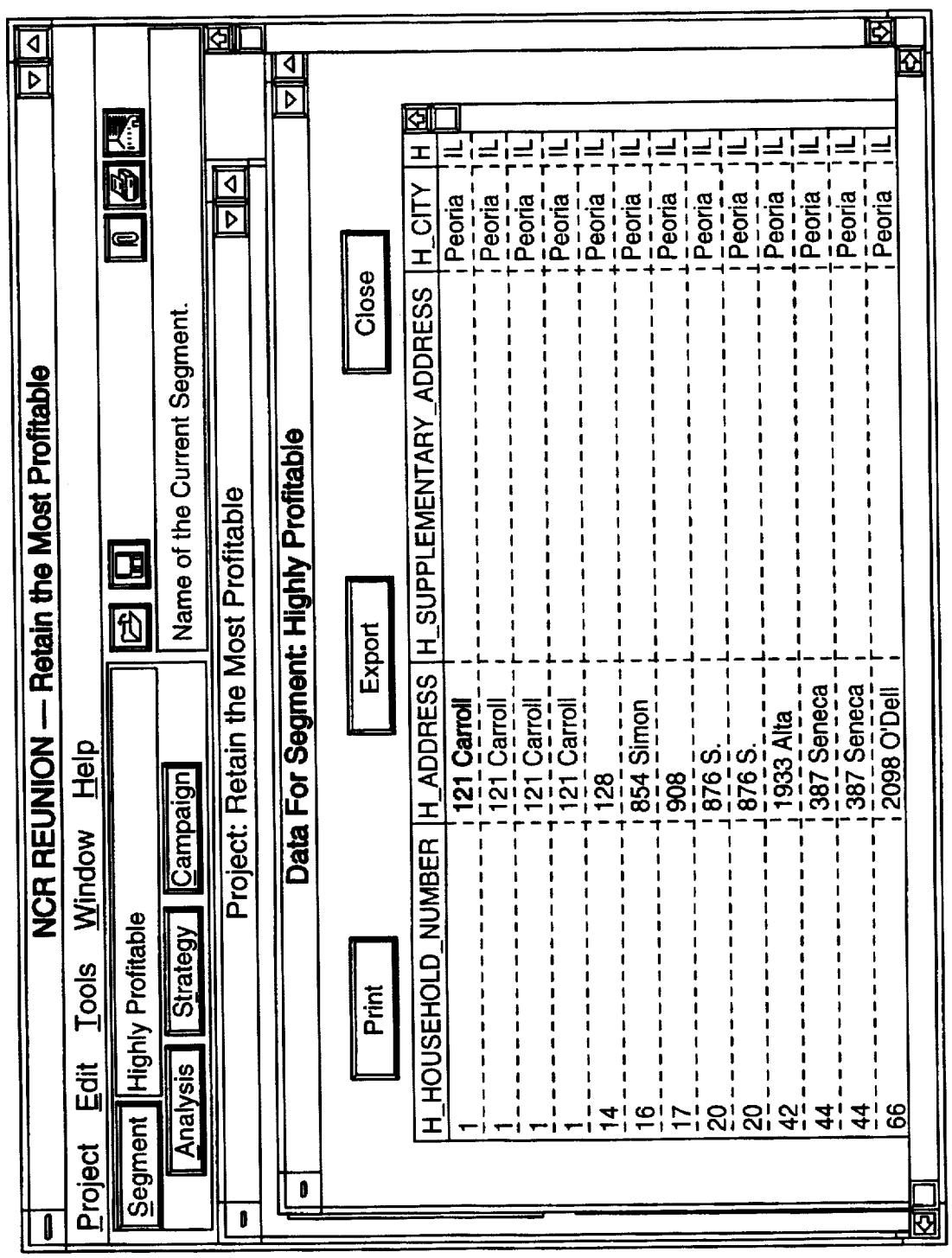
Figure 20:
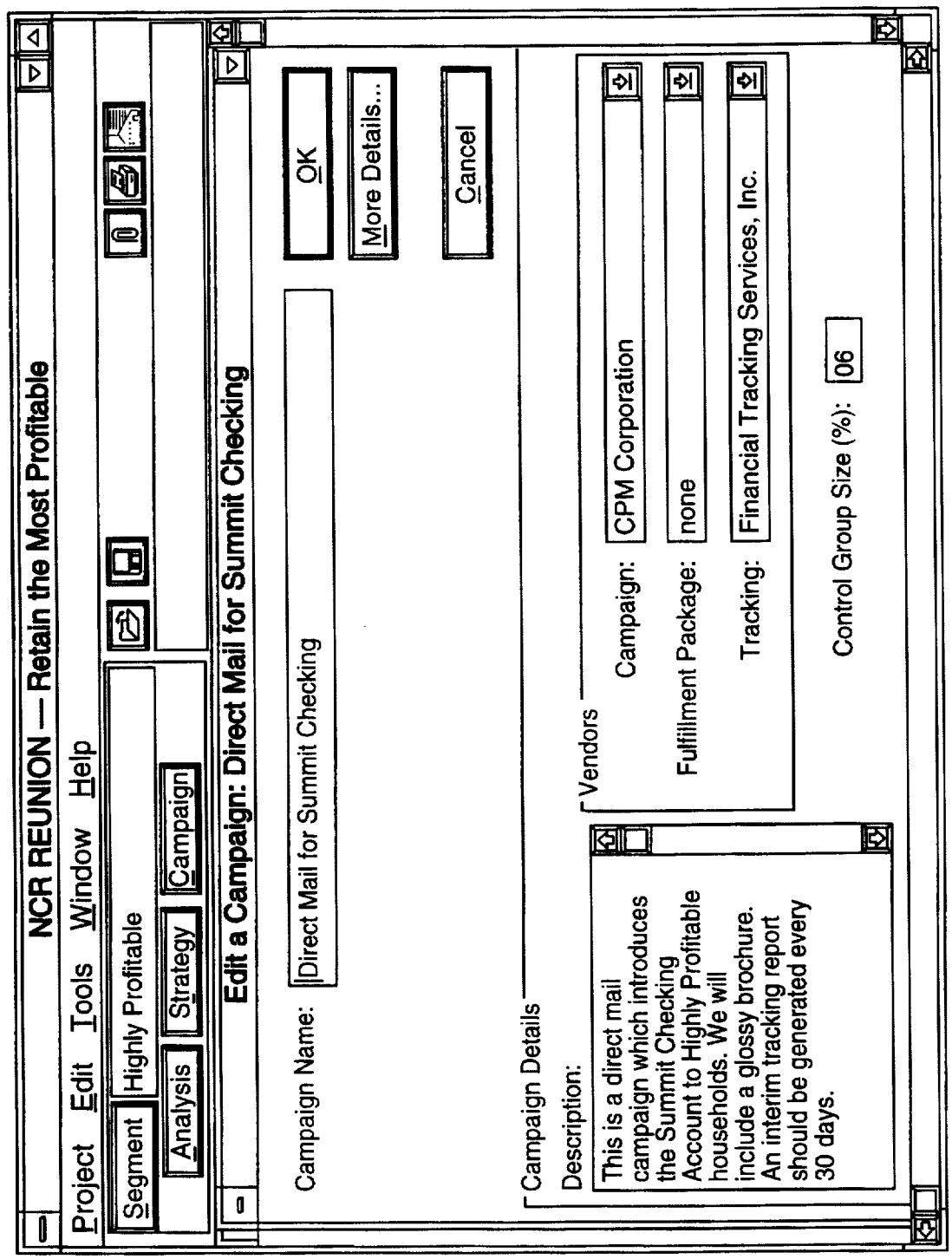
Figure 21:
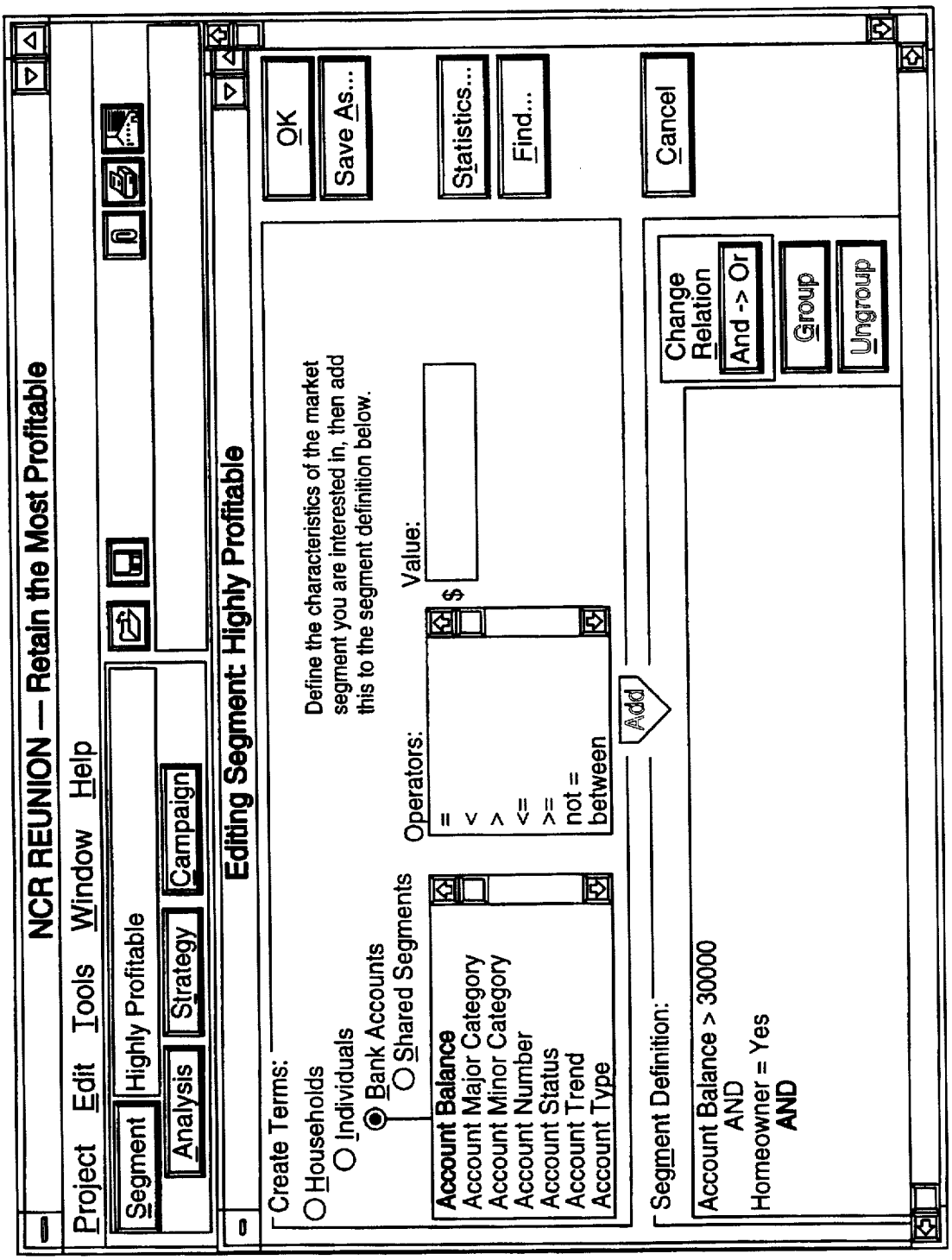
Figure 22:
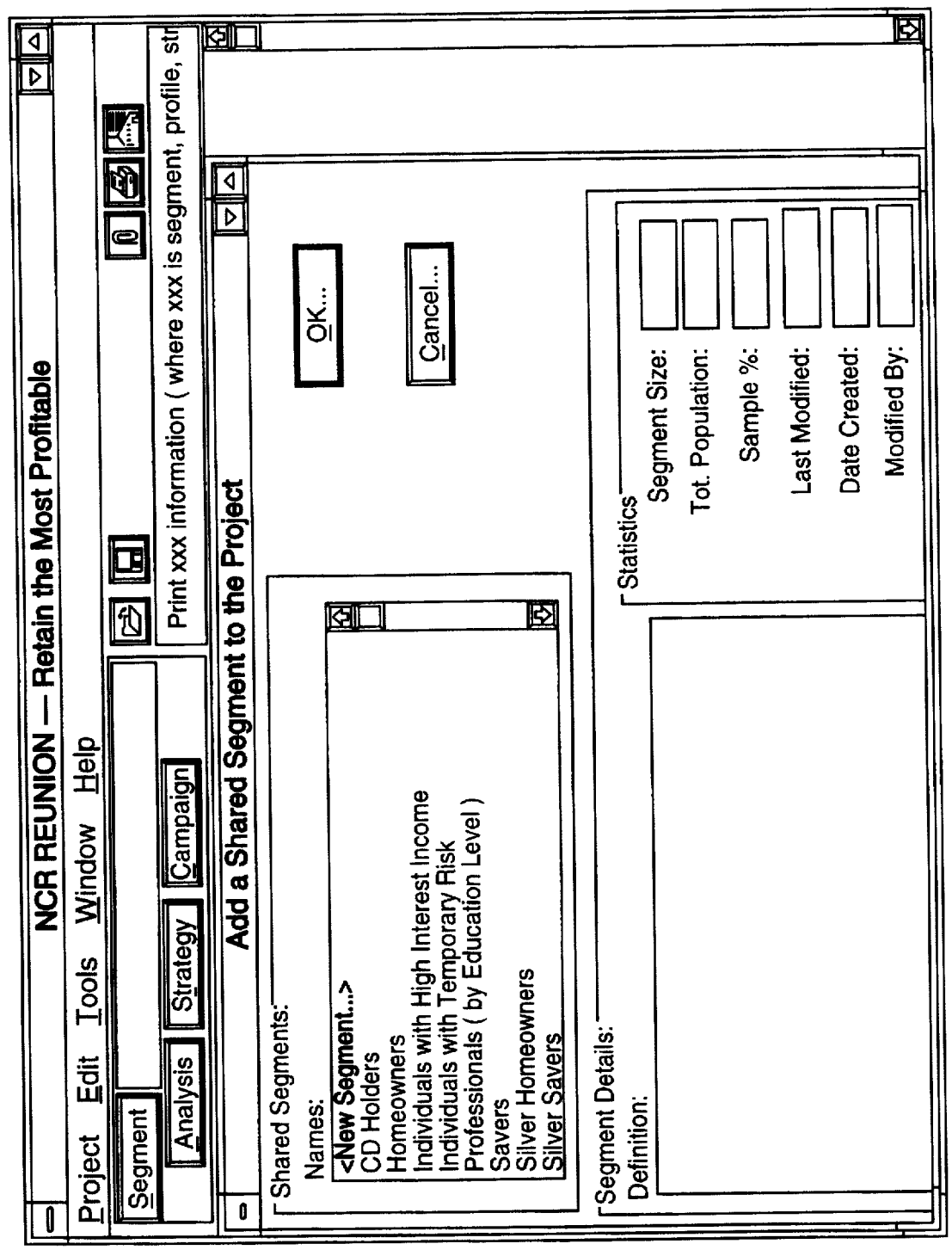
Figure 23:
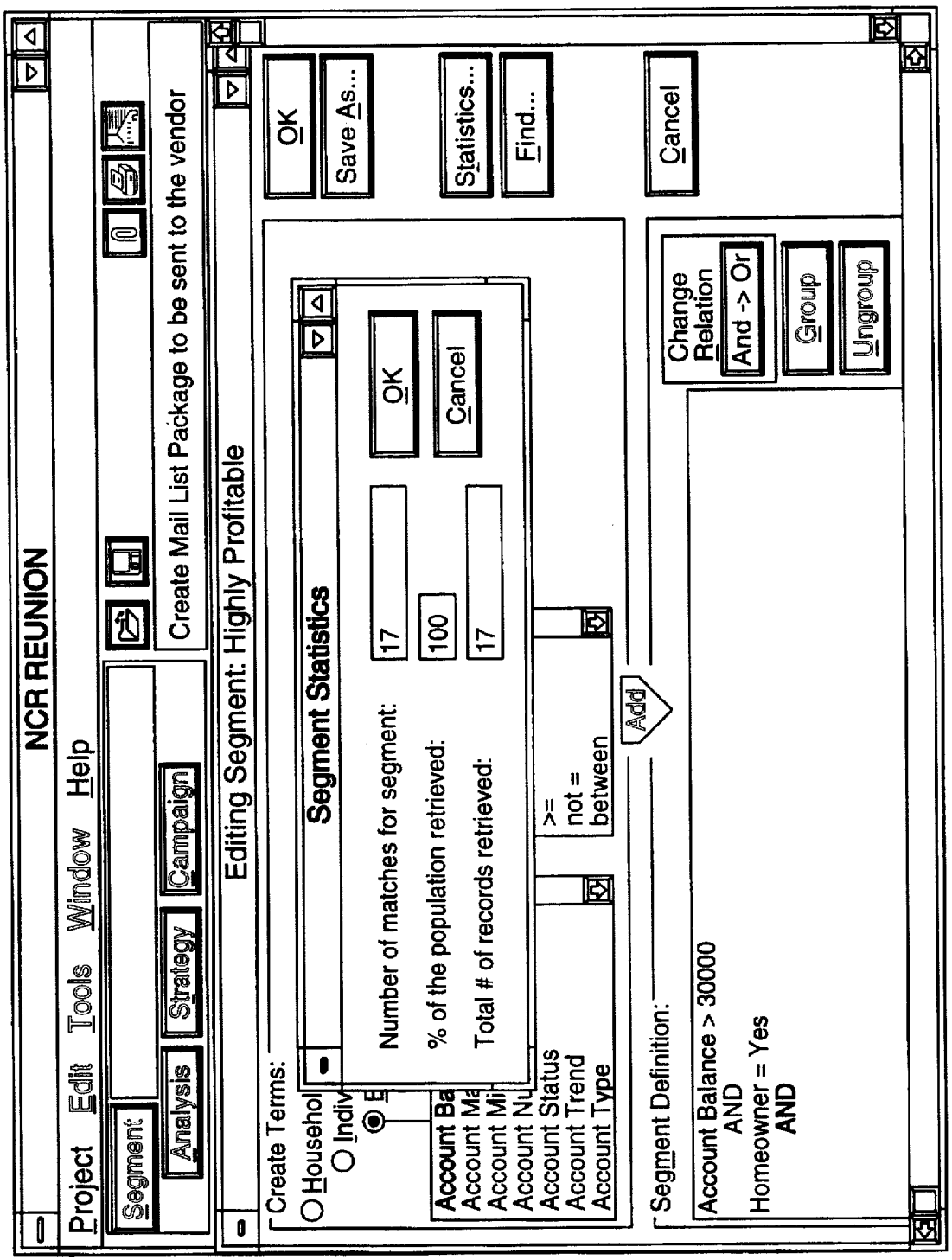
Figure 24:
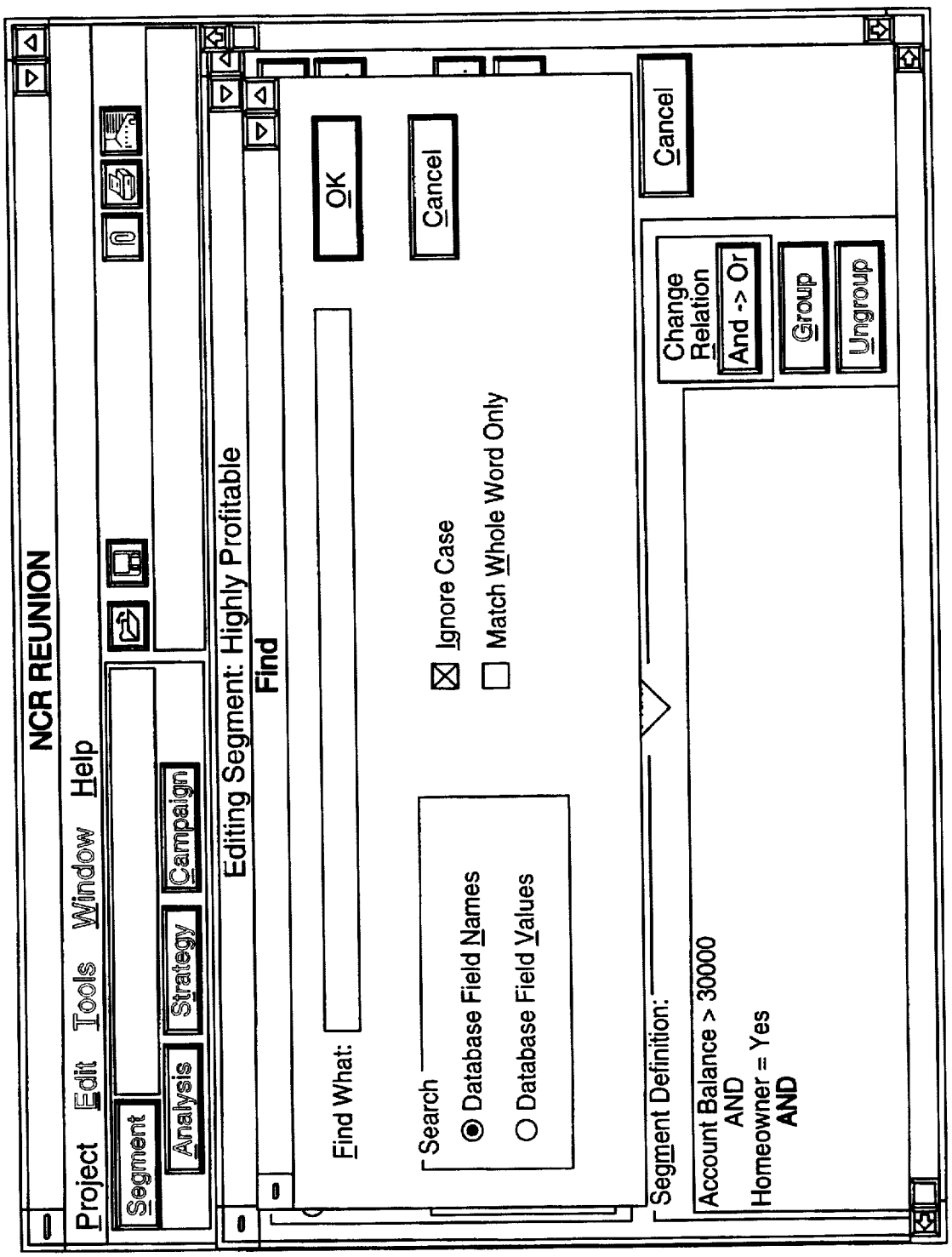
Figure 25:
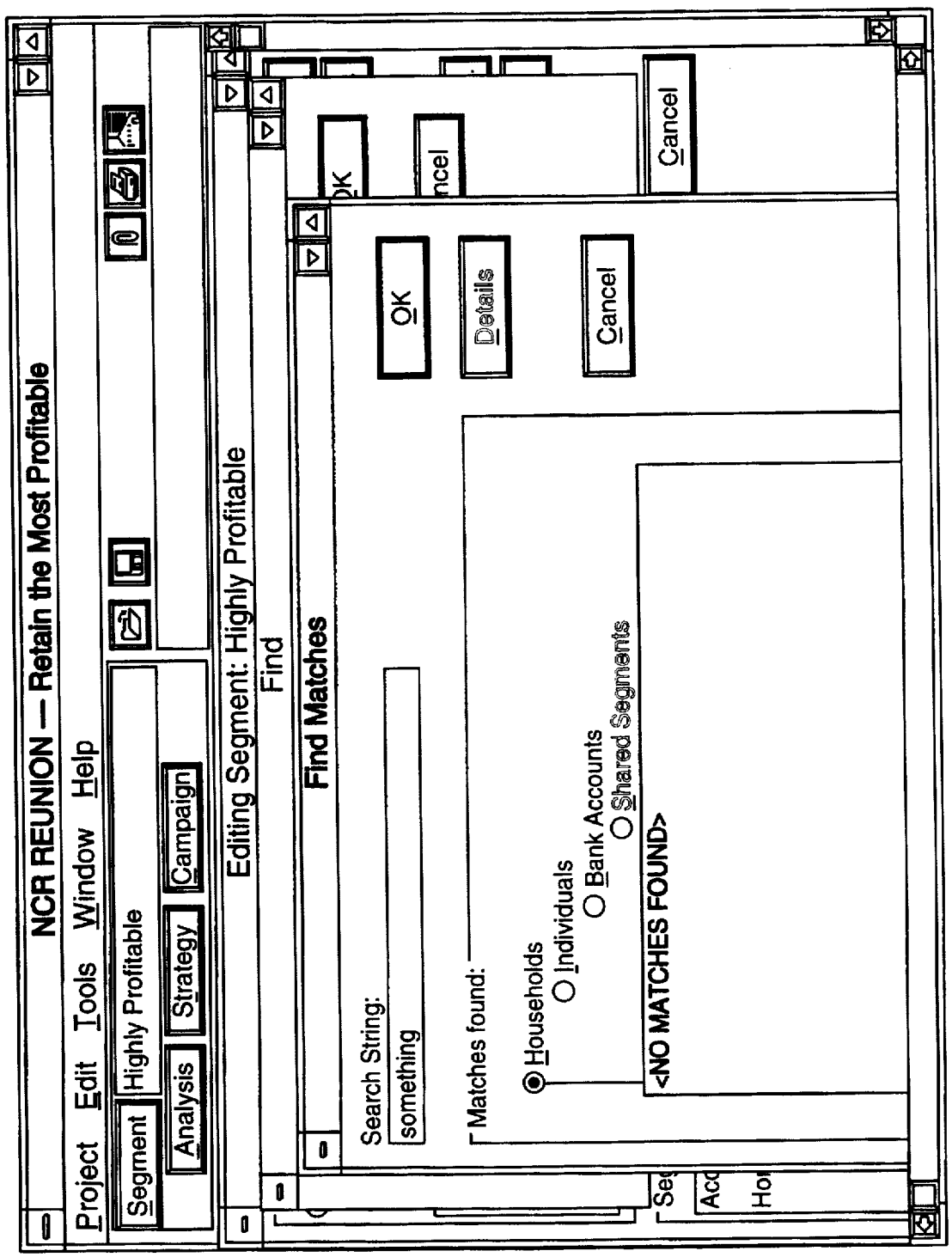
Figure 26:
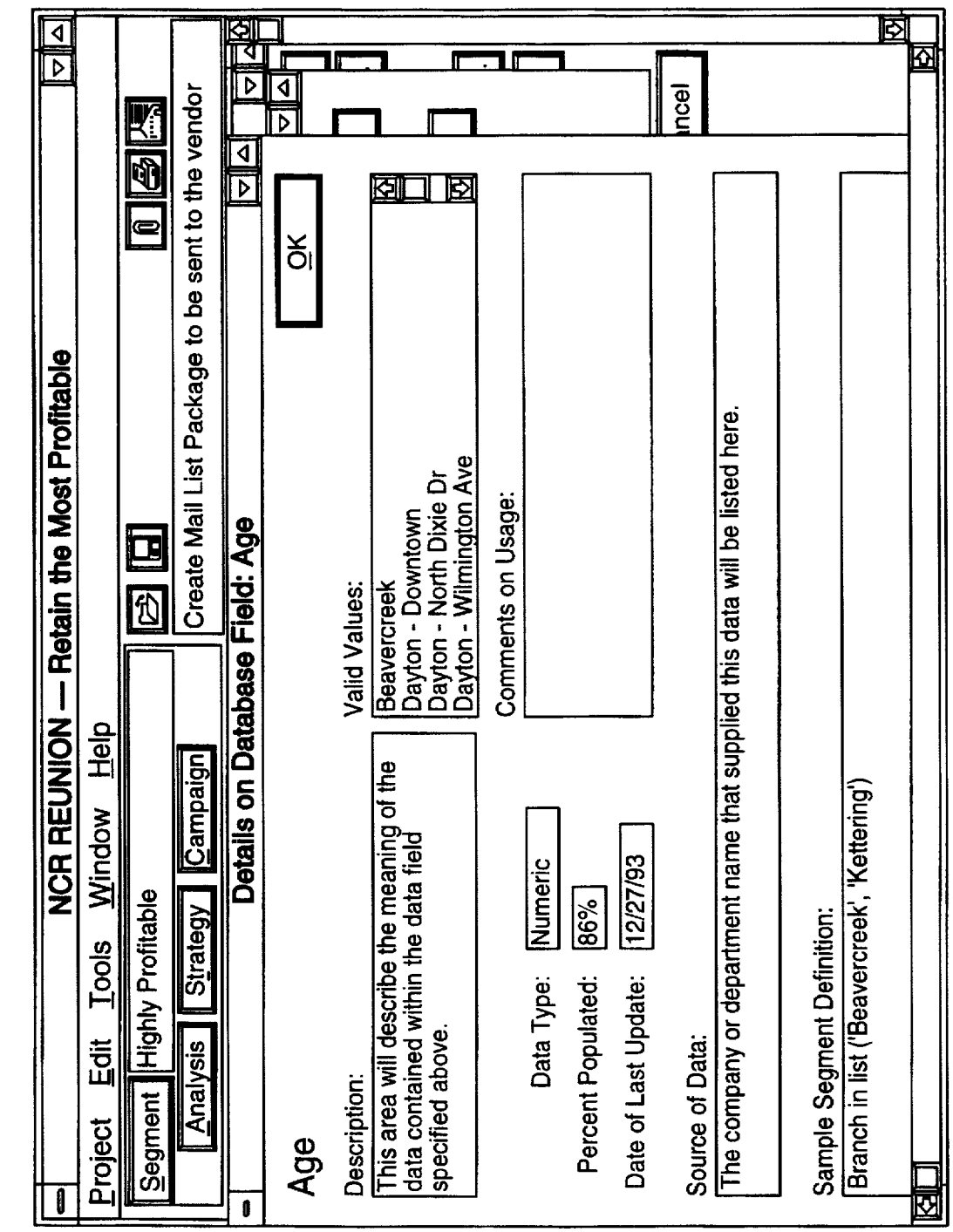
Figure 27:
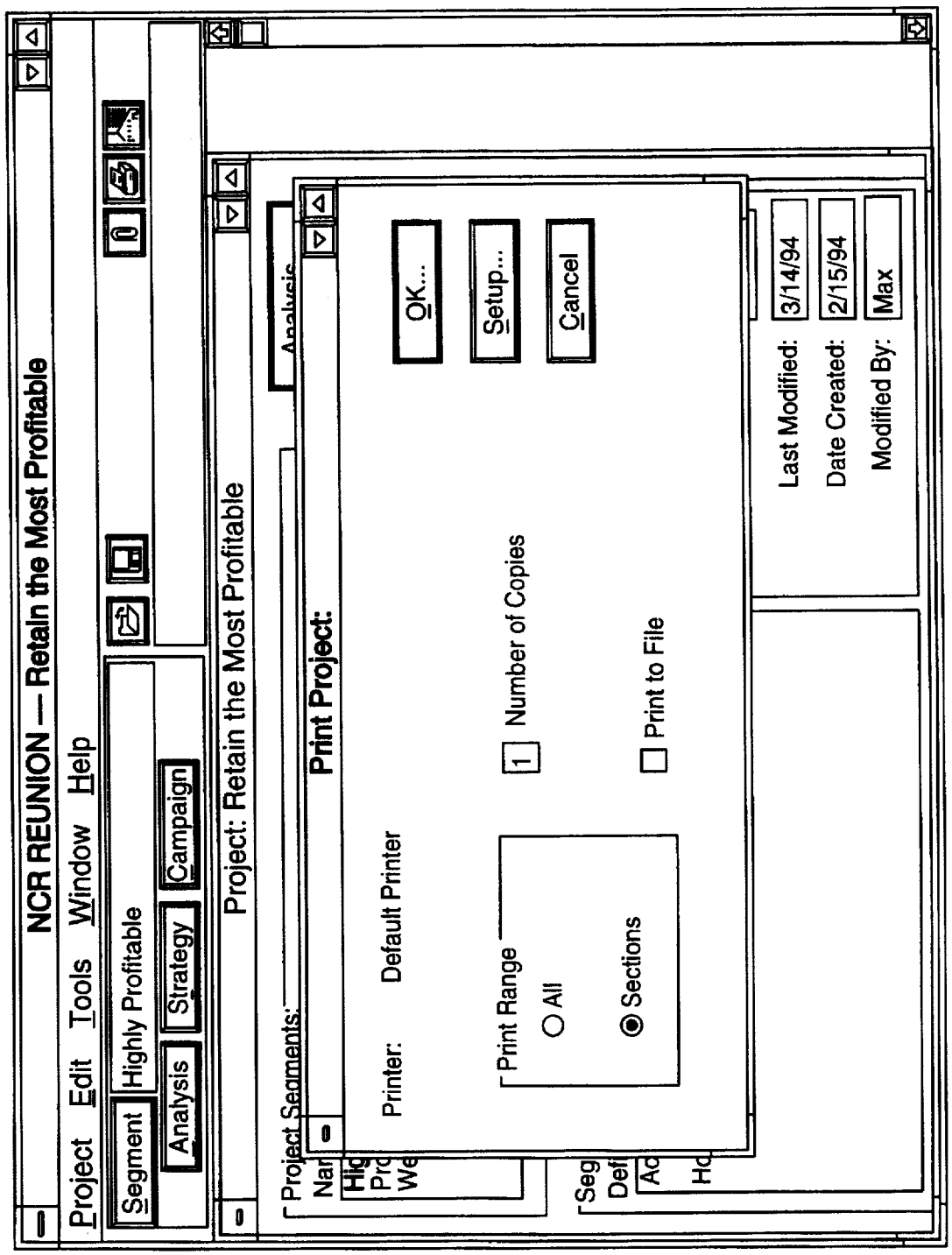

4. The invention allows a user to export data of a SEGMENT to other programs for processing, as indicated in FIG. 1R and FIG. 19. Such exporting is known in the art.

5. The repeated updating of the database, using information provided by the INVESTIGATOR, provides a historical record of customer transactions from which future trends can be predicted. For example, a given CAMPAIGN can be run on SEGMENTS having different demographic characteristics. Correlations can be drawn between success of the CAMPAIGNS and characteristics of the SEGMENTS, allowing prediction of success of future CAMPAIGNS when applied to SEGMENTS having similar characteristics.

6. ATTACHMENTS, as stated above, can be files generated by other programs. When the user wishes to VIEW an ATTACHMENT, as by using the VIEW option in FIG. 13, the invention locates the ATTACHMENT and reads a header in the ATTACHMENT's file. If the header identifies the program which generated the ATTACHMENT, the invention locates that program, launches it, and loads the ATTACHMENT, so that the program displays the ATTACHMENT, which it previously generated.

7. The mailing list does not necessarily contain all members of a SEGMENT. The user can select the percentage of the SEGMENT which is to be placed onto the mailing list, as by changing the entry adjacent "Sample %" in FIG. 3.

Once the percentage is selected, the invention generates the mailing list randomly. Alternately, the list can be generated by a sampling technique. For example, if the selected percentage is 50 percent, then the invention can select every other member of a SEGMENT. If the percentage is 25 percent, then every fourth member can be selected, and so on.

8. The dashed paths in FIGS. 1A and 1B indicate that a user can jump along these paths from any of the levels contained in the brackets 20. One reason this jumping is allowed is shown in FIGS. 29 and 30.

In these Figures, pull-down menus provide options which allow these jumps. For example, choosing the OPEN option in FIG. 29 causes the window shown in FIG. 1 to appear.

Figure 30:
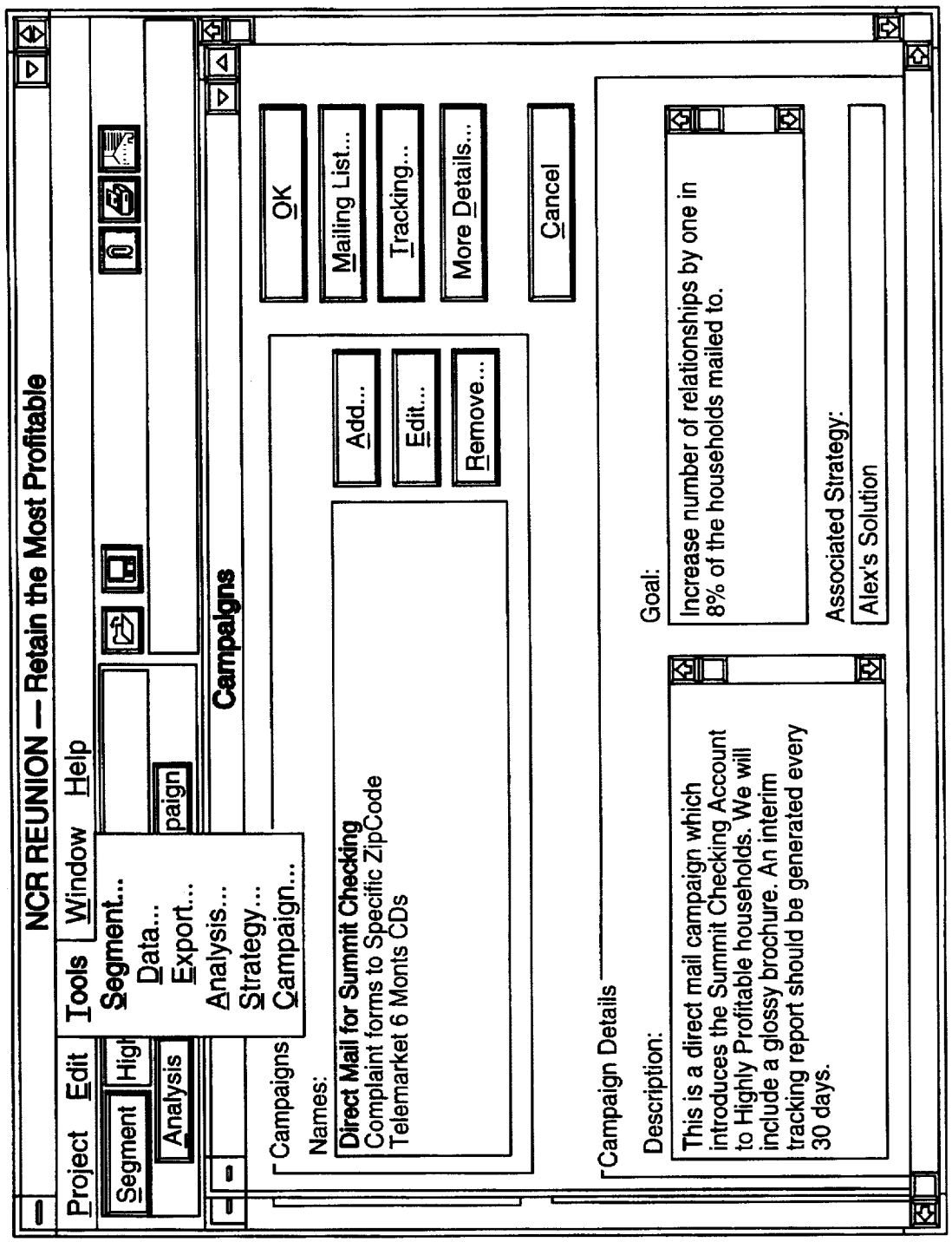

Choosing the SEGMENT option in FIG. 30 causes the window of FIG. 3 to appear.

Choosing the ANALYSIS option in FIG. 30 causes the window of FIG. 4 to appear.

Choosing the STRATEGY option in FIG. 30 causes the window of FIG. 8 to appear.

Choosing the CAMPAIGN option in FIG. 30 causes the window of FIG. 10 to appear.

These options, located in the menu bar which runs along the top of the screen, are available in most, if not all, of the windows.

In addition, the buttons labeled SEGMENT, ANALYSIS, STRATEGY, and CAMPAIGN, as shown in the upper left corner of FIG. 10, allow similar jumps. Thus, from any window, a user can gain access to the dashed paths shown in FIGS. 1A and 1B.

9. Definitions

The following are accurate definitions. Other definitions exist.

ANALYSIS: refers to the retrieval and display of data associated with a SEGMENT. The display can be tabular, graphical, animated (to show change with time), or other type. Computation may be required. For example, data may be compressed, and may require expansion. Also, computation may be required to generate graphs. Computation may be required to predict a historical trend, based on data indicating past performance.

BANK: refers to banks, and other financial insitutions.

CAMPAIGN: specific sequences of actions which implement a STRATEGY. Example: a CAMPAIGN of marketing by telephone a particular six-month certificate of deposit (CD). The STRATEGY is to increase the number of holders of these CDs.

COMPONENT: includes PROJECTS, STRATEGIES, CAMPAIGNS, and SEGMENTS.

CONTROL GROUP: it is desirable to know whether people purchase a bank's product in response to a CAMPAIGN or not. A CONTROL GROUP is designated, which is demographically similar to the group of people on a MAILING LIST (as by both being within the same SEGMENT). That is, part of a SEGMENT can be placed on a MAILING LIST, and part kept off the MAILING LIST. Of the part kept off, a fraction is designated as the CONTROL GROUP, using the "CONTROL GROUP SIZE" command in FIG. 12.

The user places a cursor within the box adjacent this command, and enters a number, which represents the percentage of the people within the SEGMENT, but not on the MAILING LIST, which will act as the CONTROL GROUP.

If a large fraction of the persons on the MAILING LIST respond, but a small fraction of the CONTROL GROUP perform a similar response, then the mailing is deemed a success.

INVESTIGATOR: a person, or organization, which compiles information about the effectiveness of a CAMPAIGN. Example: correspondence may be sent to a SEGMENT, inviting the persons in the SEGMENT to investigate a particular mortgage. The persons are invited to contact the INVESTIGATOR, who sends them further information, but also records information about the inquiry made by the person.

MAILING LIST: a list of addresses which is used to send correspondence. A paper list is such. Commonly, however, the list is stored on a floppy computer diskette, instead of paper. The addresses need not be of the street-town-state-country type, nor need the mail be carried by a traditional postal service. Any designation, which can be used to direct information to a receiving party, can qualify as an address, such as an electronic mail address. A list of telephone numbers qualifies as a mailing list.

NOTES: messages written by a user and associated with a COMPONENT, such as a type of ANALYSIS (which is, itself, associated with a STRATEGY).

PRODUCT: the item of value which a bank, or other financial institution, provides to its customers. Strictly, most of the PRODUCTS are actually services, but, in the banking industry, they are nevertheless called PRODUCTS.

STRATEGY: activities which increase the number of customer relations, or customer transactions, with a bank.

TRACKING: used in connection with CAMPAIGNS. TRACKING refers to examining the results of a CAMPAIGN, in order to ascertain effectiveness.

Numerous substitutions and modifications can be undertaken without departing from the true spirit and scope of the invention. What is desired to be secured by Letters Patent is the Invention as defined in the following claims.

We claim:

1. For a bank's database, containing information about customers, the improvement comprising:

a) means for generating a first display which i) lists selected goals of the bank, said goals termed PROJECTs, and allows a user to select a PROJECT; and ii) displays buttons which activate options which operate on data associated with the selected PROJECT, including A) an OPEN button, which generates a second display containing a list of market SEGMENTs, comprising subsets of customers to whom the bank markets products, and to which the selected PROJECT is directed; and B) a DESCRIPTION button, which generates a description of the selected PROJECT.

2. Apparatus according to claim 1 in which (1) the user is able to select a SEGMENT within the second display and (2) the second display contains buttons which activate option which operate on the selected SEGMENT, including A) an ANALYSIS button, which generates a window allowing the user to retrieve stored data concerning individual members of the selected SEGMENT;

B) a STRATEGY button, which generates a window allowing the user to view STRATEGIEs associated with the selected SEGMENT, said STRATEGIEs indicating behaviors sought to be induced in members of the selected SEGMENT; and C) a CAMPAIGN button, which generates a window listing actions to be taken in pursuit of a strategy.

3. Apparatus according to claim 1, and further comprising:

b) a MAILING LIST button, which presents a third display which
i) allows a user to select a sample of a selected SEGMENT and
ii) allows the user to cause a mailing list to be generated, which contain addresses of the members of the sample, and
ii) allows the user to cause delivery of the mailing list to a predetermined agent, without further intervention by said user.

4. Apparatus according to claim 3, in which the third display contains an option which allows the user to send an ATTACHMENT, comprising a computer file, to the predetermined agent, without further intervention by the user.

5. Apparatus according to claim 1, in which one class of users, termed INVESTIGATORS, is enabled to edit the database, while another class of users, termed ANALYSTS, is prevented from editing the database.

* * * * *

UNITED STATES PATENT AND TRADEMARK OFFICE
CERTIFICATE OF CORRECTION

PATENT NO. : 5,721,831
DATED : Feb 24, 1998
INVENTOR(S) : Toya Waits et al.

It is certified that error appears in the above-indentified patent and that said Letters Patent is hereby corrected as shown below:

Column 10, line 66, delete "option" and insert --options--.

Signed and Sealed this

Twentieth Day of October, 1998

*Attest:*

BRUCE LEHMAN

*Attesting Officer*     *Commissioner of Patents and Trademarks*